United States Patent [19]

Sasanuma et al.

[11] Patent Number: 5,579,090
[45] Date of Patent: Nov. 26, 1996

[54] IN AN IMAGE PROCESSING SYSTEM, AN IMAGE PROCESSING APPARATUS AND METHOD FOR STABILIZING OUTPUT IMAGE QUALITY BY CONTROLLING IMAGE FORMING PARAMETERS

[75] Inventors: Nobuatsu Sasanuma, Yokohama; Yuichi Ikeda, Tokyo, both of Japan

[73] Assignee: Canon Kabushiki Kaisha, Tokyo, Japan

[21] Appl. No.: 371,214

[22] Filed: Jan. 11, 1995

[30] Foreign Application Priority Data

Jan. 12, 1994 [JP] Japan .................................. 6-014806
Mar. 25, 1994 [JP] Japan .................................. 6-056053

[51] Int. Cl.$^6$ ................................................ G03G 15/00
[52] U.S. Cl. ................................. 355/208; 358/521
[58] Field of Search ................................. 355/208, 214, 355/246; 358/519, 458, 456, 298, 521

[56] References Cited

U.S. PATENT DOCUMENTS

| | | | |
|---|---|---|---|
| 4,888,636 | 12/1989 | Abe | 358/80 |
| 5,148,289 | 9/1992 | Nishiyama et al. | 355/246 X |
| 5,298,944 | 3/1994 | Sawayama et al. | 355/208 |
| 5,305,057 | 4/1994 | Hattori et al. | 355/208 X |
| 5,319,433 | 6/1994 | Fukushima et al. | 355/326 |
| 5,363,318 | 11/1994 | McCauley | 358/519 X |

*Primary Examiner*—Joan H. Pendegrass
*Assistant Examiner*—Quana Grainger
*Attorney, Agent, or Firm*—Fitzpatrick, Cella, Harper & Scinto

[57] ABSTRACT

An object of the present invention is the forming over a long period of time of images that have a desirable density and gradation.

According to the present invention, an image pattern, at the maximum image density, is formed on a photosensitive drum and read by a detection unit that incorporates an LED and a photosensor. Based on the read-out data, an image forming condition is corrected so that a maximum density is slightly higher than a target maximum density. Further, an image pattern that shows density gradations is formed on the photosensitive drum, and is read by the detection unit. Based on the read-out data, the image forming condition is corrected so that the gradation characteristic is stable. With these corrections, even if the density characteristic and the gradation characteristic of the photosensitive drum are changed, the initial preferable state of the output density range can be maintained, and stable gradation characteristics for print effects that range from highlighting to shadowing is constantly ensured.

13 Claims, 52 Drawing Sheets

SPECTRAL CHARACTERISTIC
OF YELLOW TONER

SPECTRAL CHARACTERISTIC
OF MAGENTA TONER

SPECTRAL CHARACTERISTIC
OF CYAN TONER

SPECTRAL CHARACTERISTIC
OF BLACK TONER

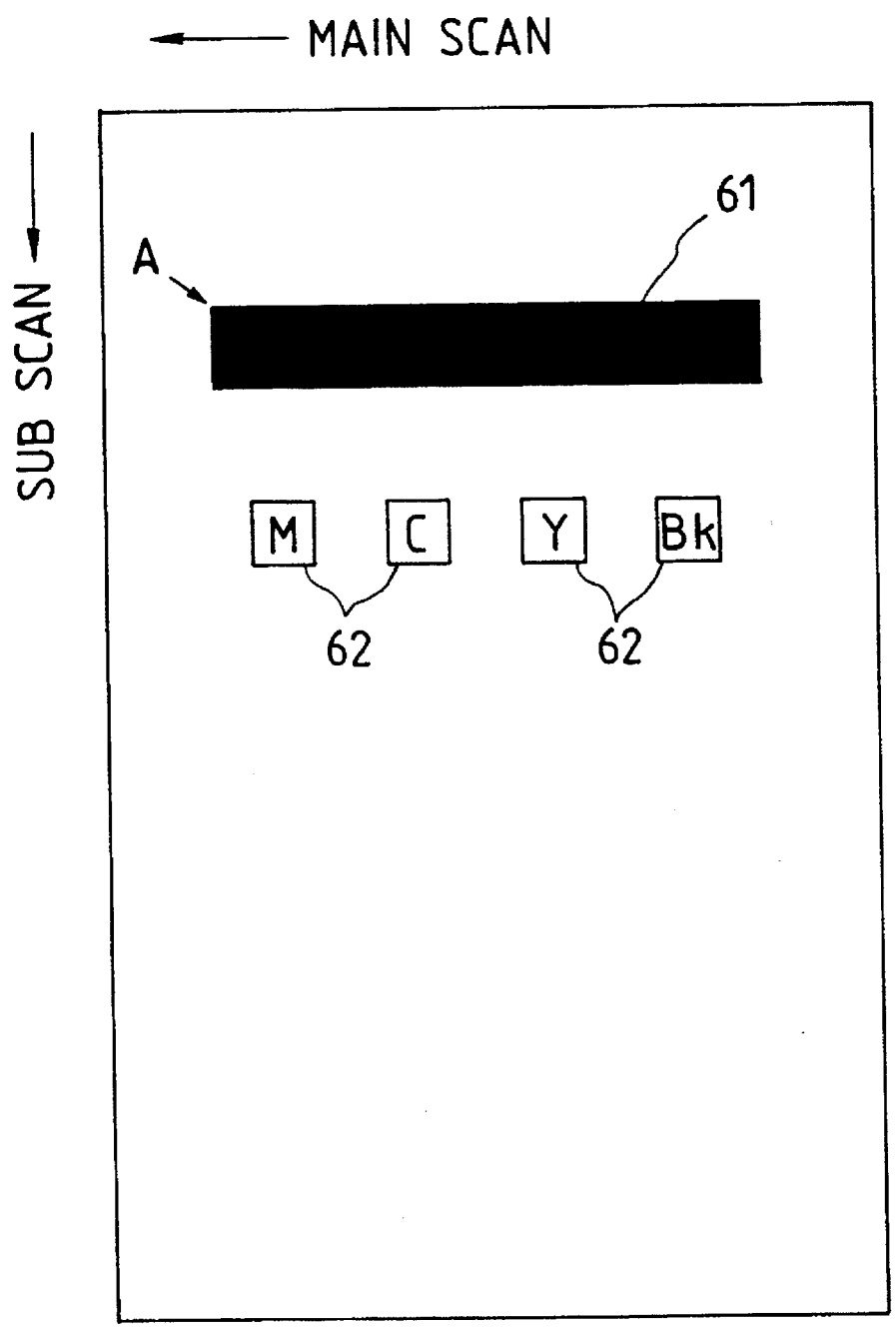

SPECTRAL CHARACTERISTIC OF YELLOW TONER

SPECTRAL CHARACTERISTIC OF MAGENTA TONER

SPECTRAL CHARACTRISTIC OF CYAN TONER

SPECTRAL CHARACTRISTIC OF BLACK TONER

FIG. 57
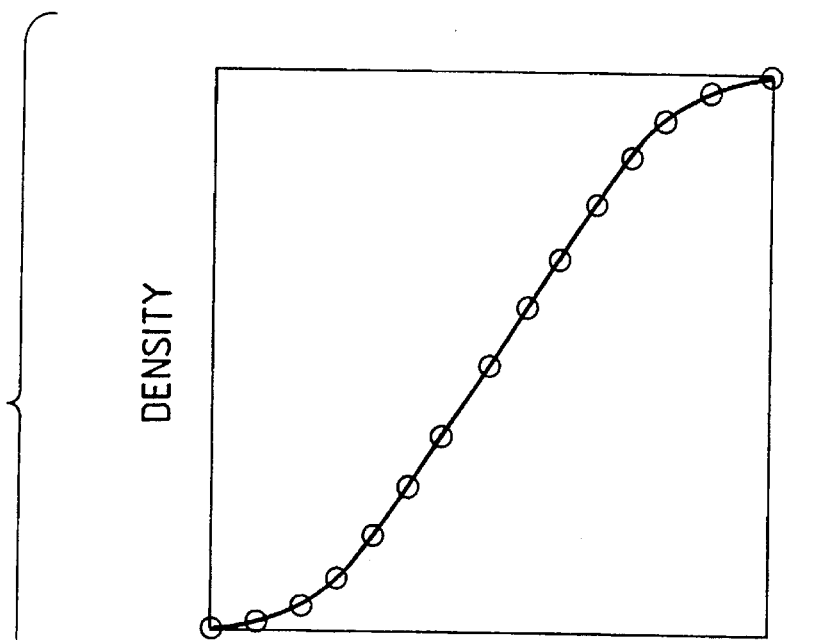
CONVENTIONAL MEASURING POINT⋯O
(EQUI-INTERVAL FOR LASER OUTPUT)
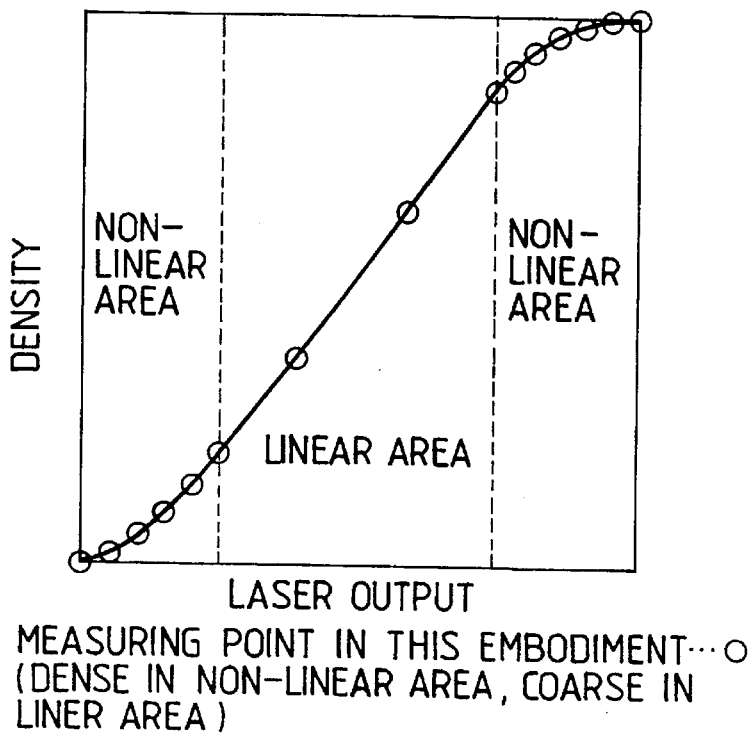
MEASURING POINT IN THIS EMBODIMENT⋯O
(DENSE IN NON-LINEAR AREA, COARSE IN LINER AREA)

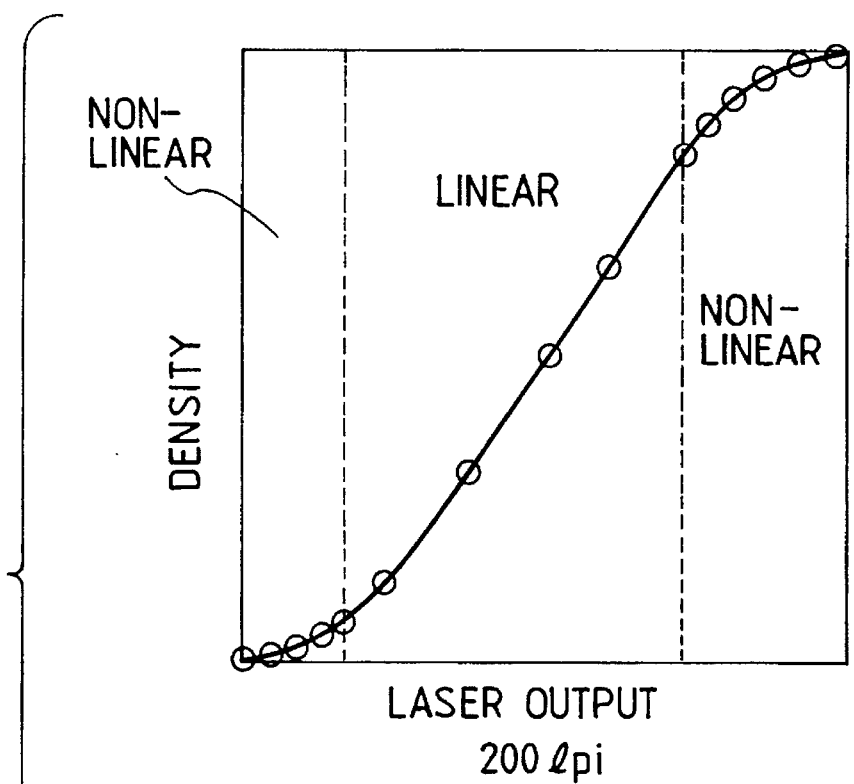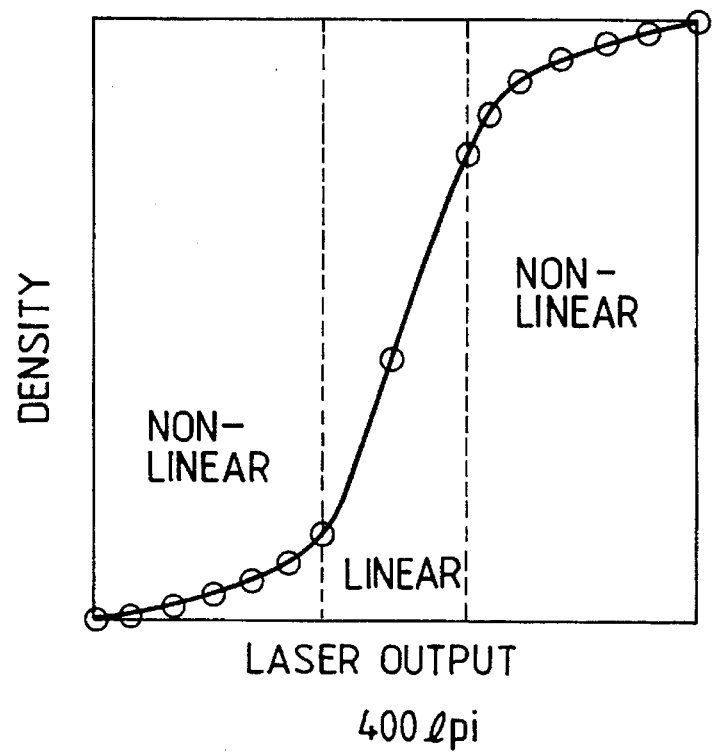
FIG. 60

IN AN IMAGE PROCESSING SYSTEM, AN IMAGE PROCESSING APPARATUS AND METHOD FOR STABILIZING OUTPUT IMAGE QUALITY BY CONTROLLING IMAGE FORMING PARAMETERS

BACKGROUND OF THE INVENTION

1. Field of the Invention

The present invention relates to an image processing apparatus, such as a copy machine or a laser printer, that forms an image, and a method for forming an image.

2. Related Background Art

One of the conventionally known methods (image processing methods) for the control of the image processing characteristic of an image forming apparatus, such a copy machine or a printer, is as follows.

First, an image processing apparatus is activated and warmed up, and then a specific pattern is formed on an image holder, such as a photosensitive drum. The formed pattern is read, and, based on the density value of the read-out pattern, the operation of a circuit, such as a $\gamma$ compensator ($\gamma$ conversion circuit), that determines image forming conditions is altered, so that the quality of a produced image is stabilized.

When the gradation characteristic is changed by the fluctuation of environmental conditions, the specific pattern is again formed on the image holder, read out, and refed to a circuit, such as the $\gamma$ compensator, that determines image forming conditions, so that a constant image quality can be maintained that is in consonance with the changed environmental conditions.

In the above conventional example, however, when an image processing apparatus has been in use for an extended period of time, the read-out density value of the pattern on the image holder sometimes does not correspond to the density of the image that is actually printed out.

Over time, the surface of an image holder becomes worn by the constant rubbing it receives by being in contact with a cleaning blade, for example, that is employed to remove transfer residual toner. Accordingly, the relationship between the adhering toner amount and a reflected light amount differs from that which exists in the initial state.

When, therefore, an image processing apparatus that has been in use for an extended period is returned to the state for image forming by employing density data that are acquired by using an initial density conversion parameter, an optimal image cannot be obtained.

Further, in the above conventional example, since no thought is given to the deterioration of the maximum image density for an image processing apparatus, when the output of the maximum image density is reduced due to a change in durability, etc., the gradation of an image is adversely affected within the high image density range no matter how the $\gamma$ characteristic is corrected.

In addition, since the gradation characteristic in the image processing apparatus in the above prior art is not linear (in particular, the characteristic for highlighting is not linear), the density that is obtained by interpolating density data by using an expression for an approximation differs from the actual density. When the gradation data is fed back to the image forming apparatus, an optimal image cannot be produced.

Moreover, in the above prior art, when an uneven density condition occurs that is due to a charging variance, because a charging unit is not clean, even though an image processing apparatus outputs an image with a uniform density across the entire surface of a recording medium, the density is varied for an image that is actually produced with the same density output. Under these conditions, if the gradation data is fed back to the image processing apparatus, an optimal image cannot be provided.

SUMMARY OF THE INVENTION

To overcome those shortcomings, it is therefore an object of the present invention to stabilize image quality by employing a plurality of different calibrations.

It is another object of the present invention to improve the calibrations.

It is an additional object of the present invention to effectively employ the maximum density with which an image can be expressed by image forming means.

It is a further object of the present invention to perform desirable gradation control in the density range where a gradation characteristic is not linear.

It is still another object of the present invention to make an adjustment to stabilize image forming conditions by determining the uniformity of a standard pattern.

To achieve the above objects, an image processing apparatus according to the present invention comprises: input means for inputting image data; correcting means for correcting the image data; image forming means for forming an image on a medium in accordance with the image data that is corrected by said correcting means; pattern generating means for generating a pattern data that is used for forming a pattern on the medium; detecting means for detecting the pattern on the medium; first controlling means for controlling an image forming condition of said image forming means, so that maximum density is greater than target maximum density; and second controlling means for controlling a correcting condition of said correcting means.

Further, to achieve the above objects, an image processing method according to the present invention comprises steps of: controlling an image forming condition of an image forming means so that maximum density is greater than target maximum density; and controlling a correcting condition of a correcting means.

Other objects and embodiments of the present invention will become obvious by referring to the following descriptions of the drawings and the claims.

BRIEF DESCRIPTION OF THE DRAWINGS

FIG. 30 is a diagram illustrating an example of test print 1;

FIG. 57 is a graph for explaining measured points;

FIG. 60 is a graph showing the modification of the fourth embodiment;

DETAILED DESCRIPTION OF THE PREFERRED EMBODIMENTS

The preferred embodiments of the present invention will now be described while referring to the accompanying drawings.

<First Embodiment>

An explanation will be given in which a digital monochrome copy machine is employed as a specific example.

Figure 1:
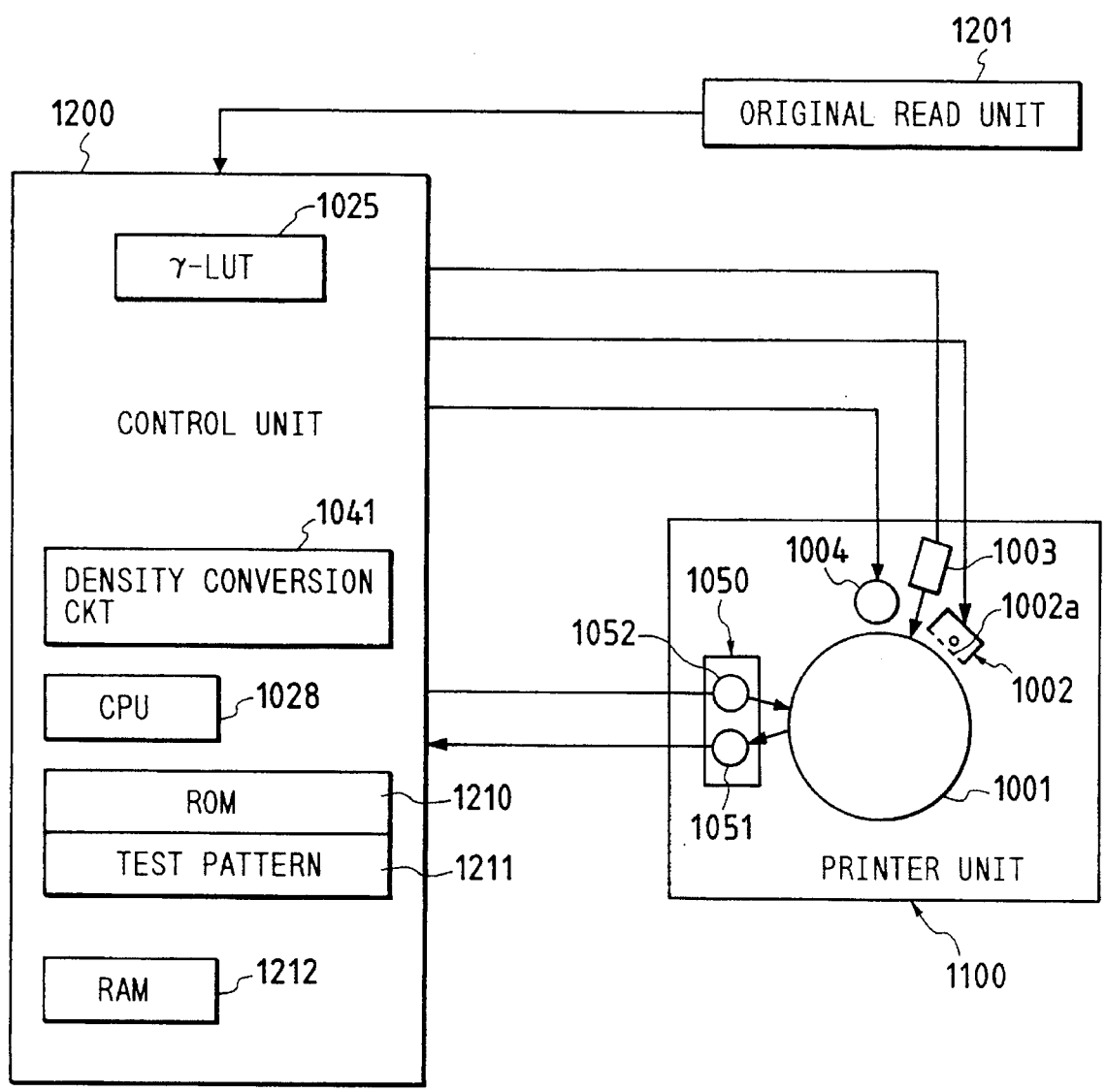
FIG. 1 is a control block diagram for an image processing apparatus according to a first embodiment of the present invention.

FIG. 1 is a block diagram illustrating the schematic arrangement of a copy machine according to this embodiment.

In FIG. 1, a control unit 1200, which controls the copy machine as a whole, includes a CPU 1028, such as a microprocessor, a ROM 1210, which is employed for storing a control program and various data for the CPU 1028, a RAM 1212, which is used as a work area for the CPU 1028, etc.

A test pattern, which will be described later, is stored in a test pattern area 1211 of the ROM 1210.

A γ-LUT 1025, which will be described later, performs gradation correction on an image signal that is transmitted from an original reading unit 1201, and outputs the resultant signal to a printer unit 1100.

In the printer unit 1100, a detection unit 1050, which incorporates an LED 1052 and a photosensor 1051, acquires the state of the surface of a photosensitive drum (image holder) 1001 that has a photosensitive layer on its surface.

A signal that is emitted from the photosensor 1051 is converted by a density conversion circuit 1041 in the control unit 1200. The resultant signal is sent to the CPU 1028, which in turn performs control processing that is consonant with the received signal.

The control unit 1200 also controls a bias potential that is to be applied to a developing unit 1004, a drive signal for a laser beam 1003, and a potential that is to be applied to a primary charging unit 1002.

The structure of the image processing apparatus and the image forming (image producing) procedures for it will now be described in detail while referring to the drawings.

Figure 2:
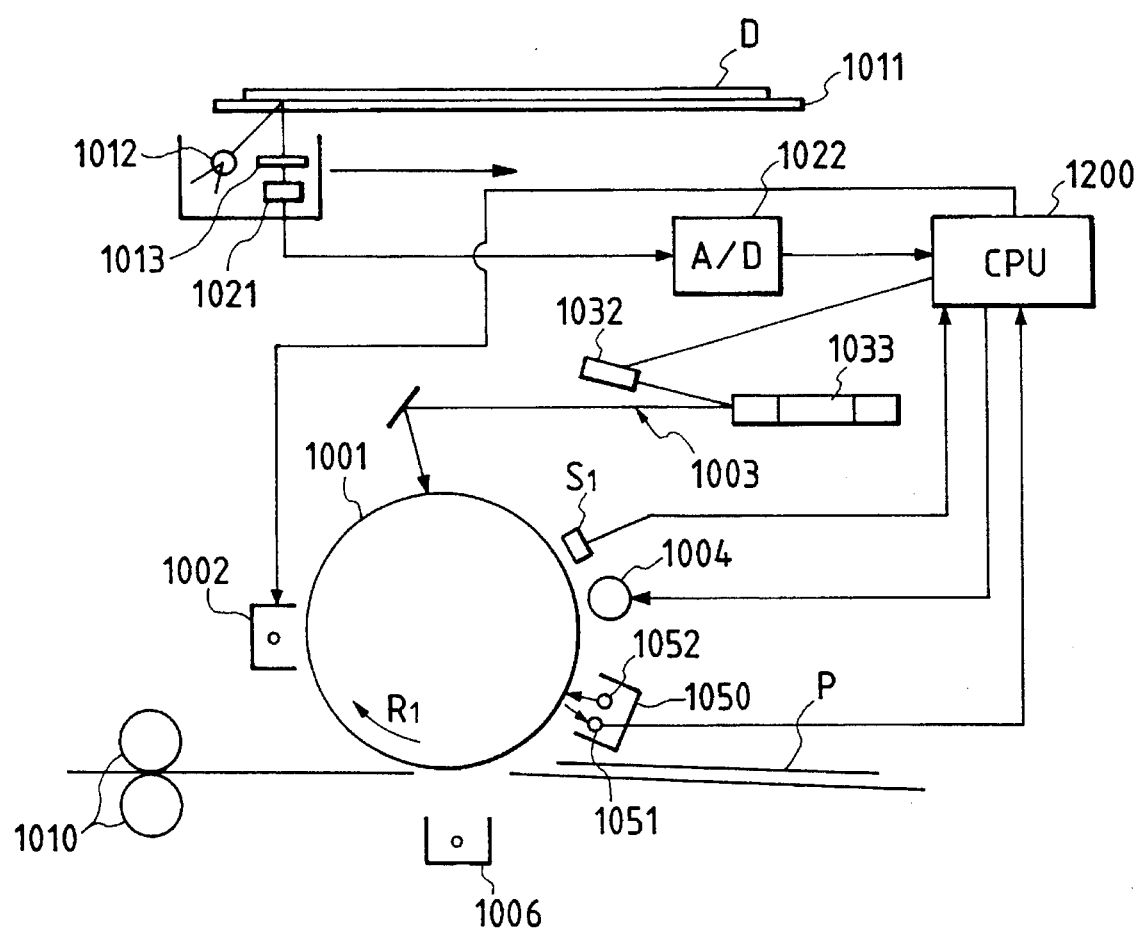
FIG. 2 is a vertical cross sectional view of the schematic arrangement for the image processing apparatus of the first embodiment.

FIG. 2 is a cross sectional view of the internal structure of the copy machine in this embodiment.

The image forming procedures will be explained first.

A light source 1012 irradiates an original document D and an optical system 1013 focuses an image of the original document D on a CCD sensor (hereafter referred to as a "CCD") 1021. The light source 1012, the optical system 1013, and the CCD 1021 are combined to form in a single unit, which, when scanning the original document D, is shifted in the direction indicated by the arrow. While the unit is being shifted, image data are sequentially digitized by an A/D conversion circuit 1022.

Image processing is performed on the digitized image signal by the control unit 1200 to obtain data for driving a semiconductor laser 1032. A laser beam 1003 that is emitted by the semiconductor laser 1032 is irradiated by a polygonal mirror 1033 onto the photosensitive drum 1001, which is uniformly charged by the primary charging unit 1002, and an electrostatic latent image pattern that conforms to a scanned image pattern is formed on the photosensitive drum 1001.

The developing unit 1004 feeds toner, to the photosensitive drum 1001, that adheres to the latent image pattern and thus provides a visible toner image.

A recording medium P is so fed that its forward edge corresponds to the position of the top of the visible toner image, and the toner image is transferred from the photosensitive drum 1001 to the recording medium P by a transfer charging unit 1006.

A fixing unit 1010 performs thermal fixing on the recording medium P that bears the toner image, and fixes the toner image to the recording medium P.

In this embodiment, a surface potential sensor S1 is provided upstream of the developing unit 1004 of the photosensitive drum 1001, so that the control unit 1200 can control both a grid potential of a grid 1002a, of the primary charging unit 1002, and a development bias potential, which is to be applied to the developing unit 1004.

Further, the detection unit 1050, which incorporates the LED 1052 and the photosensor 1051, is located downstream of the developing unit 1004.

Figure 3:
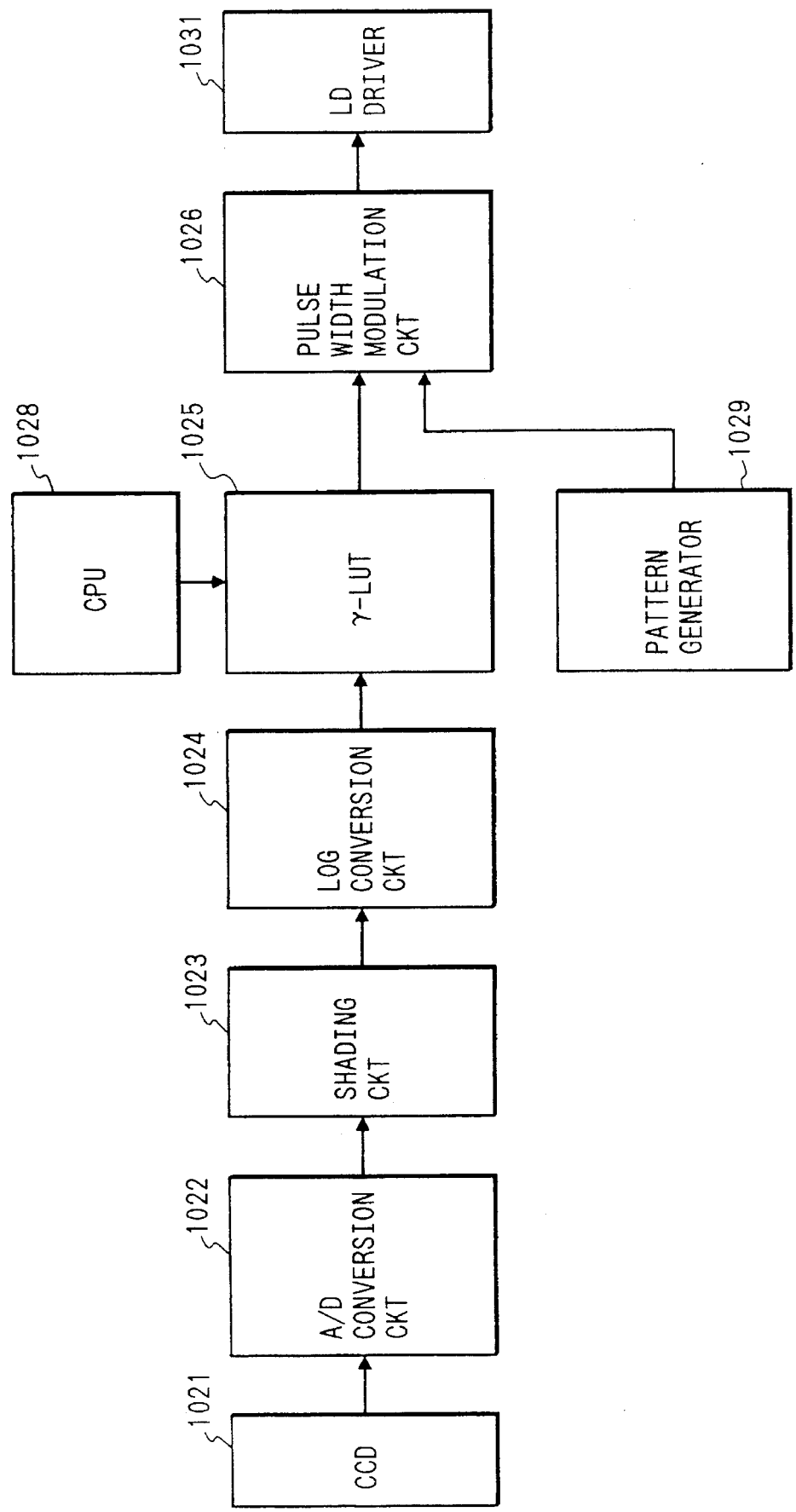
FIG. 3 is a block diagram illustrating the transmission of an image signal in the image processing apparatus of the first embodiment.

The transmission in this embodiment of an image signal, from its initiation at the CCD 1021 up until the emission of the laser beam 1003, will now be described while referring to FIG. 3.

A light quantity signal that is obtained by the CCD 1021 is digitized by the A/D conversion circuit 1022. To eliminate the sensitivity shift of each sensor cell of the CCD 1021, which are arranged in a row, a shading circuit 1023 optimizes a gain and multiplies the digitized signal by the gain for each sensor cell.

A LOG conversion signal 1024 then converts the resultant signal from a luminance scale signal into a density scale signal. Following this, gradation conversion of the density signal is performed by a rewritable γ-LUT 1025 under the control of the CPU 1028. The signal is then modulated by a pulse width modulation circuit 1026 into a signal that indicates a light emitting time for the laser beam 1003. The signal is transmitted to a laser driver 1031 to drive the semiconductor laser 1032.

Figure 8:
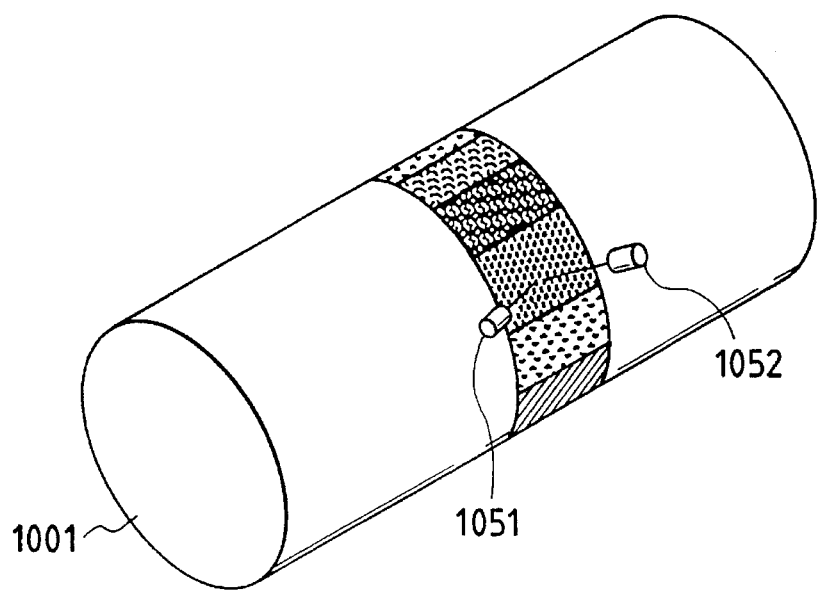
FIG. 8 is an explanatory diagram for the reading of a gradation patch pattern.

A pattern generator 1029 is mounted in the image processing apparatus in this embodiment. A gradation pattern that is shown in FIG. 8 is registered in the pattern generator 1029 so that a signal is sent directly to the pulse width modulation circuit 1026.

The function of the γ-LUT 1025 will now be explained.

Figure 5:
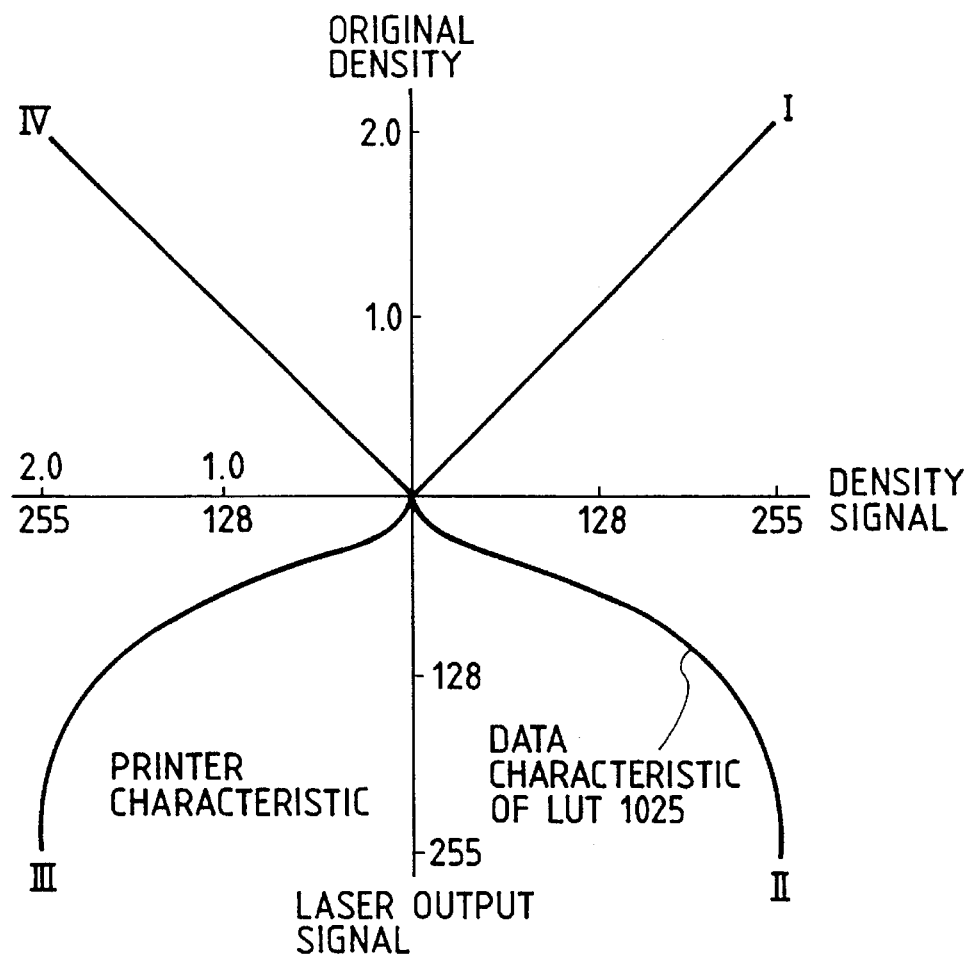
FIG. 5 is a quadrant chart showing tone reproduction characteristics.

FIG. 5 is a quadrant chart showing the characteristics when the density of the original document image is reproduced.

Quadrant I represents the characteristic of an image reading device that converts the density of the document into a density signal, and quadrant II represents the characteristic of the γ-LUT 1025 that converts a density signal into a laser output signal. Quadrant III shows the characteristic of a printer that converts a laser output signal into a density to be output. Quadrant IV shows the relationship between the document density and a recording density, which is a combination of the gradation characteristics for the copy machine of this embodiment.

Since in this embodiment the gradations are processed by using an 8-bit digital signal, 256 gradations are available.

In the image processing apparatus, the curved portion of the recording characteristic of the printer in quadrant III is corrected by the γ-LUT 1025 in quadrant II to obtain the linear gradation characteristic in quadrant IV, as is shown in FIG. 5.

The γ-LUT 1025 is easily provided by simply exchanging the input/output relation of the characteristic in quadrant III.

Figure 4:
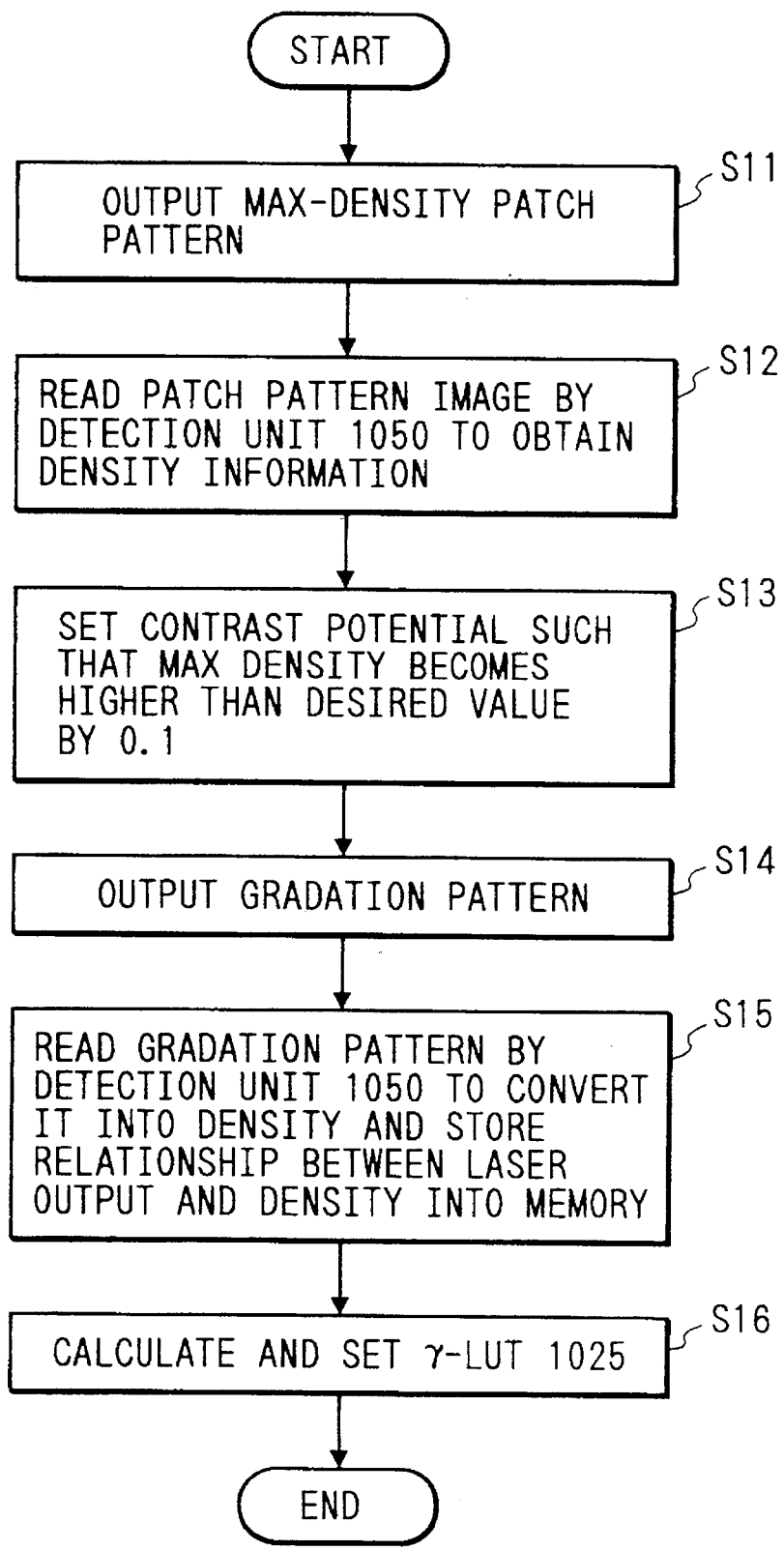
FIG. 4 is a flowchart showing control processing for the image processing apparatus of the first embodiment.

FIG. 4 is a flowchart for this embodiment.

Figure 6A:
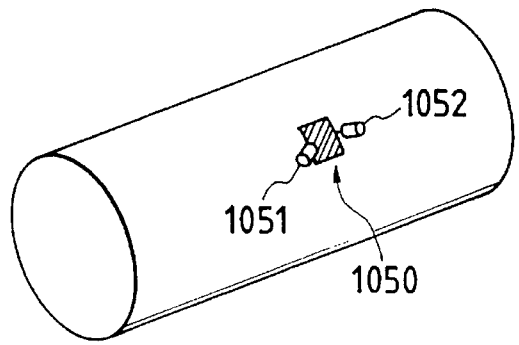
FIG. 6A is an explanatory diagram for the reading of a patch pattern that has a maximum density.
Figure 6B:
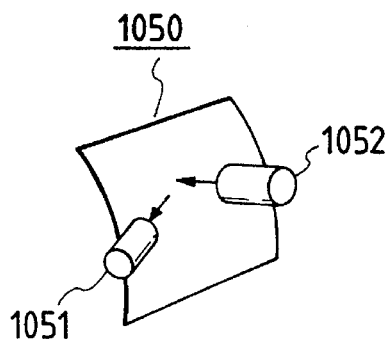
FIG. 6B is a partially enlarged diagram of FIG. 6A.

When the control process is begun, a patch pattern with the maximum density is output to the photosensitive drum 1001, as is shown in FIG. 6A (S11). At this time, the recording medium P has not yet passed through (S11). FIG. 6B is a partially enlarged diagram of FIG. 6A.

When the output patch pattern arrives at a position opposite the detection unit 1050, the detection unit 1050 ascertains the intensity of the light that is reflected by the patch pattern image. The density conversion circuit 1041 converts the measured intensity of the reflected light into image density information. In the density conversion circuit 1041 employed in this embodiment, the light emitting peak and the light receiving peak of the LED 1052 and the photosensor 1051 are 960 nm.

Figure 7:
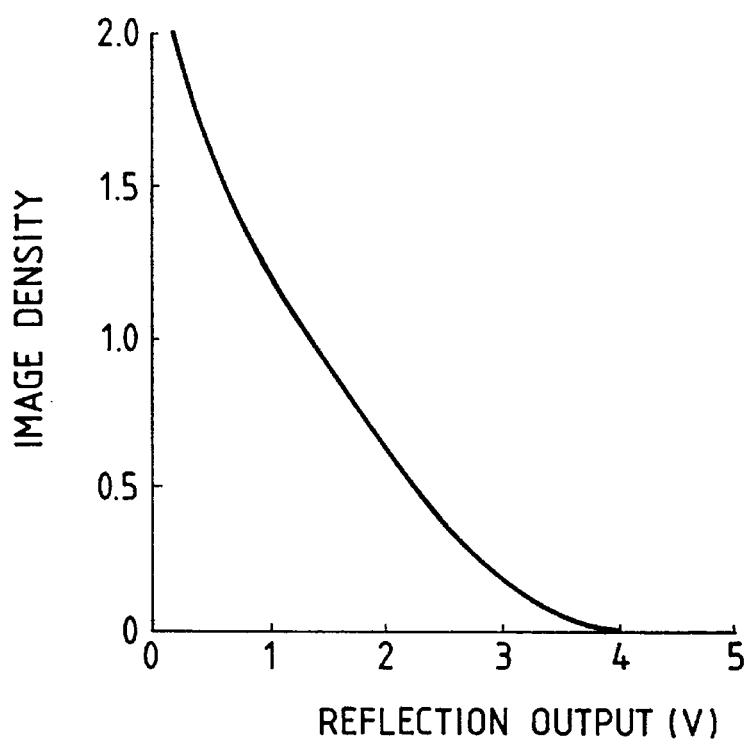
FIG. 7 is a graph showing the relationship between a reflection output and an image density according to the first embodiment.

A characteristic of toner, because it contains carbon black, is that it absorbs light at 960 nm. Therefore, as is shown in FIG. 7, as the amount of toner that is attached grows and the image density increases, the intensity of the light that is reflected decreases. The photosensitive drum 1001 is so set that its measured output is 4 V when there is no toner adhering to its surface.

The density conversion circuit 1041 converts the intensity of the light that is reflected, which has the above described characteristic, into image density information for an image that is to be formed on a recording medium P (S12).

When the measured density is considerably lower than the set level, it is possible that it will be assumed that there is some kind of printer malfunction and that an error message that specifies a maintenance procedure will be displayed on a console panel (not shown), and that subsequently the control process will be halted.

A method for correcting the maximum density will now be explained.

Figure 9:
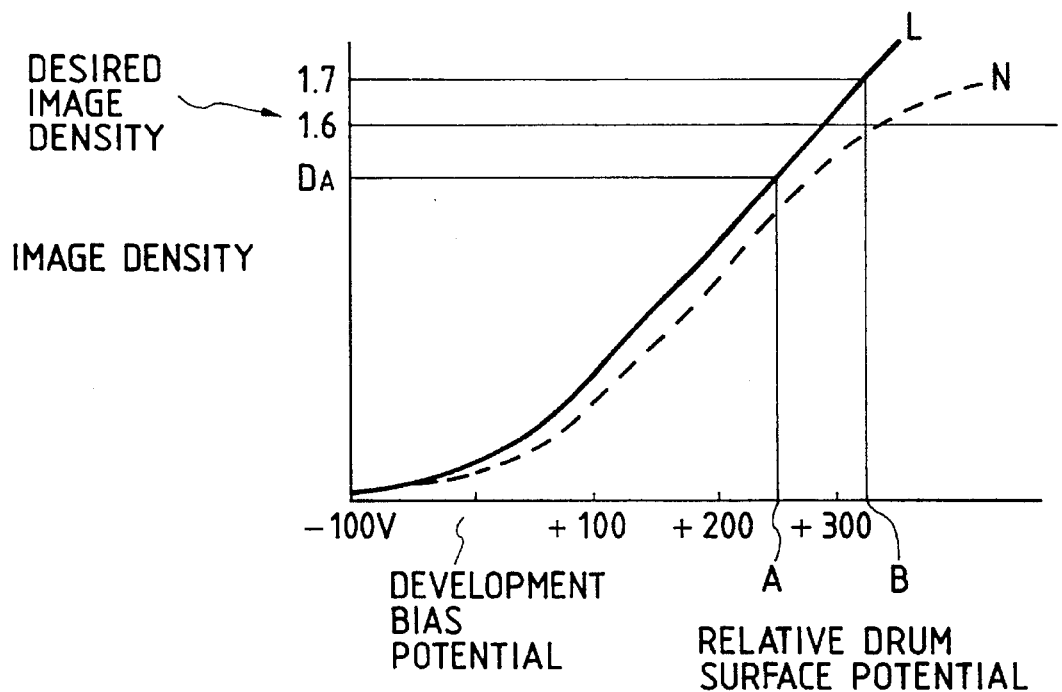
FIG. 9 is a graph showing the relationship between the relative surface potential of a drum and an image density.

A graph in FIG. 9 shows the relationship between the relative surface potential of a drum and the image density.

When the difference between a currently used contrast potential, i.e., a development bias potential, and the surface potential of the photosensitive drum 1001, after the primary charging has been performed and the intensity of the laser beam 1003 has reached the maximum level, is the maximum density $D_A$, which is obtained from the setting A, in most cases the image density in the maximum density area is linear, as is indicated by the solid line L, relative to the relative surface potential of the drum.

For two-component developing toner, the toner density in the developing unit fluctuates. When the toner density is reduced, the relationship between the image density and the relative surface potential of the drum is sometimes non-linear in the maximum density area, as is indicated by the broken line N.

In this embodiment, although the desired maximum density value is 1.6, by providing a margin of 0.1, 1.7 is set as the maximum density target value that is employed to determine the amount of adjustment that is required.

Contrast potential B is acquired by the following expression:

$$B = A \times 1.7 / D_A$$

Based on the relationship between the grid potential of the primary charging unit 1002 and the surface potential of the photosensitive drum 1001, a method for acquiring the grid potential and the development bias potential from the contrast potential will now be briefly described.

Figure 10:
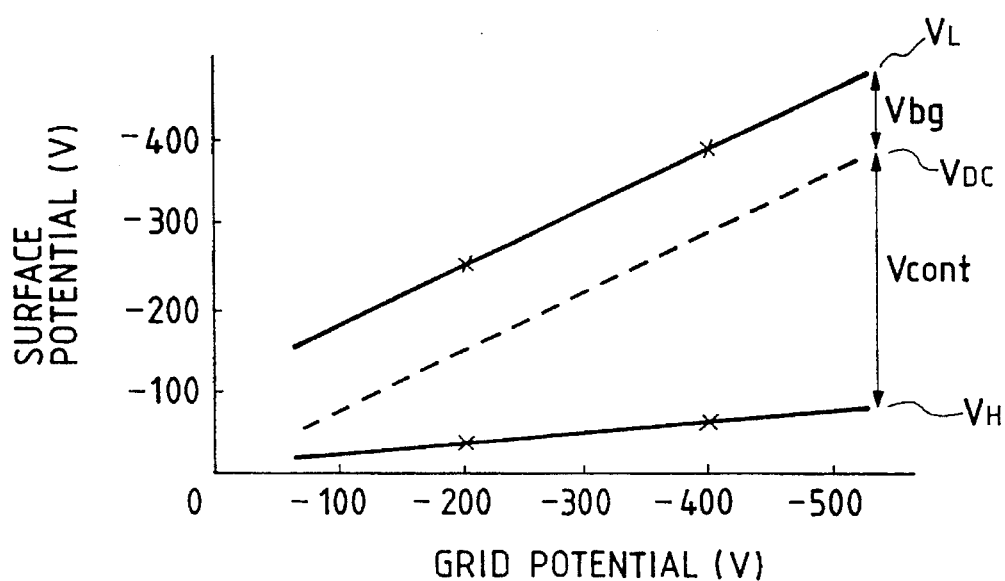
FIG. 10 is a graph showing the relationship between a grid potential and a surface potential.

A graph in FIG. 10 shows the relationship between the grid potential and the surface potential of the photosensitive drum 1001.

Surface potential $V_L$, which has a grid potential of −200 V when the laser beam 1003 scans at the lowest level, and surface potential $V_H$, which has a grid potential of −200 V when the laser beam 1003 scans at the highest level, are measured by a surface potential sensor $S_1$. The surface potentials $V_L$ and $V_H$, which both have grid potentials of −400 V are also so measured.

Data for −200 V and for −400 V are interpolated or extrapolated to acquire the relationship between the grid potential and the surface potential.

By referring to $V_L$, the difference, $V_{bg}$, which is so set that fogging toner will not be attached to an image (set to 100 V in this embodiment), is employed to set the development bias potential $V_{DC}$.

The contrast potential $V_{cont}$ is a differential voltage between the development bias potential $V_{DC}$ and the surface potential $V_H$. As described above, the greater the contrast potential $V_{cont}$, the greater the maximum density becomes.

To set the contrast potential $V_{cont}$ to the contrast potential B that is acquired by calculation, the relationship in FIG. 10 is referred to and the required grid potential and development bias potential are calculated.

At S13 in FIG. 4, the contrast potential is calculated so that the maximum density is higher by 0.1 than the target value, and the grid potential and the development bias potential are set so as to obtain the calculated contrast potential.

Then, a gradation pattern shown in FIG. 8 is output. The γ-LUT 1025 must not act on this output (S14 in FIG. 4).

When the gradation pattern arrives at a position opposite the detection unit 1050, it measures the intensity of the light reflected by the gradation pattern, and the reflected light intensity measurement is then converted into density information by the density conversion circuit 1041.

In consonance with the laser output level and the position for forming a gradation pattern, the relationship between the laser output level and the read-out and corrected density value is stored in a memory (S15).

The printer characteristic represented in quadrant III in FIG. 5 can be acquired at this time. The input/output relationship of the printer characteristic is inverted, so that a value for the γ-LUT 1025 of this printer can be determined and set (S16 in FIG. 4).

Since there are data only for the number of gradations of a patch pattern when the value for the γ-LUT 1025 is to be calculated, missing data must be produced by interpolation so that the laser output level can correspond to all the levels from 0 to 255 of the density signal.

Figure 11:
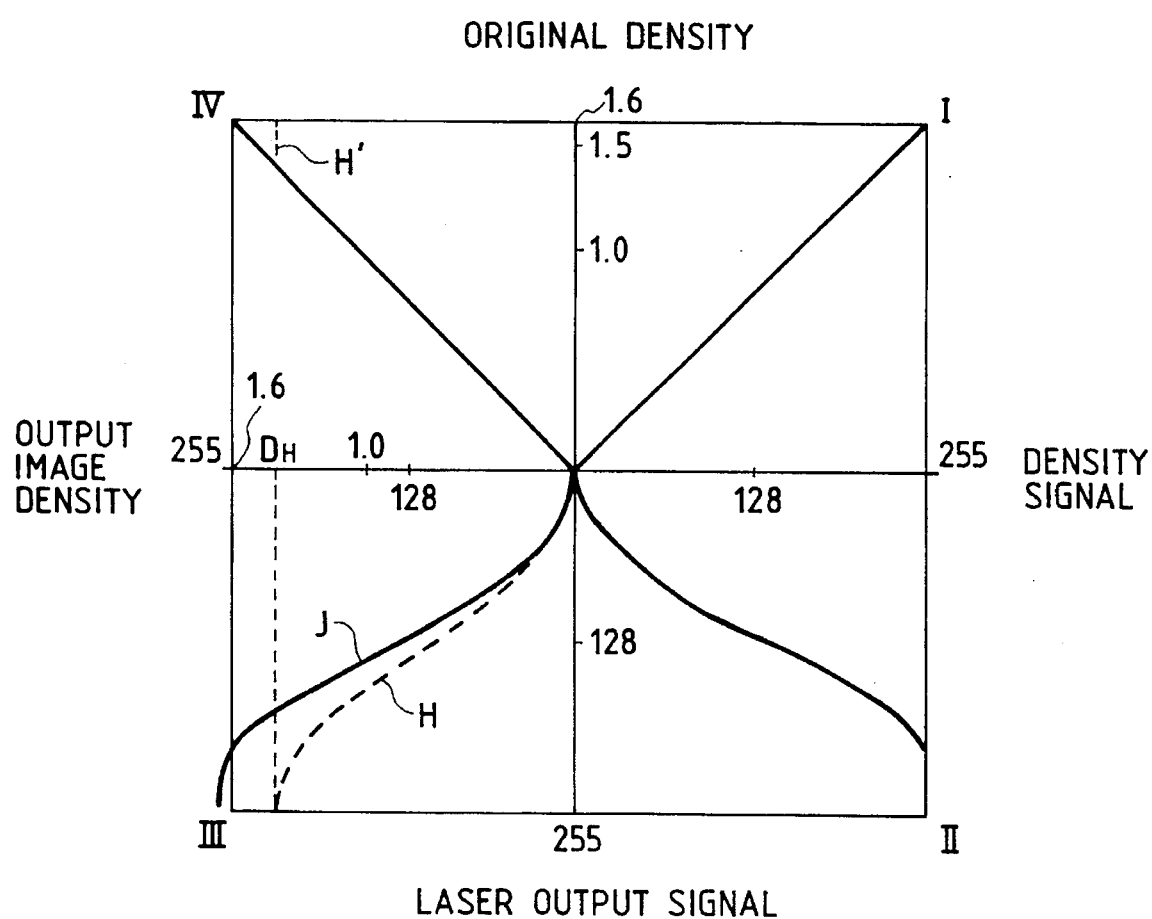
FIG. 11 is a quadrant chart showing tone reproduction characteristics.

FIG. 11 is a diagram for the density conversion characteristic. By employing the maximum density control in this embodiment, which sets the maximum density to a level that is higher than a desired level, the printer characteristic that is indicated by the solid line J in quadrant III is obtained.

If such a control is not performed, the printer characteristic may be the one shown where the maximum density does not reach 1.6, as is indicated by the broken line H. Since, for the characteristic indicated by the broken line H, the γ-LUT 1025 is not capable of increasing the maximum density no matter how the γ-LUT 1025 may be set, an image having a density value that lies between the densities $D_H$ and 1.6 cannot be reproduced.

In other words, even if gradation adjustment is performed, the density reproduction reaches the uppermost limit where the density is high, as is indicated by the broken line H' in quadrant IV.

If, as is shown by the solid line J, the target value is set to a value that slightly exceeds the maximum density, allocation of the full density reproduction range is ensured for the total gradation characteristic in quadrant IV.

When the above described control is terminated, a message such as "copy capable" is displayed on the operational panel, and the image processing apparatus is set so that it is ready for copying.

During copying, since the contrast potential calculated by the above described method and the γ-LUT 1025 are set, steady output density is ensured in the high density area, and a desired linear gradation relative to the density output signal can be obtained. By periodically performing the above described control process, image forming that provides excellent gradation is ensured for an extended period of time.

<Second Embodiment>

An explanation of this embodiment will now be given by employing an image processing apparatus that forms an image with full color gradation.

Figure 12:
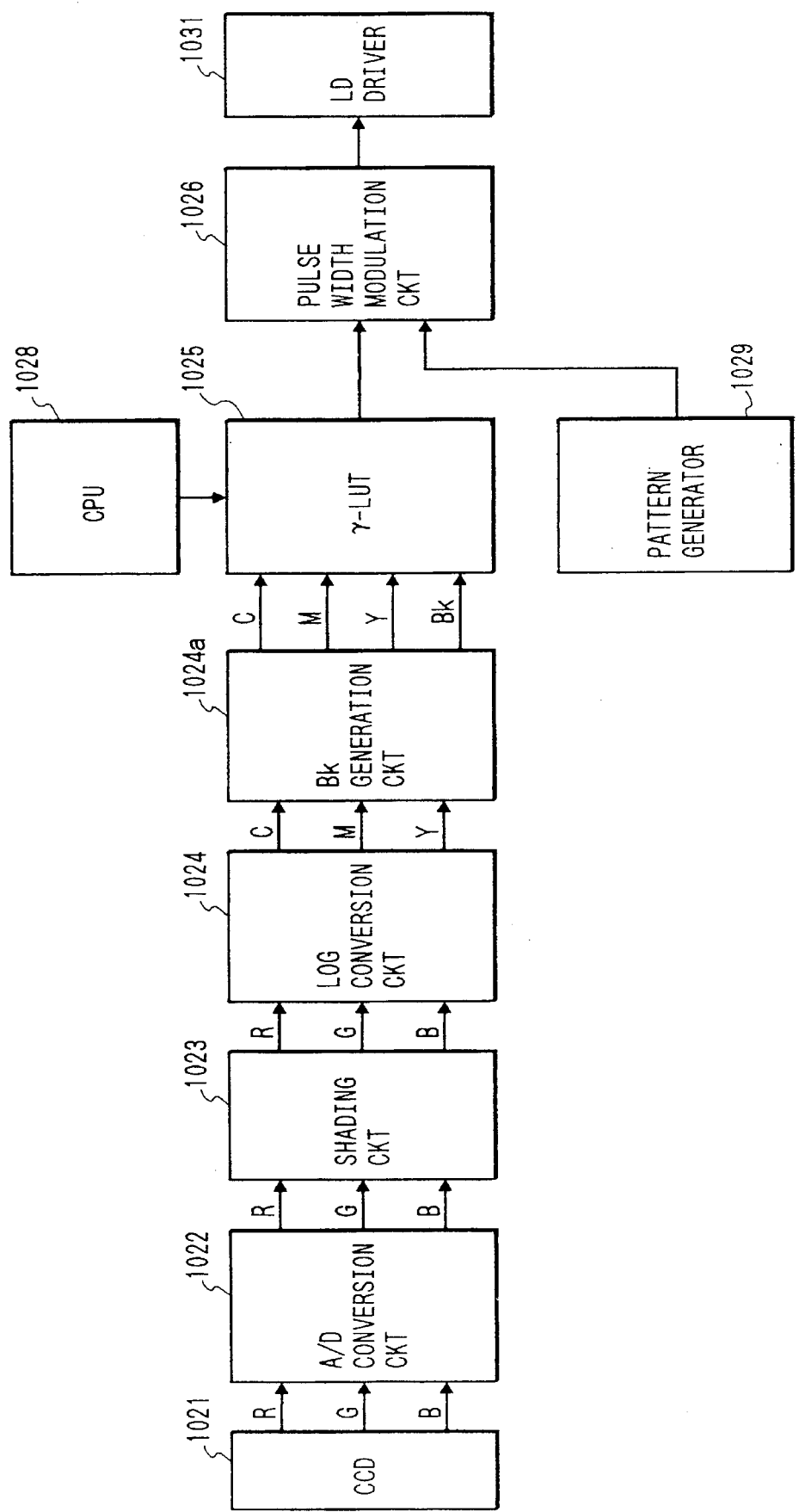
FIG. 12 is a block diagram showing the transmission of an image signal in an image processing apparatus according to a second embodiment of the present invention.
Figure 13:
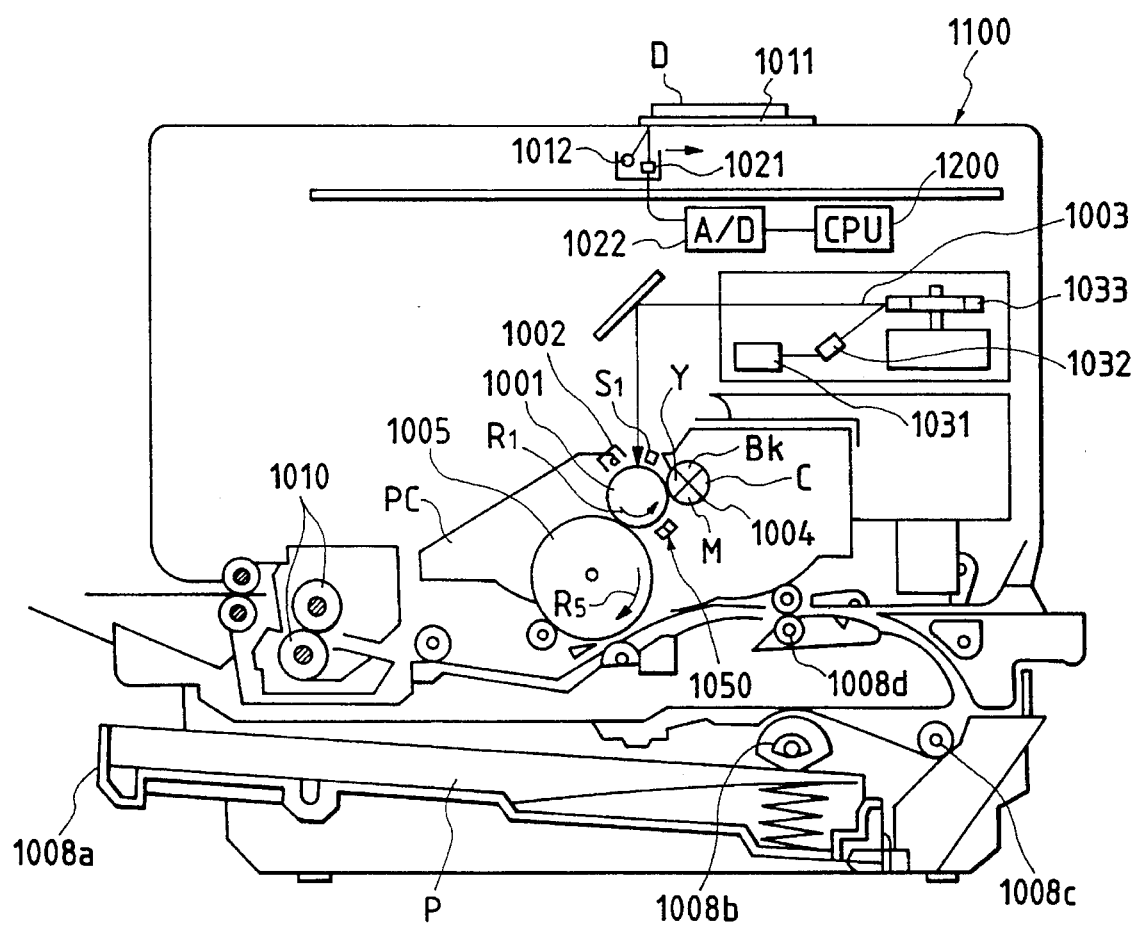
FIG. 13 is a vertical cross sectional view of the schematic arrangement for the image processing apparatus according to the present invention.

FIG. 12 is a block diagram for this embodiment, and FIG. 13 is a diagram showing the arrangement of this embodiment.

In FIG. 13, reference number 1100 denotes the body of an image processing apparatus.

The document D that is placed on the original support glass 1011 is irradiated by a light source 1012, and a light quantity signal is acquired by a CCD 1021. The signal is converted into a digital signal by an A/D converter 1022, and image data is sent to a control unit 1200.

The image signal is converted into a drive signal for a semiconductor laser 1032 and the drive signal is output to a laser driver 1031.

The laser driver 1031 is a circuit that both drives and switches the semiconductor laser 1032 ON and OFF in consonance with a received video signal.

A laser beam 1003 is divided into a right beam and a left beam by a polygonal mirror 1033 and is employed to scan a photosensitive drum 1001. As it is scanned by the laser beam 1003, the photosensitive drum 1001, which bears a latent image, is rotated in the direction indicated by R1. This rotation enables the rotary developing unit 1004 to perform a development process for each color (the yellow development process is shown in FIG. 13).

A recording medium P that is stocked in a paper feed cassette 1008a is supplied via a supply roller 1008b, a feed roller 1008c, a resist roller 1008d, etc., to a transfer drum 1005, and is wrapped around the transfer drum 1005. With each rotation thereafter of the transfer drum 1005, one color, either Y (yellow), M (magenta), C (cyan), or Bk (black), is transferred, in the order given, to the recording medium P. During a total four rotations of the transfer drum 1005, the four colors are transferred and the color recording is thereafter terminated. When the color transfer process is completed, the recording medium P is separated from the transfer drum 1005. The toner image is fixed to the recording medium P by paired fixing rollers 1010, and color image printing is completed.

A detection unit 1050 is located downstream of the developing unit 1004.

The transmission of an image signal will be explained while referring to FIG. 12.

A reading device employs three color separation filters, an R (red) filter, a G (green) filter, and a B (blue) filter, to acquire RGB information.

The color information is converted into digital signals by an A/D conversion circuit 1022, and the digital signals are sent to a shading circuit 1023 where the digital signals that correspond to cells of the CCD 1021 are adjusted.

Luminance signals for RGB are converted into density information for CMY by a LOG conversion circuit 1024.

Then a signal for black is generated by a Bk generation circuit 1024a, so that the data for four colors, MCYBk, are produced.

Gradation adjustment is performed by a γ-LUT 1025, and a laser is driven by a pulse width modulation circuit 1026 and the LD driver 1031.

The toner colors employed for a copy machine in this embodiment are yellow, magenta, cyan, and black. Color material is dispersed in styrene copolymerized resin, which is employed as a binder, to obtain the colors yellow, magenta, and cyan. These three colors are mixed to provide black toner.

The spectral characteristics of the yellow, the magenta, the cyan, and the black toner are represented in FIGS. 16 through 19, respectively. A reflectance of 80% or greater can be obtained at 960 nm for each toner. A two-component development method that ensures color purity and light transmittance is employed for image forming with color toners.

The photosensitive drum 1001 is an OPC drum, and its reflectance is about 40% at 960 nm.

Figure 14:
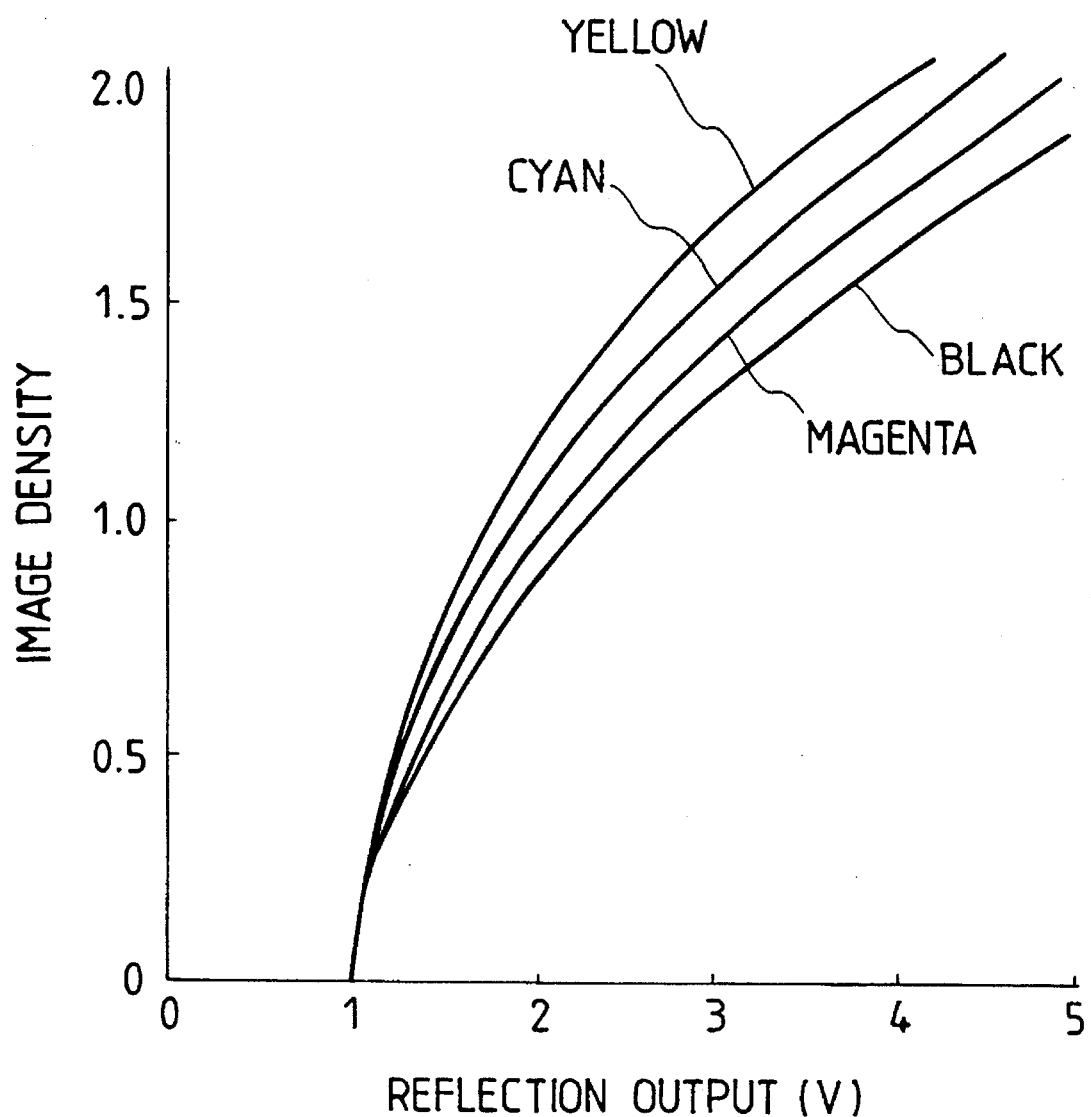
FIG. 14 is a graph showing the relationship between a reflection output and an image density according to the second embodiment.

As more toner is attached to the photosensitive drum 1001 in consonance with these characteristics, the reflection output is increased, so that the relationship between the image density and the reflection output is as shown in FIG. 14. Since the color materials have different reflection rates, a density conversion circuit 1041 is required for each color. In this embodiment, the reflection output of the photosensitive drum 1001 with no toner attached thereto is set at 1 V.

Figure 15:
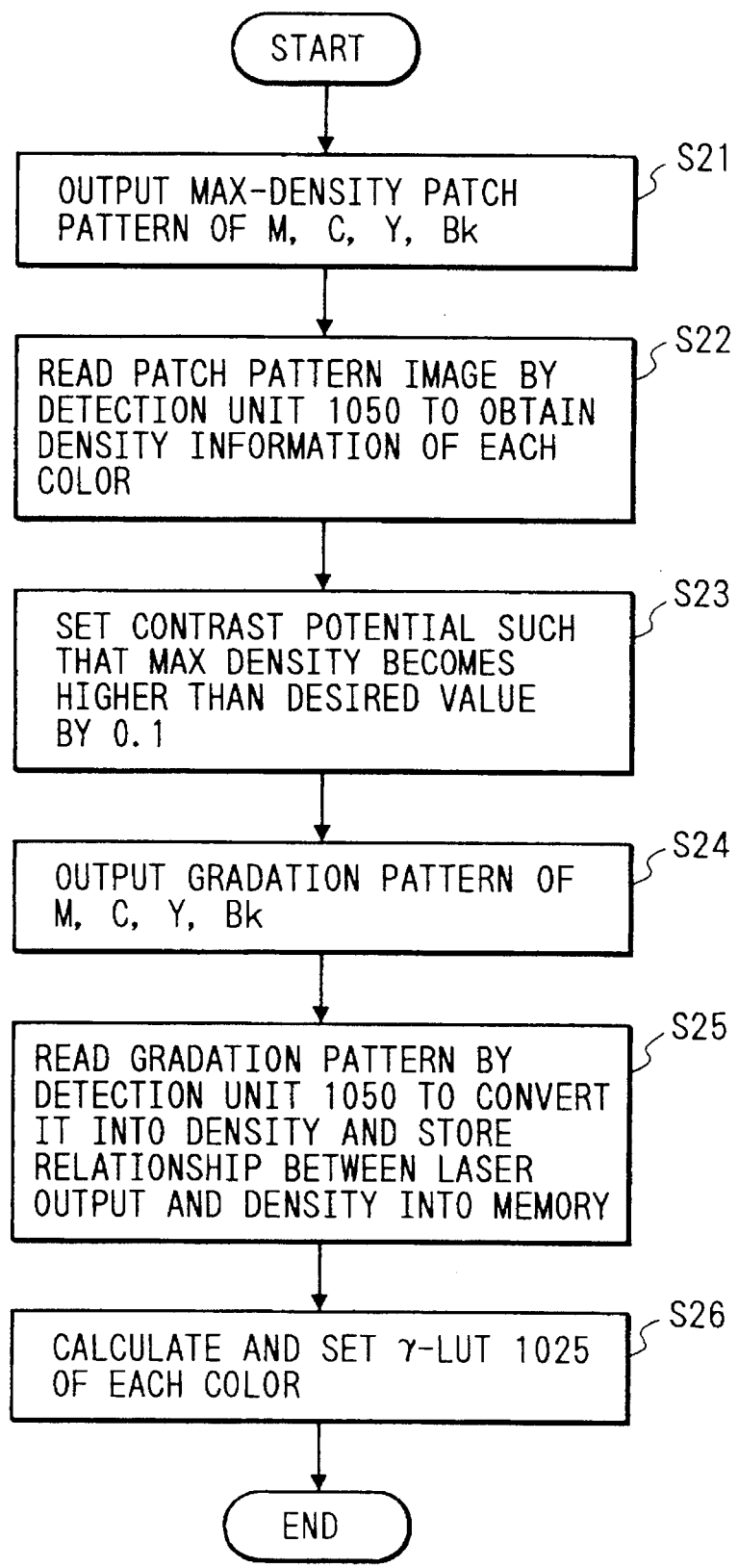
FIG. 15 is a flowchart for control processing for the image processing apparatus of the second embodiment.
Figure 16:
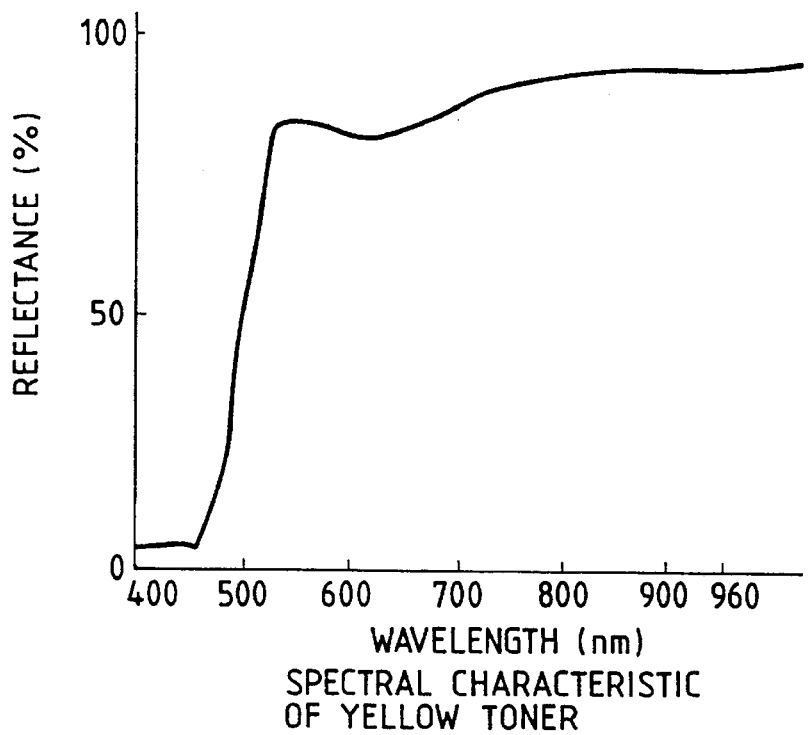
FIG. 16 is a graph representing the spectral characteristic of yellow toner according to the second embodiment.
Figure 17:
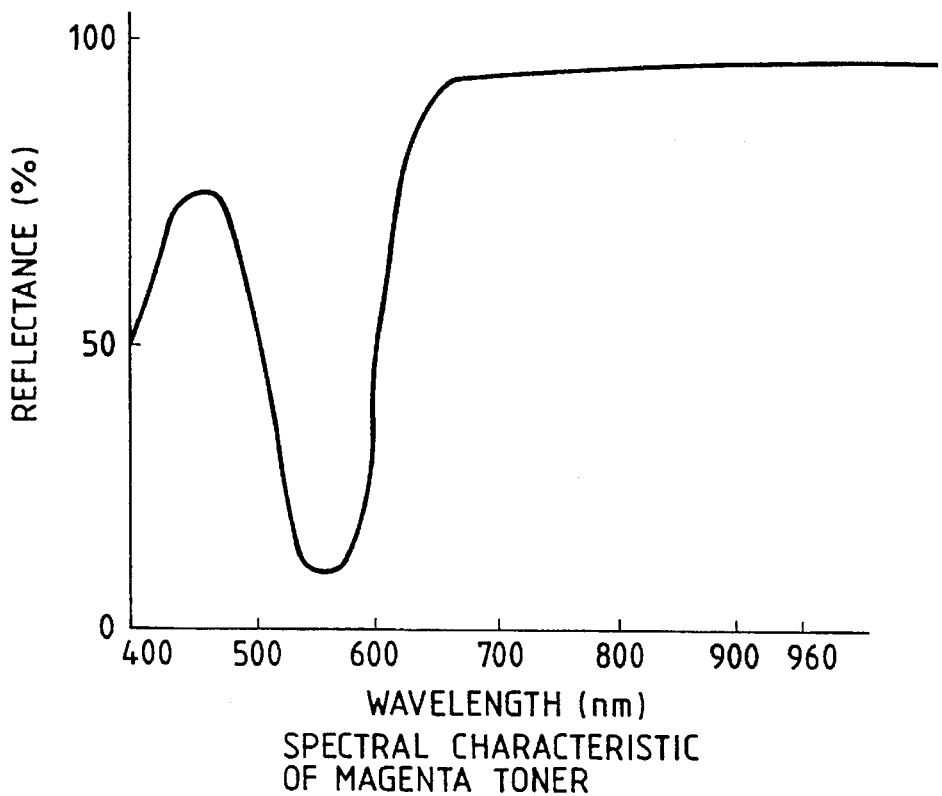
FIG. 17 is a graph representing the spectral characteristic of magenta toner according to the second embodiment.
Figure 18:
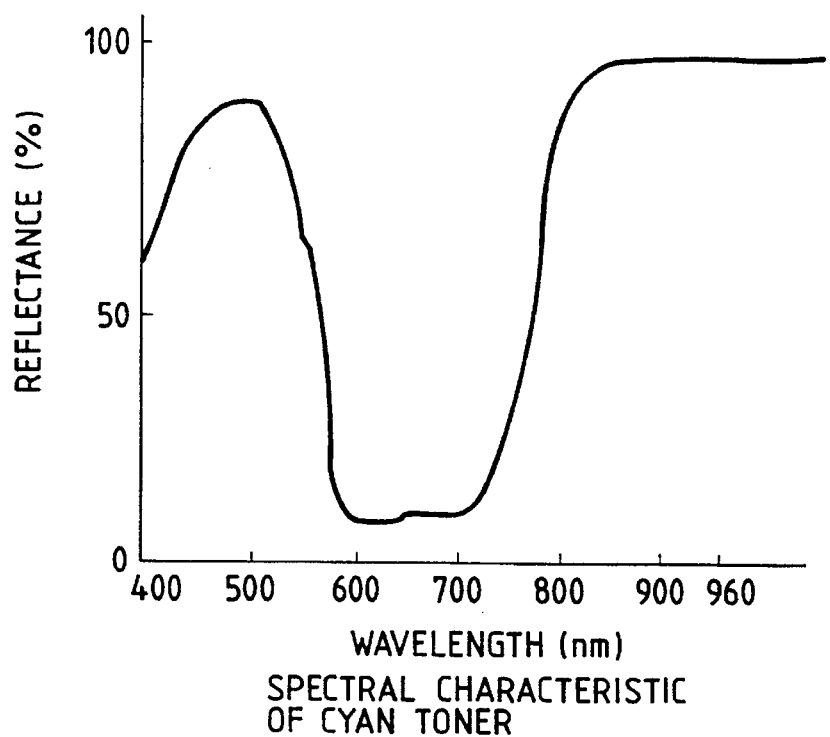
FIG. 18 is a graph representing the spectral characteristic of cyan toner according to the second embodiment.
Figure 19:
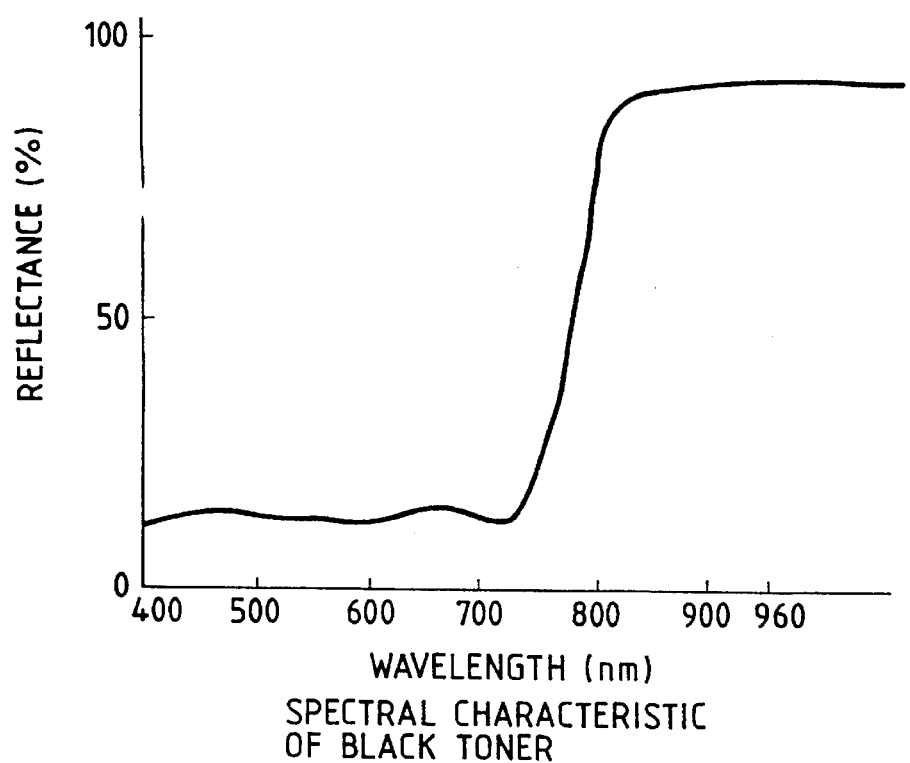
FIG. 19 is a graph representing the spectral characteristic of black toner according to the second embodiment.

The contrast potential $V_{cont}$ and the setting for the γ-LUT 1025 for each color can be provided by performing the process shown in the flowchart in FIG. 15.

First, as a pattern for maximum density control, the maximum density output patch pattern for each color is output to the photosensitive drum 1001, as is shown in FIG. 15 (S21).

The reflection output value for the output gradation pattern is acquired by the detection unit 1050, and is converted into density information by the density conversion circuit 1041, and the contrast potentials for the individual colors are so set that their maximum density is higher by 0.1 than a target value (S22 and S23).

As is shown in FIG. 8, the gradation pattern for each color is generated by a pattern generator 1029 and is formed on the photosensitive drum 1001 (S24).

The reflection output value for the output gradation pattern is acquired by the detection unit 1050, and is converted into density information by the density conversion circuit 1041.

Then, the relationship between the laser output level and the obtained density is stored in a memory (S25).

According to the relationship between the laser output level and the density, the setting for the γ-LUT 1025 for each color is calculated and set (S26).

When the above described process is terminated, a message, "copy capable" is displayed on a console panel. The copy machine is ready to begin copying.

During the copying process, an image density signal that is acquired by a document reading unit 1201 is converted via the setting for the γ-LUT 1025, which is calculated by the above method, so that a desired linear gradation relative to a laser output signal can be provided.

By periodically performing the above described process, an image of high quality that has excellent gradation and good gray balance can be formed even after an apparatus has been in use for an extended period of time.

Although in the embodiments, the photosensitive drum 1001 has been employed as an image holder for an image processing apparatus, an image holder is not limited to the photosensitive drum 1001, and may be, for example, a photosensitive sheet or a photosensitive belt that has a photosensitive layer on its surface.

As described above, according to the first and second embodiments, the initial, desired output density range of an image processing apparatus can be maintained for a long period, and stable gradation characteristics for print effects that range from highlighting to shadowing is also ensured.

<Third Embodiment>

A third embodiment of the present invention will now be described in detail while referring to the accompanying drawings.

Figure 20:
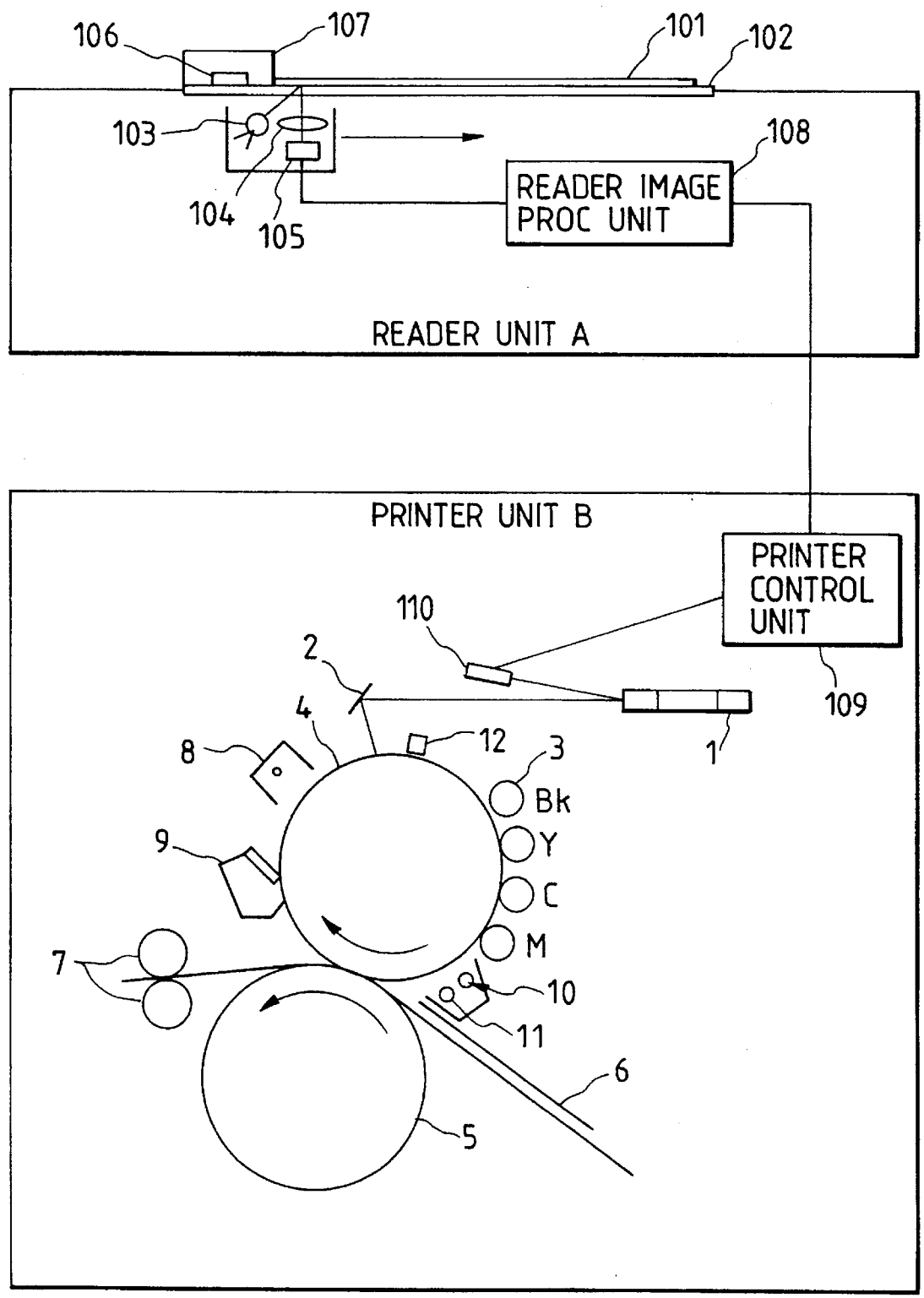
FIG. 20 is a cross sectional view of the arrangement for an image processing apparatus according to a third embodiment of the present invention.

FIG. 20 is a diagram illustrating the arrangement of an image processing apparatus according to the third embodiment.

A full-color image forming method will now be described.

An original document 101 that is placed on an original support glass 102 is irradiated by a light source 103 and an image is focused on a CCD sensor 105 via an optical system 104. The CCD sensor 105 generates red, green, and blue color element signals for each line sensor by using a CCD line sensor group for red, green, and blue, which are arranged in three rows.

These optical reading units scan the document in the direction indicated by the arrow and convert each line that is scanned into a electric signal data row.

On the original support glass 102 are provided an abutting member 107, upon which the edge of the document abuts to prevent the improper positioning of the document, and a standard white plate 106, which is employed to determine a white level of the CCD sensor 105 and to perform shading in the thrust direction of the CCD sensor 105.

A reader image processing unit 108 processes an image signal that is acquired by the CCD sensor 105, and transmits the resultant signal to a printer unit B, in which a printer control unit 109 processes the received signal.

The image processing unit 108 will now be described.

Figure 21:
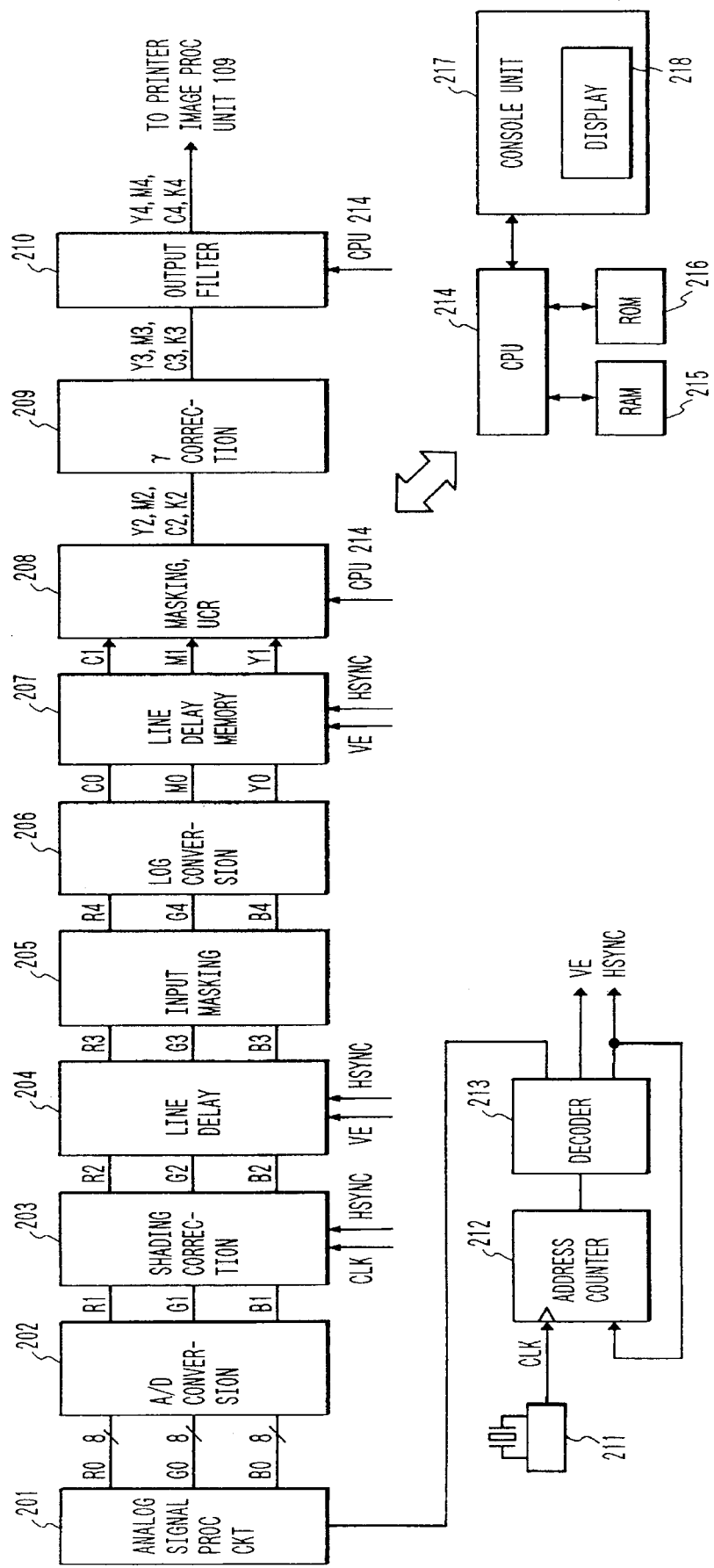
FIG. 21 is a block diagram showing the structure of a reader image processing unit 108 according to the third embodiment.

FIG. 21 is a block diagram showing the transmission flow of an image signal in the image processing unit 108 of a reader unit A according to the embodiment. As is shown, an image signal output by the CCD sensor 105 is input to an analog signal processing circuit 201, which in turn adjusts the gain and the offset data of the received signal. The resultant signal is then converted by an A/D converter 202 to provide an 8-bit digital image signal, R1, G1, or B1, for each color signal. The digital signal is then received by a shading correction unit 203, which performs a well known shading correction process for each color by using a signal acquired from the reading of the standard white plate 106.

A clock generation unit 211 generates a clock for each pixel. A main scan address counter 212 counts the number of clocks output by the clock generation unit 211, and produces a pixel address output for one line. A decoder 213 decodes the main scan address that is sent from the main scan address counter 212, and generates a CCD drive signal, such as a shift pulse or a reset pulse, for each line, a VE signal, which indicates a valid region for a signal that is acquired by reading one line and that is sent by the CCD, and a line sync signal HSYNC. The main scan address counter 212 is cleared by an HSYNC signal, and begins counting the clocks for the main scan address of the next line.

Since the individual line sensors of the CCD sensor 105 are mutually located at predetermined intervals, a line delay circuit 204 in FIG. 21 corrects a spatial shift in a sub-scanning direction. More specifically, line delay is performed on R and G signals in the sub-scanning direction to adjust the signals to B signal.

An input masking unit 205 converts a read color space, which is determined by the spectral characteristics of the R, G, and B filters of the CCD sensor 105, into an NTSC standard color space, and performs the following matrix calculation:

$$\begin{bmatrix} R4 \\ G4 \\ B4 \end{bmatrix} = \begin{bmatrix} a11 & a12 & a13 \\ a21 & a22 & a23 \\ a31 & a32 & a33 \end{bmatrix} \begin{bmatrix} R3 \\ G3 \\ B3 \end{bmatrix} \quad (1)$$

A light quantity/density conversion unit (LOG conversion unit) 206, which is a lookup table ROM, converts luminance signals R4, G4, and B4 into density signals C0, M0, and Y0. A black character determination unit (not shown), in a line delay memory 207, delays C0, M0, and Y0 image signals for a period that is equivalent to a line delay value until the reception of determination signals, such as UCR, FILTER, and SEN, that are generated by using R4, G4, and B4 signals.

A masking and UCR circuit 208 extracts a black signal (Bk) from the three prime color signals that are input, Y1, M1, and C1, and performs further calculations with the extracted signals to correct for the color impurities of recording color materials that are caused in the printer unit B. The masking and UCR circuit 208 then outputs, in order, Y2, M2, C2, and Bk2 signals that have a predetermined bit width (8 bits) each time the signal reading is performed.

A γ correction circuit 209 in the reader unit A corrects the density to correspond to an ideal gradation characteristic in the printer unit B. A space filter processing unit (output filter) 210 performs an edge exaggeration process or a smoothing process.

The image signals, M4, C4, Y4, and Bk4, which are processed in the order given, are sent to a printer control unit 109, of the printer unit B, where density recording is performed by PWM.

Reference number 214 denotes a CPU that controls the individual sections of the reader unit A; 215, a RAM; 216, a ROM; and 217, a console unit that has a display 218.

Figure 22:
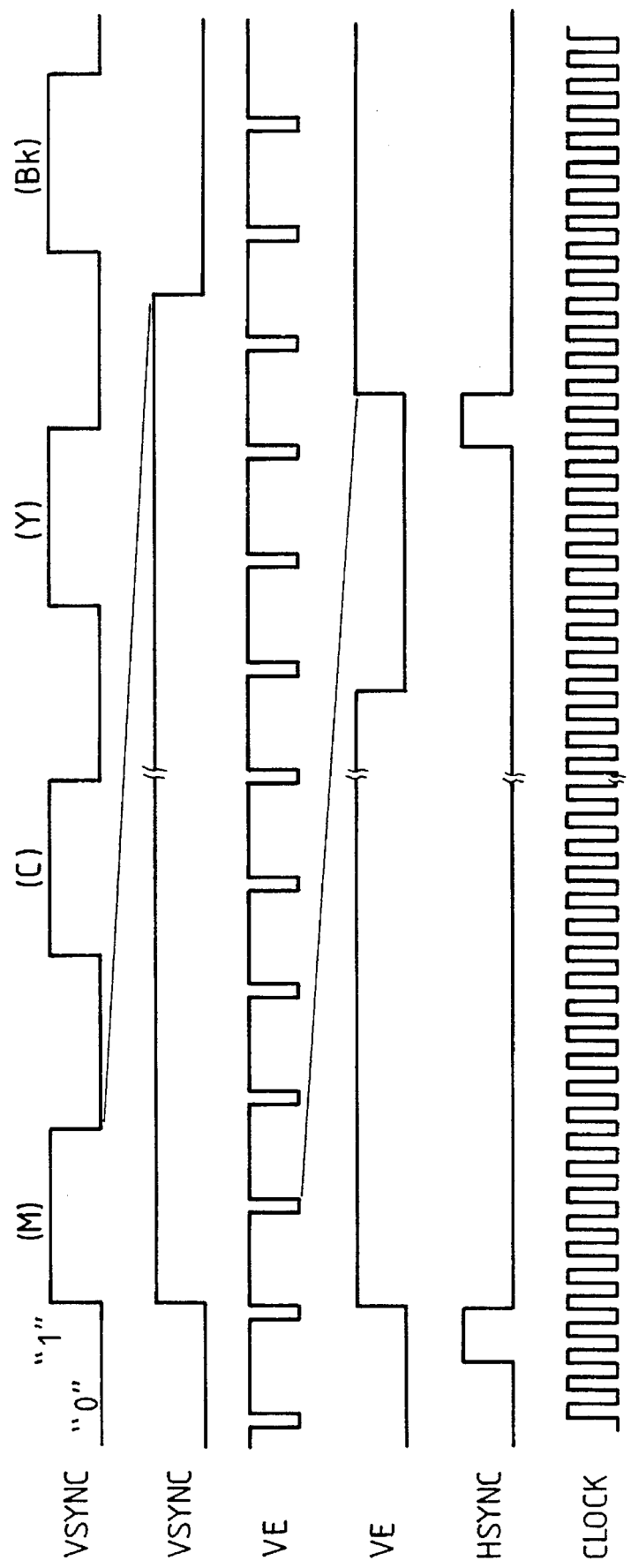
FIG. 22 is a timing chart for the reader image processing unit 108 according to the third embodiment.

FIG. 22 is a timing chart of control signals for the image processing unit 108 shown in FIG. 21. In FIG. 22, a VSYNC signal is a signal indicating an image available interval in the sub-scanning direction. Image reading (scanning) is performed in the interval of a logic "1," and output signals (M), (C), (Y), and (Bk) are sequentially generated. AVE signal is a signal indicating an image available interval in the main scanning direction. The timing for starting the main scanning is acquired in the interval of a logic "1", and is employed mainly to control the line count for the line delay. A CLOCK signal is a pixel sync signal, and is employed to translate image data at the leading edge from "0" to "1".

The printer unit B will now be explained.

In FIG. 20, the photosensitive drum 4 is uniformly charged by a primary charging unit 8.

Image data are converted into laser beams via a laser driver, which is provided in the printer image processing unit 109, and a laser light source 110, and the laser beams are reflected by a polygonal mirror 1 and a mirror 2, and are irradiated onto the uniformly charged photosensitive drum 4.

The photosensitive drum 4, on which a latent image is formed by laser beam scanning, is rotated in the direction indicated by the arrow.

Then, development of each color is performed in order by a developing unit 3.

A developer in this embodiment is a two-component toner. The developing units 3 for the individual colors, black (Bk), yellow (Y), cyan (C), and magenta (M), are arranged around the photosensitive drum 4 in the same order from the upstream direction. A developing unit 3 that corresponds to a color that is indicated by an image signal, in consonance with the latent image development timing, performs the development of a latent image that is formed on the photosensitive drum 4.

A transfer sheet 6 is wrapped around a transfer drum 5 and is rotated once each for M, C, Y, and Bk, in the named order. During four rotations, color toner images are sequentially transferred as layers onto the transfer sheet 6.

When the transfer is completed, the transfer sheet 6 is separated from the transfer drum 5. Then the toner image on the transfer sheet 6 is fixed by paired fixing rollers 7 to produce a full-color image print.

A surface potential sensor 12 for the photosensitive drum 4 is located upstream of the developing unit 3.

In addition, a cleaner 9, which removes residual transfer toner from the surface of the photosensitive drum 4, and an LED light source 10 (whose main wavelength is about 960 nm) and a photodiode 11, both of which will be described later, are provided to acquire a reflected light quantity of a toner patch pattern that is formed on the photosensitive drum 4.

Figure 23:
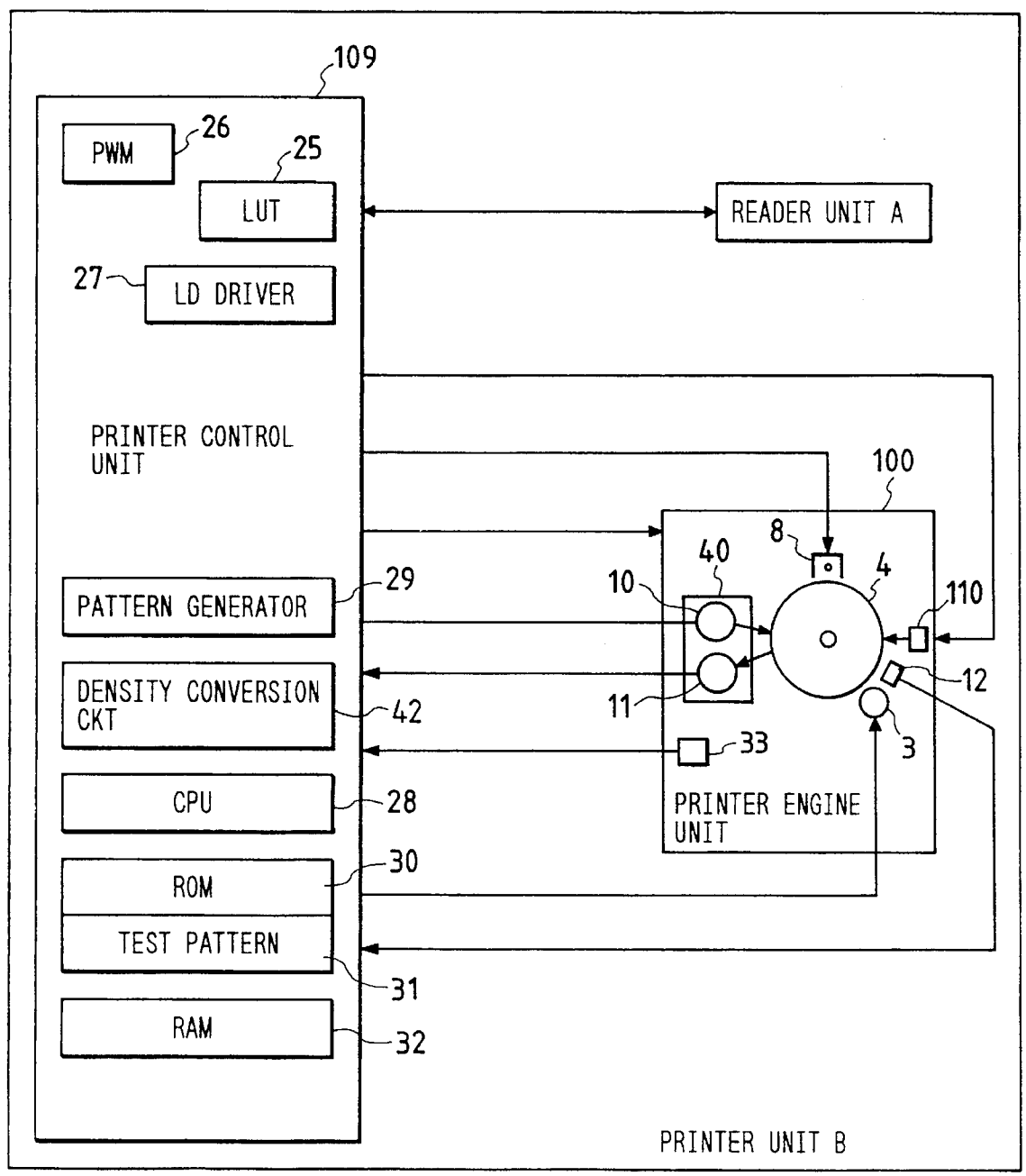
FIG. 23 is a control block diagram of the image processing apparatus of the third embodiment.

FIG. 23 is a block diagram illustrating the arrangement of an image processing apparatus according to this embodiment.

The printer image processing unit 109 includes a CPU 28, a ROM 30, a RAM 32, a test pattern storage unit 31, a density conversion circuit 42, and an LUT 25, and can communicate with the reader unit A and a printer engine unit 100.

The printer engine unit 100 controls an optical reading unit 40, which incorporates the LED 10 and the photodiode 11, the primary charger 8, the laser 101, the surface potential sensor 12, and the developing unit 3, all of which are located around the photosensitive drum 4.

In addition, an environment sensor 33, which measures the water content of the air in the machine, is provided in the printer engine unit 100.

The surface potential sensor 12 is provided upstream of the developing unit 3. A grid potential for the primary charging unit 8 and a development bias for the developing unit 3 are controlled by the CPU 28, as described above.

Figure 24:
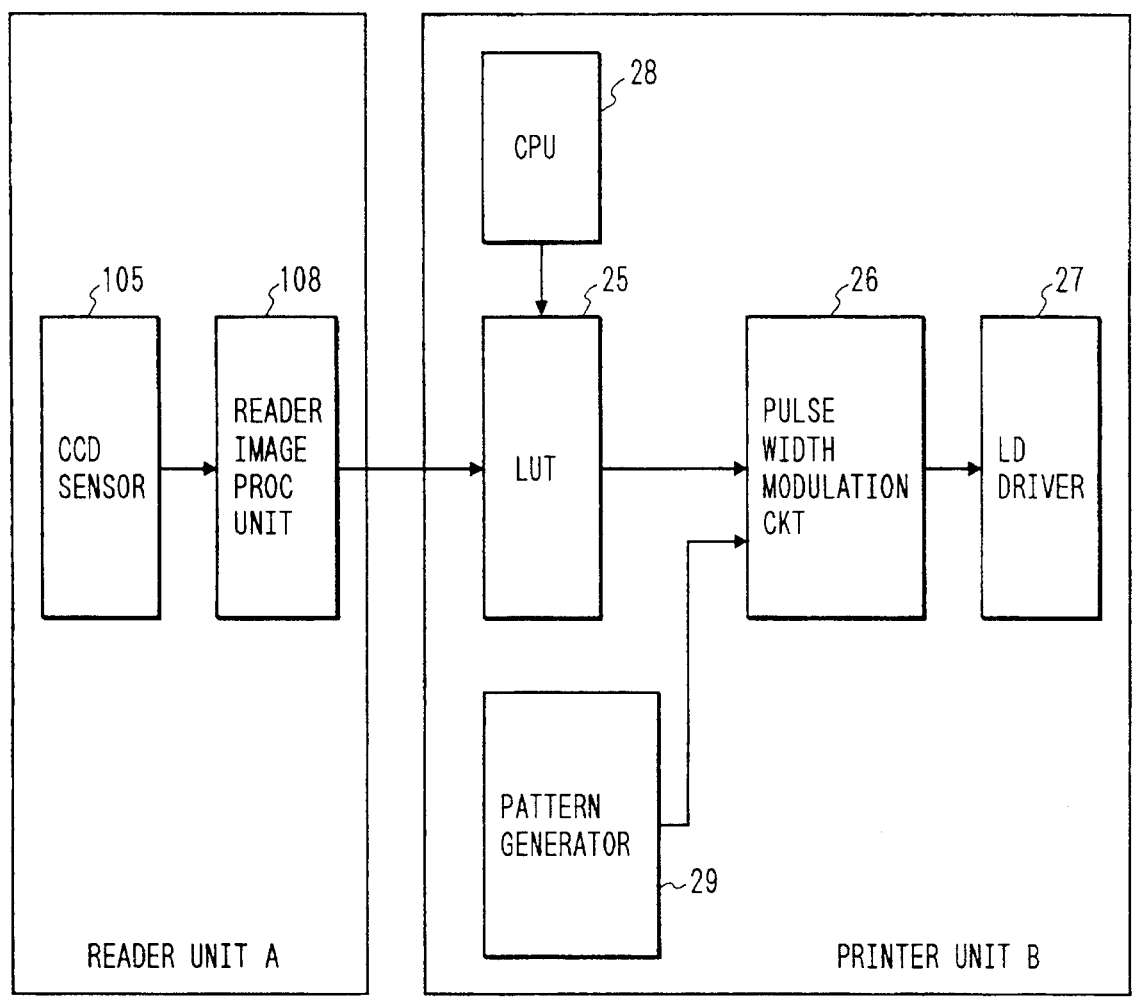
FIG. 24 is a block diagram illustrating the image processing apparatus of the third embodiment.

FIG. 24 is a diagram showing an image signal processing circuit that produces a gradated image according to the present invention.

Luminance signals for an image are acquired by the CCD 105, and are sequentially converted into image signals by the reader image processing unit 108. The density characteristic of this image signal is converted by the LUT 25 so that the density of an original image, which is indicated by an image signal that carries the γ characteristic of a printer in the initial state, matches the density of an output image.

Figure 25:
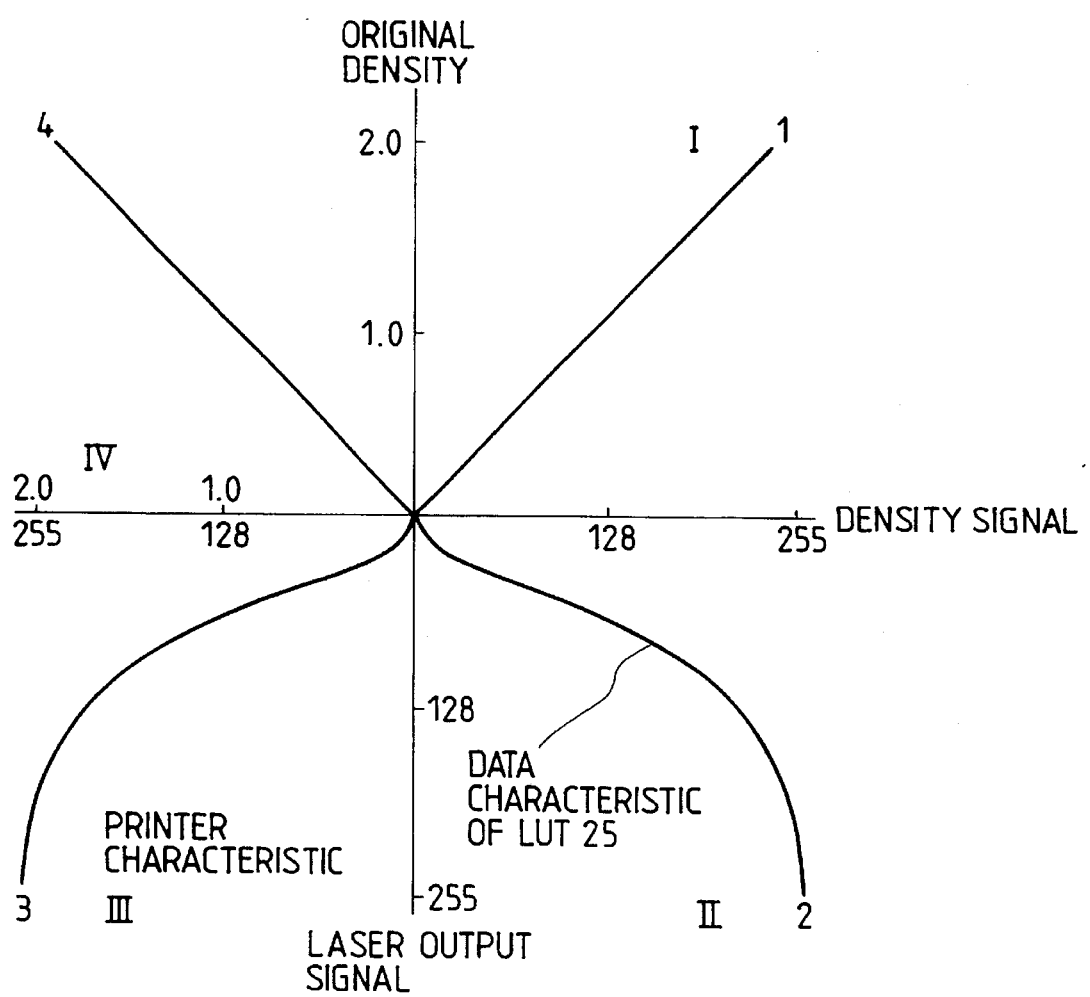
FIG. 25 is a quadrant chart showing tone reproduction characteristics.

FIG. 25 is a quadrant chart showing the state where the density of the original document image is reproduced.

Quadrant I represents the reading characteristic of the reader unit A that converts the density of the document into a density signal, and quadrant II represents the characteristic of the LUT 25 that converts a density signal into a laser output signal. Quadrant III shows the recording characteristic of the printer unit B that converts a laser output signal into a density to be output. Quadrant IV shows the total tone reproduction characteristic of the image processing apparatus that represents the relationship between the document density and a recording density.

Since a gradation level is processed by using an 8-bit digital signal, 256 gradations are present.

In the image processing apparatus, the non-linear portion of the printer characteristic in quadrant III is corrected by the LUT 25 in quadrant II to render the gradation characteristic in quadrant IV linear.

The LUT 25 is produced by calculations that will be described later.

The image signal is converted into a density signal by the LUT 25, and the density signal is then modulated by a pulse width modulation (PWM) circuit 26 to provide a signal that corresponds to a dot width. The modulated signal is sent to a laser driver 27 that controls the ON/OFF state of the laser.

In this embodiment a tone reproduction method that involves pulse width modulation is employed for Y, M, C, and Bk colors.

As dot area sizes are changed by the scanning performed with the laser 110, a latent image that has a predetermined gradation characteristic is formed on the photosensitive drum 4, and the developing, transferring, and fixing processes are performed to reproduce a gradated image.

[Gradation control of a system that includes both a reader and a printer]

An explanation will be given for the first control system, which is concerned with the stabilization, of an image reproduction characteristic, that is performed by a system that includes both the reader unit A and the printer unit B.

The calibration of the printer unit B that is performed using the reader unit A will now be described while referring to the flowchart in FIG. 26. This process is executed by the CPU 214, which controls the reader unit A, and the CPU 28, which controls the printer unit B.

When a mode select button, "automatic gradation correction", that is provided on the console unit 217 is depressed, this control process begins. It should be noted that in this embodiment the display 218 is a liquid crystal console panel (touch panel display) that has a push sensor, as is shown in FIGS. 27A through 29E.

Figure 27A:
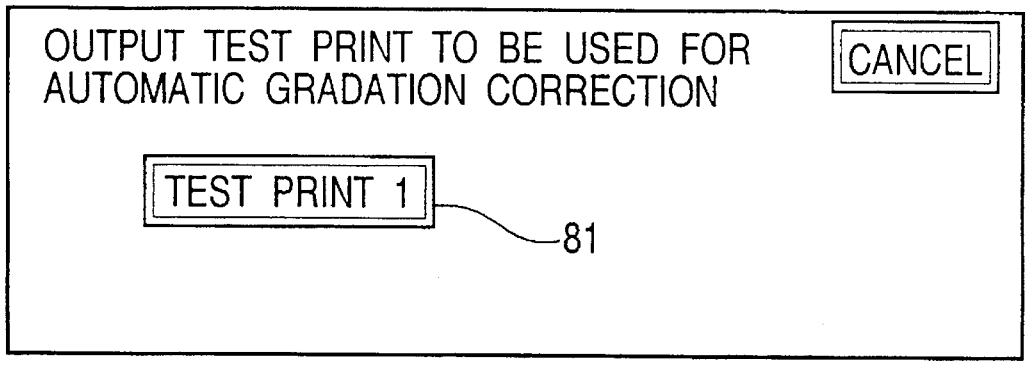
FIGS. 27A through 27C are diagrams showing the display contents of a display 218.

At S51, a print start button 81 for test print 1 appears on the display 218 (FIG. 27A). By pressing it an image for test print 1, which is shown in FIG. 30, is printed by the printer unit B.

Figure 27B:
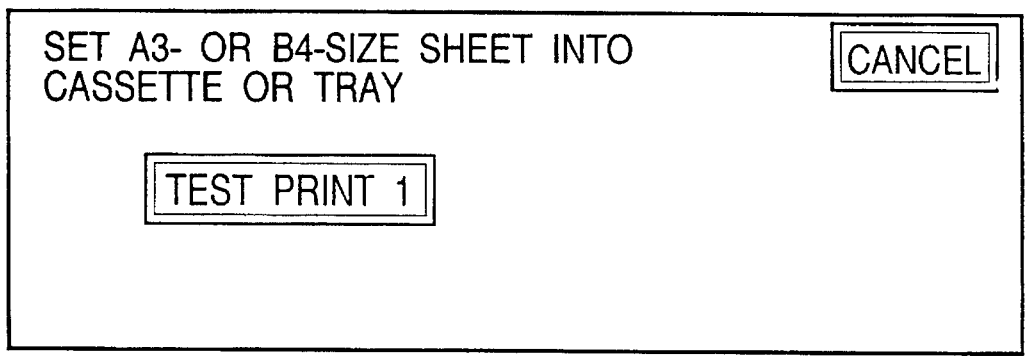
Figure 27C:
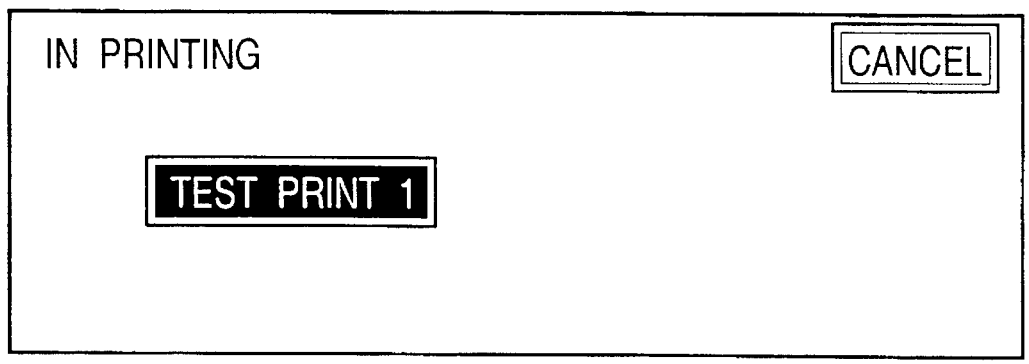

At this time, the CPU 214 determines whether or not a sheet on which test print 1 is to be formed is present. If no sheet is present, an alarm message shown in FIG. 27B is displayed.

A contrast potential (which will be described later) for the standard state that corresponds to an environment, is registered in advance as an initial value, and is employed for forming test print 1.

The image processing apparatus employed in this embodiment has a plurality of sheet cassettes, and a plurality of paper sizes, such as B4, A3, A4, and B5, can be selected.

To avoid, during the following reading process, a reading error that may arise from the improper latitudinal or longitudinal positioning of a sheet, one of the large print sheet sizes that is in general use is employed for this process. In other words, one of the available print sizes, B4, A3, 11"×17", or LGR. For an image processing apparatus that has a plurality of sheet cassettes, a large paper size is automatically selected for a test print.

A belt pattern 61, along with an intermediate gradation density for the Y, M, C, and Bk colors, is formed as test pattern 1 in FIG. 30.

The pattern 61 is visually checked to confirm that there are no abnormal stripes in the image, and that the image density and color are not uneven. The size of this pattern in the main scanning direction of the CCD sensor 105 is so determined that the patch patterns 62 and gradation patterns 71 and 72 (FIG. 31) can be covered in the thrust direction.

If there is some abnormality in the test print 1, the test print 1 is reprinted. When an abnormality is again found in the test print 1, the services of a maintenance man will be required.

It is also possible that the belt pattern 61 will be read by the reader unit A, and whether or not the following control should be performed is automatically determined by employing density information for the thrust direction.

The patterns 62 are patches that are printed at the maximum density for all the colors, Y, M, C, and Bk; level 255 of the density signal value is employed.

Figure 28A:
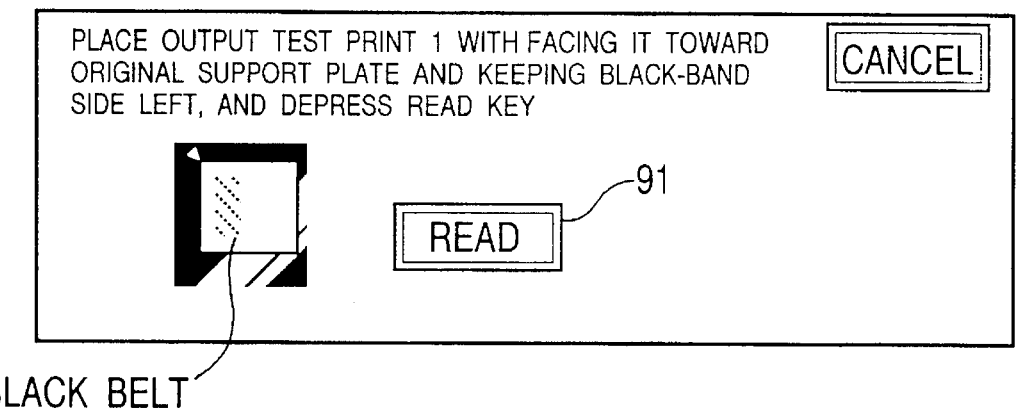
FIGS. 28A through 28C are diagrams showing the display contents of the display 218.
Figure 32:
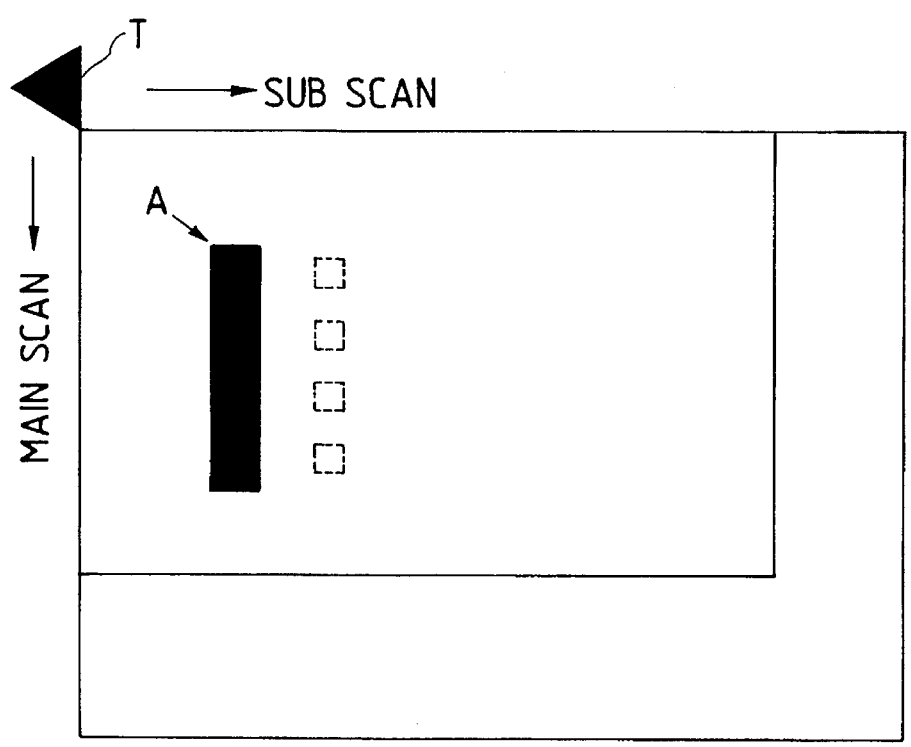
FIG. 32 is a diagram showing how to position test print 1 on an original support plate.

At S52, a test print 1 image is positioned on the original support glass 102, as is shown in FIG. 32, and a read start button 91, which is shown in FIG. 28A is depressed.

A guidance message for an operator, such as that shown in FIG. 28A, also appears.

FIG. 32 is a top view of the original support plate 102. A wedge-shaped mark T at the top left is a mark, which is on the original support plate 102, against which a document is to abut. The above described message is displayed on the console panel so that the belt pattern 61 is on the side of a sheet that is placed nearest to the mark T, and so that the face of the sheet to be printed will be correctly positioned on the original support plate 102 (FIG. 28A). By doing this, errors that may arise as a result of the improper positioning of a sheet will be avoided.

Since to read the pattern 62 the reader unit A begins its sequential scanning at the mark T and obtains the first density gap reading at point A at the corner of the pattern 61, the reader unit A calculates, from the coordinates of the point A, the relative coordinates of the positions of the patch patterns 62 and reads the density values of the patterns 62.

Figure 28B:
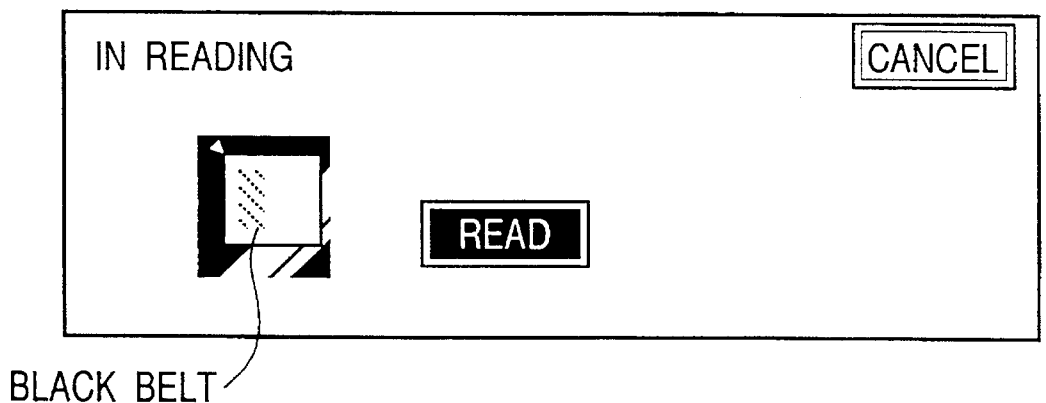
Figure 28C:
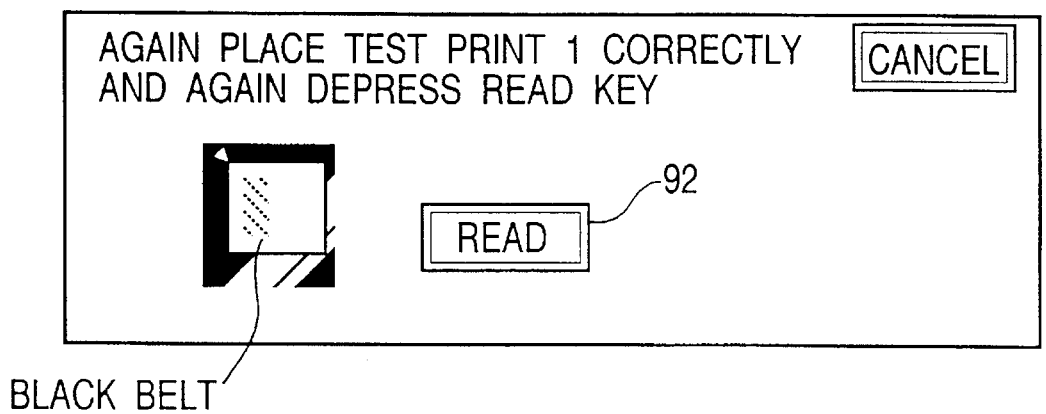

During the reading process, the message that is shown in FIG. 28B is displayed. When the directional alignment and the positioning of test print 1 are incorrect, reading is impossible and the message shown in FIG. 28C is displayed. Again, an operator must position the test print 1 correctly and depress a read key 92 to initiate reading.

The following expression (2) is employed for conversion of the optical densities from the acquired RGB values. The conversion is adjusted by a correction coefficient (k) in order to provide the same values as those that are obtained with a commercially available densitometer.

Alternatively, the LUT 25 may be employed to convert the RGB luminance information into density information for the colors M, C, Y, and Bk.

M=−km×log10(G/255)
C=−kc×log10(R/255) . . . (2)
Y=−ky×log10(B/255)
Bk=−kbk×log10(G/255)

A method for correcting the maximum density by using acquired density information will now be explained.

Figure 34:
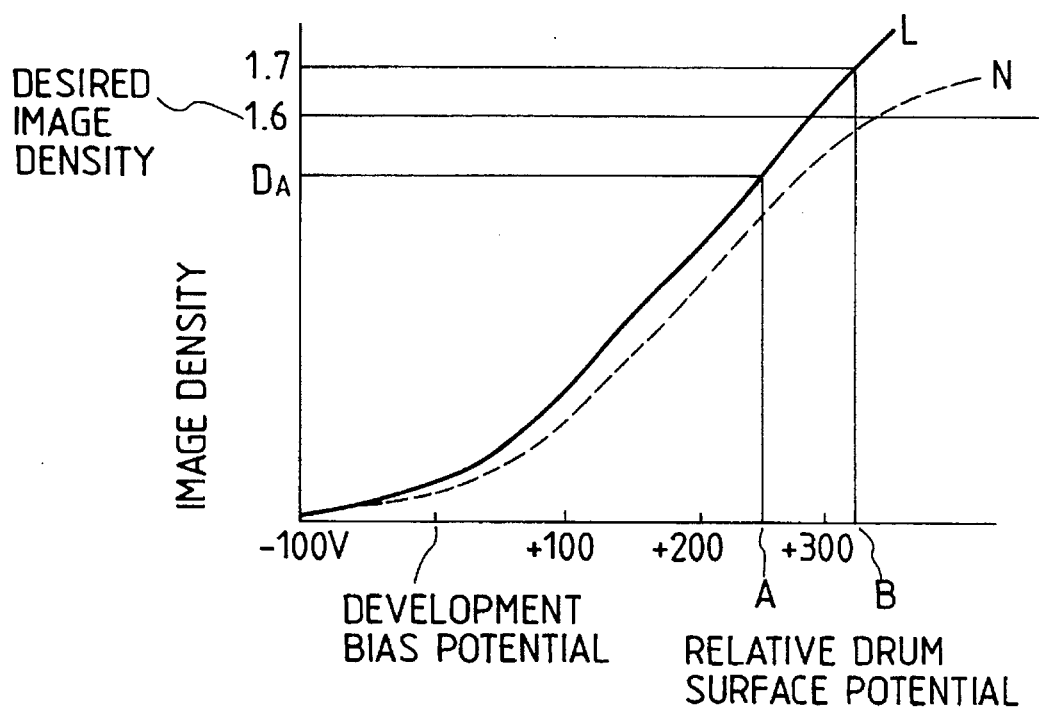
FIG. 34 is a graph showing the relationship between the relative surface potential of a drum and an image density.

A graph in FIG. 34 shows the relationship between the relative drum surface potential and the image density that is acquired with the above calculation.

When the difference between a currently used contrast potential, i.e., a development bias potential, and the surface potential of the photosensitive drum 4, which is acquired when the drum 4, after the primary charging, is exposed by the laser beam at its maximum level, is the maximum density $D_A$, which is obtained by the setting A, in most cases the image density in the maximum density area is linear, as is indicated by the solid line L, with respect to the relative drum surface potential.

With the two-component developing toner, the toner density in the developing unit fluctuates. When the toner density is reduced, the relationship between the image density and the surface potential of the relative drum is sometimes non-linear in the maximum density area, as is indicated by the broken line N.

In this embodiment, although the desired maximum density value is 1.6, by providing a margin of 0.1, 1.7 is set as a target value for the adjustment to the maximum density in order to determine the amount of adjustment that is required.

Contrast potential B is acquired by the expression (3):

$$B = (A + Ka) \times 1.7 / D_A \quad (3)$$

where Ka is a correction coefficient and it is preferable that its value be optimized according to the developing system type.

Figure 35:
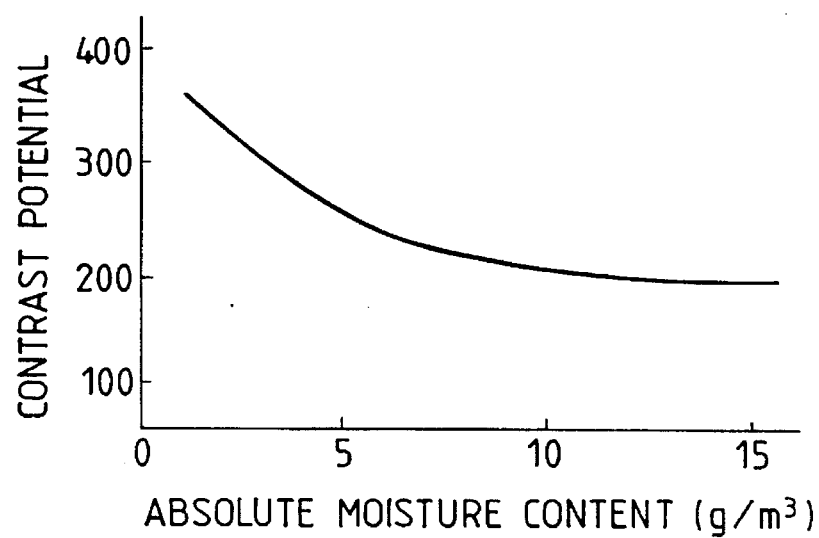
FIG. 35 is a graph showing the relationship between an absolute moisture content and a contrast potential.

Actually, an image density is not adjusted in an electrophotographic system unless the setting of the contrast potential A is changed in consonance with the environment. The setting of the contrast potential A is therefore changed, as is shown in FIG. 35, by the output of the environment sensor 33 that monitors the water content in the machine, as was previously described.

Therefore, as a method for correcting a contrast potential, correction coefficient $V_{cont}$ ratel, in the following expression, is stored in a backup RAM:

$$V_{cont} ratel = B/A$$

At the end of each 30 minute period the image processing apparatus has monitored the internal environment to detect a change (in the water content), it determines a value for A that is based on the detection result, and the calculation A×$V_{cont}$ ratel is performed to acquire a contrast potential.

A method for acquiring the grid potential and the development bias potential from the contrast potential will now be briefly described.

Figure 36:
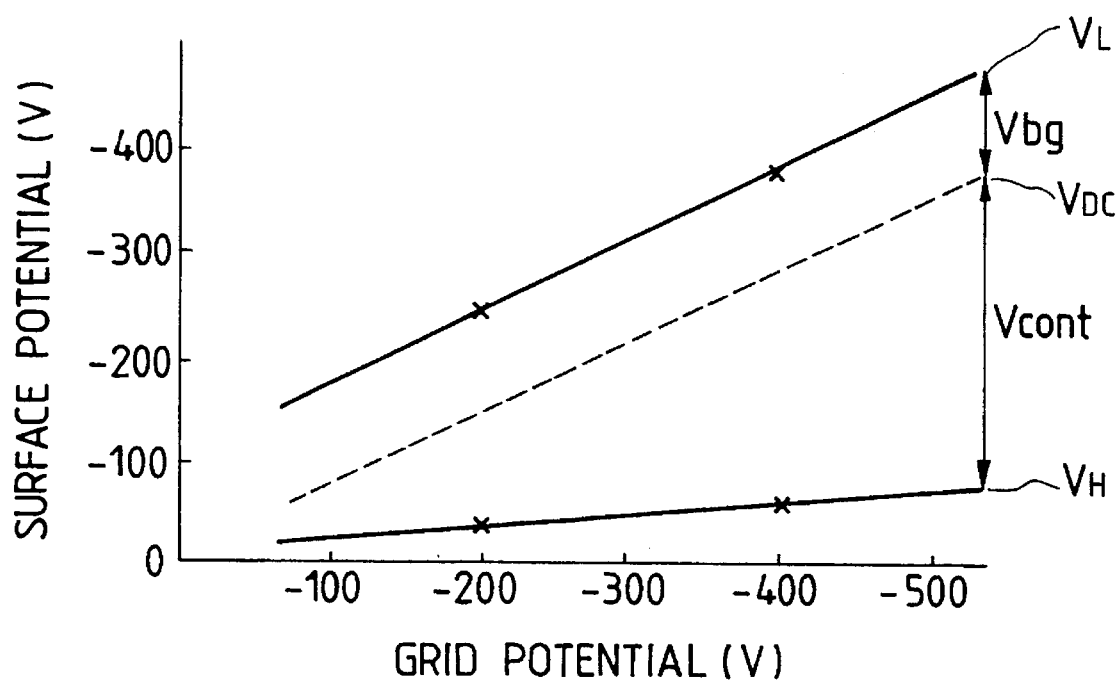
FIG. 36 is a graph showing the relationship between a grid potential and a surface potential.

A graph in FIG. 36 shows the relationship between the grid potential and the surface potential of the photosensitive drum 4.

Surface potential $V_L$, when the laser beam scans at its lowest level and the grid potential is −200 V, and surface potential $V_H$, when the laser beam scans at its highest level and the grid potential is also −200 V, are measured by a surface potential sensor 12.

In like manner, the surface potentials $V_L$ and $V_H$ are measured when the grid potential is −400 V.

Data for −200 V and for −400 V are interpolated or extrapolated to acquire the relationship between the grid potential and the surface potential.

The process by which the potential data are acquired is called potential measurement control.

The difference, $V_{bg}$, which is set while referring to $V_L$ so as to prevent the attachment of fogging toner to an image (set to 100 V in this embodiment), is employed to set the development bias potential $V_{DC}$.

The contrast potential $V_{cont}$ is a differential voltage between the development bias potential $V_{DC}$ and the surface potential $V_H$. As described above, the greater is the contrast potential $V_{cont}$, the greater becomes the maximum density.

To set the contrast potential $V_{cont}$ to the contrast potential B that is acquired by calculation, the relationship in FIG. 36 is referred to and the required grid potential and development bias potential are calculated.

Figure 26:
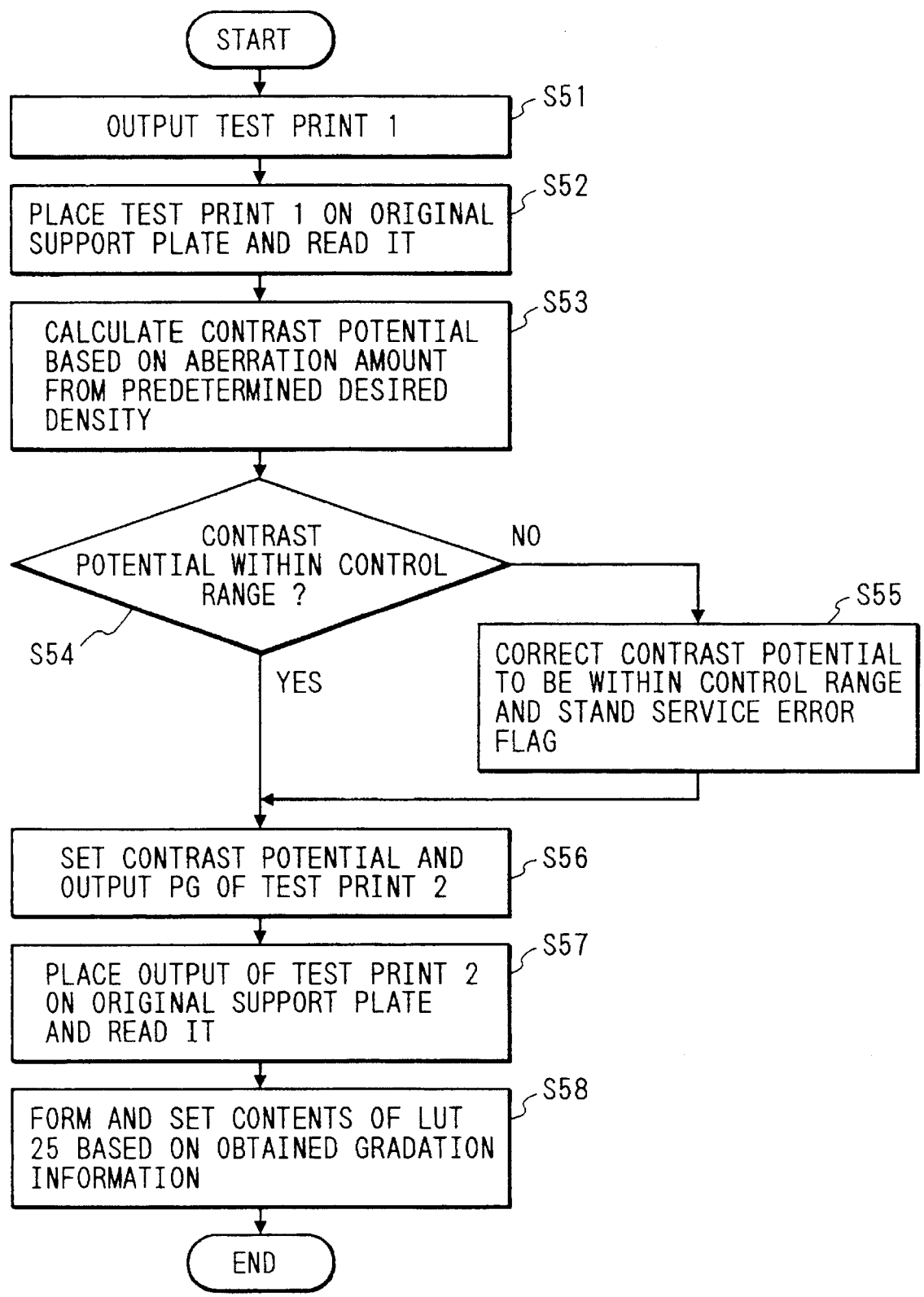
FIG. 26 is a flowchart for a first control system.

At S53 in FIG. 26, the contrast potential is calculated so that the maximum density value is 0.1 higher than the target value, and the grid potential and the development bias potential are set by the CPU 28 in order to obtain the calculated contrast potential.

At S54, a check is performed to determine whether or not the value for the obtained contrast potential falls within a control range. When the value for the contrast potential is outside the control range, it is assumed that an abnormal event has occurred in the developing unit, etc. An error flag is therefore set to indicate to a maintenance man that a developing unit for the pertinent color should be checked in a predetermined maintenance mode.

In this embodiment, a limiter acts on a value at the edge of the control range and corrects the contrast potential (S55), and the process is therefore continued.

As explained above, the grid potential and the development bias potential are set by the CPU 28 so as to obtain the contrast potential calculated at S53.

Figure 50:
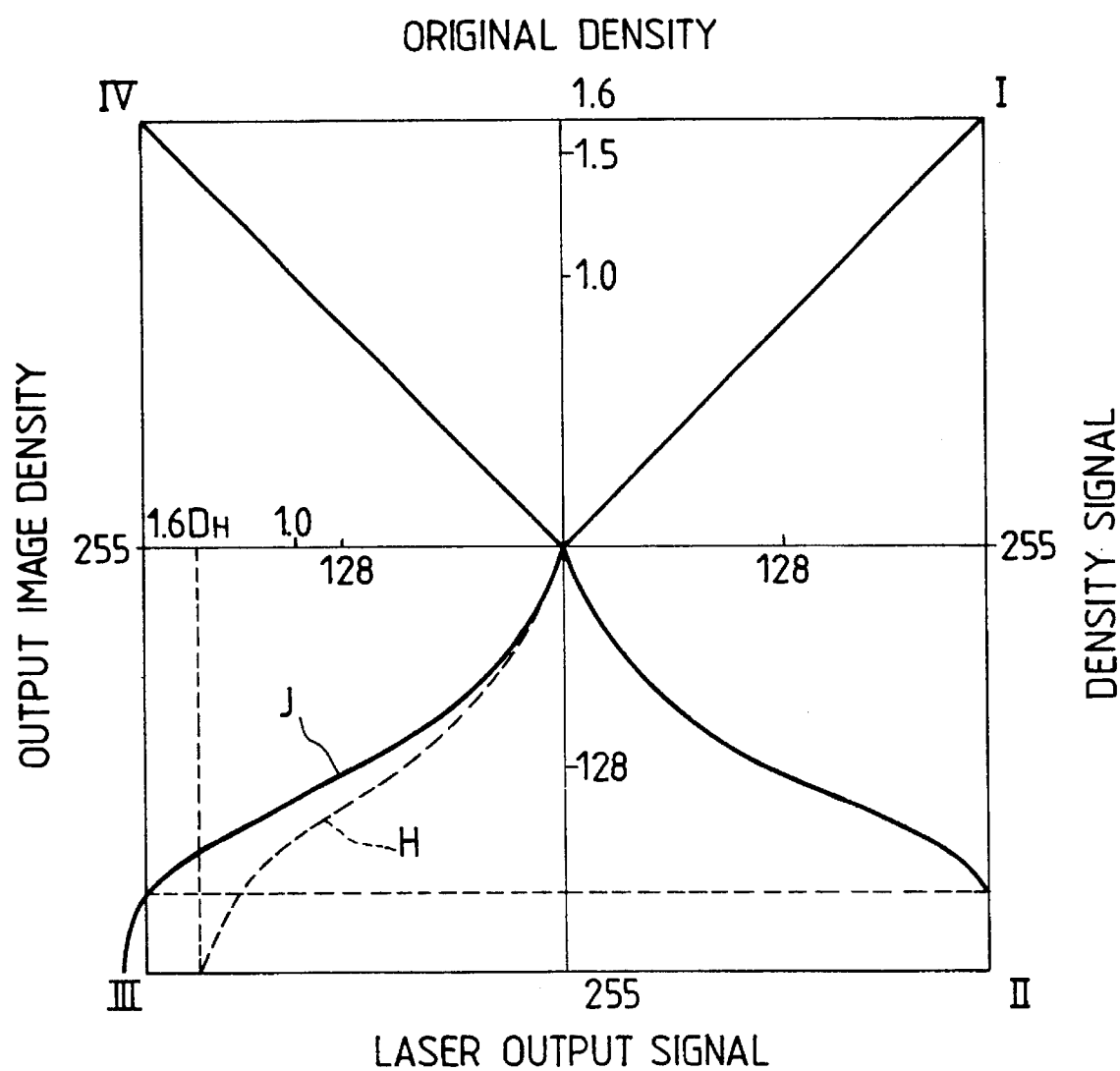
FIG. 50 is a quadrant chart showing the density conversion characteristics.

FIG. 50 is a quadrant diagram for the density conversion characteristic. When the maximum density control in this embodiment is employed to set the maximum density to a higher level than a desired level, the printer characteristic in quadrant III is as indicated by the solid line J.

If such a control is not performed, the printer characteristic may be the one shown where the maximum density does not reach 1.6, as is indicated by the broken line H. For the characteristic indicated by the broken line H, the LUT 25 is set and it is not capable of increasing the maximum density. However if LUT 25 is set, an image that has a density value that falls between the density $D_H$ and 1.6 cannot be reproduced.

If, as is shown by the solid line J, the target value is set to a value that slightly exceeds the maximum density, allocation of the full density reproduction range is ensured for the total gradation characteristic in quadrant IV.

Figure 29A:
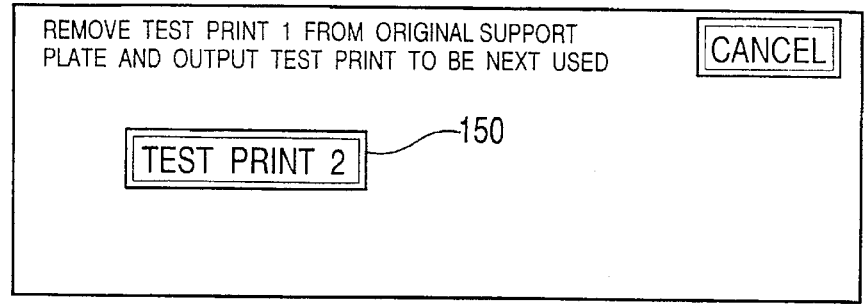
FIGS. 29A through 29E are diagrams showing the display contents of the display 218.
Figure 29B:
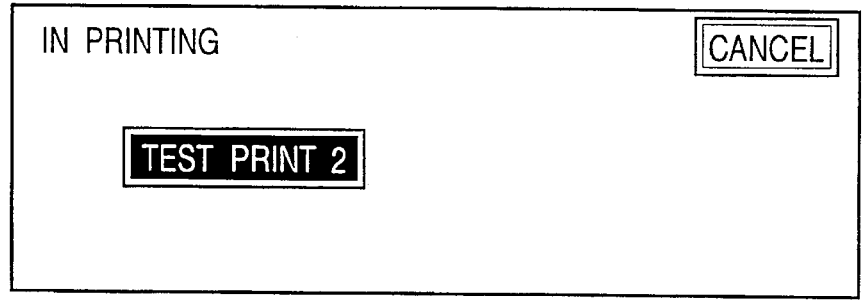

As is shown in FIG. 29A, an image print start button 150 for test print 2 appears on the console panel, and when the button 150 is pressed an image of test print 2 is printed out (S56). During the printing, the message that is shown in FIG. 29B is displayed.

Figure 31:
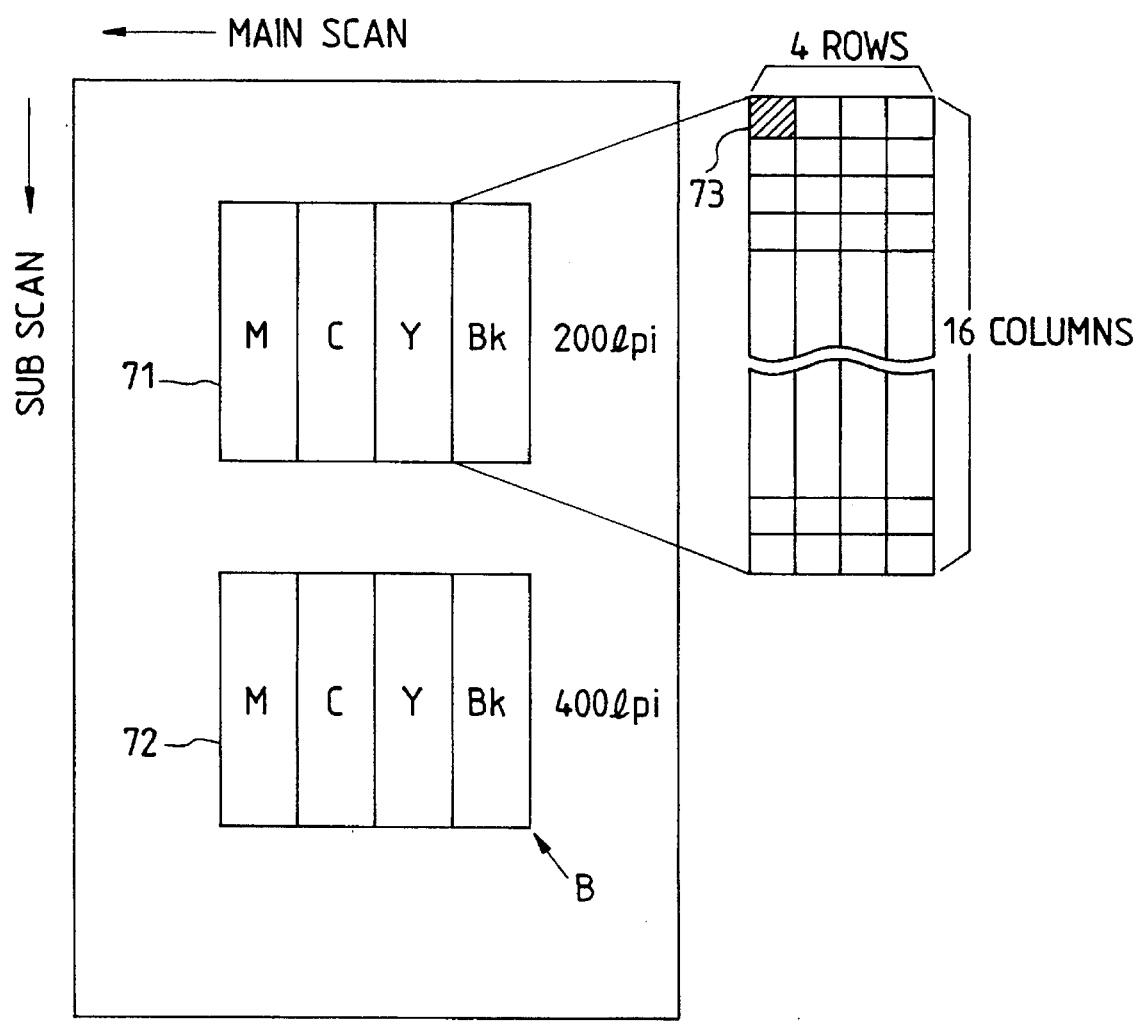
FIG. 31 is a diagram illustrating an example of test print 2.

Test print 2 includes, for the individual colors M, C, Y, and Bk, gradation patch groups, each of which comprises 64 gradation patches in a four column by sixteen row arrangement, as is shown in FIG. 31. For the 64 gradation patches, a laser output level is assigned to a low density area of the 256 gradations and a lower output level is not assigned to a high density area. Therefore, the gradation characteristic at a highlighted portion can be preferably adjusted.

In FIG. 31, reference number 71 denotes a patch having a resolution of 200 lpi (lines per inch) and 72 denotes a patch having a resolution of 400 lpi (lines per inch). An image with each resolution can be provided by preparing a plurality of cycles of a triangular wave that is employed for comparison with image data that are to be processed.

The image processing apparatus in this embodiment forms a gradated image with a resolution of 200 lpi, and a line image, such as a character, with a resolution of 400 lpi. Although patterns that have the identical gradation level are output with the two resolutions, if the gradation characteristic is greatly changed because of the difference in the resolutions, it is better that the gradation level be set in consonance with the resolution.

Test print 2 is generated by the pattern generator 29 without activating the LUT 25.

Figure 29C:
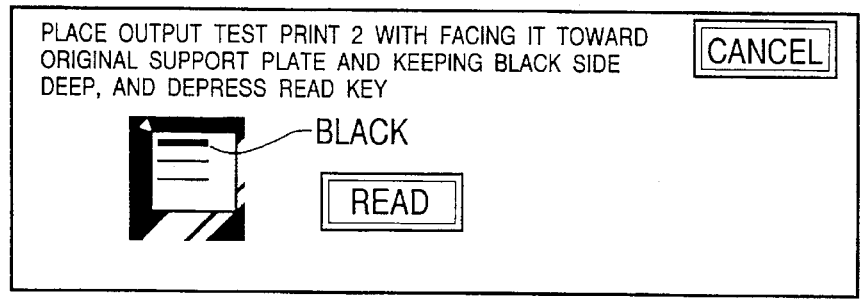
Figure 33:
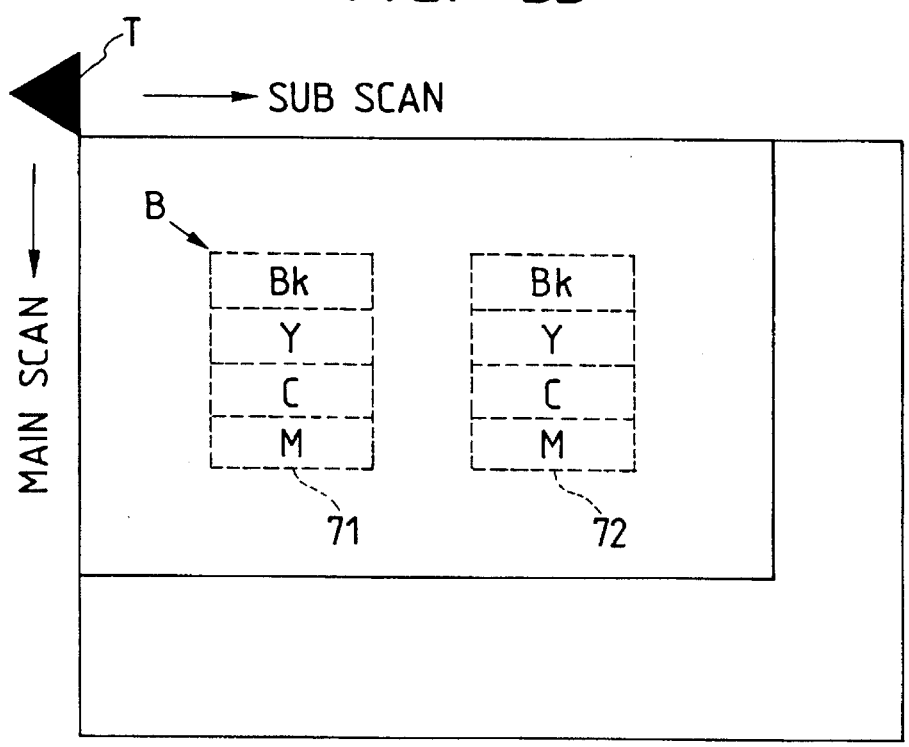
FIG. 33 is a diagram showing how to position test print 2 on the original support plate.

FIG. 33 is a specific top view for the output test print 2 when it is placed on the original support glass 102. The wedge-shaped mark T at the top left is a mark on the original support plate 102, against which a document abuts. The above described message is displayed on the console panel so that the Bk pattern is positioned near the mark T and the correct surface of a sheet is down, facing the original support glass 102 (FIG. 29C). By doing this, errors that arise because sheets of paper are improperly positioned may be avoided.

Since to read the pattern the reader unit A begins its gradual scanning at the mark T and obtains the first density gap reading at point B, the reader unit A calculates, from the coordinates of point B, the relative coordinates of the positions of the individual color patches in the pattern and reads the relative coordinates (S57).

Figure 37:
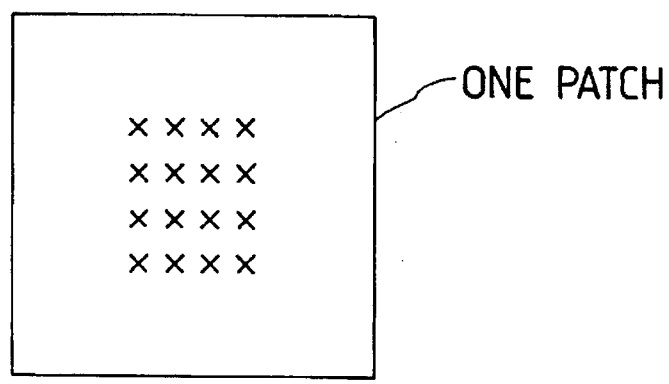
FIG. 37 is a diagram showing the read points for one patch pattern.

As is shown in FIG. 37, sixteen read points (each indicated by an "x") are selected in a patch (73 in FIG. 31) that is read, and the read-out signal values are averaged. It is desirable that the number of points be optimized in consonance with a reading unit and an image processing apparatus.

Figure 38:
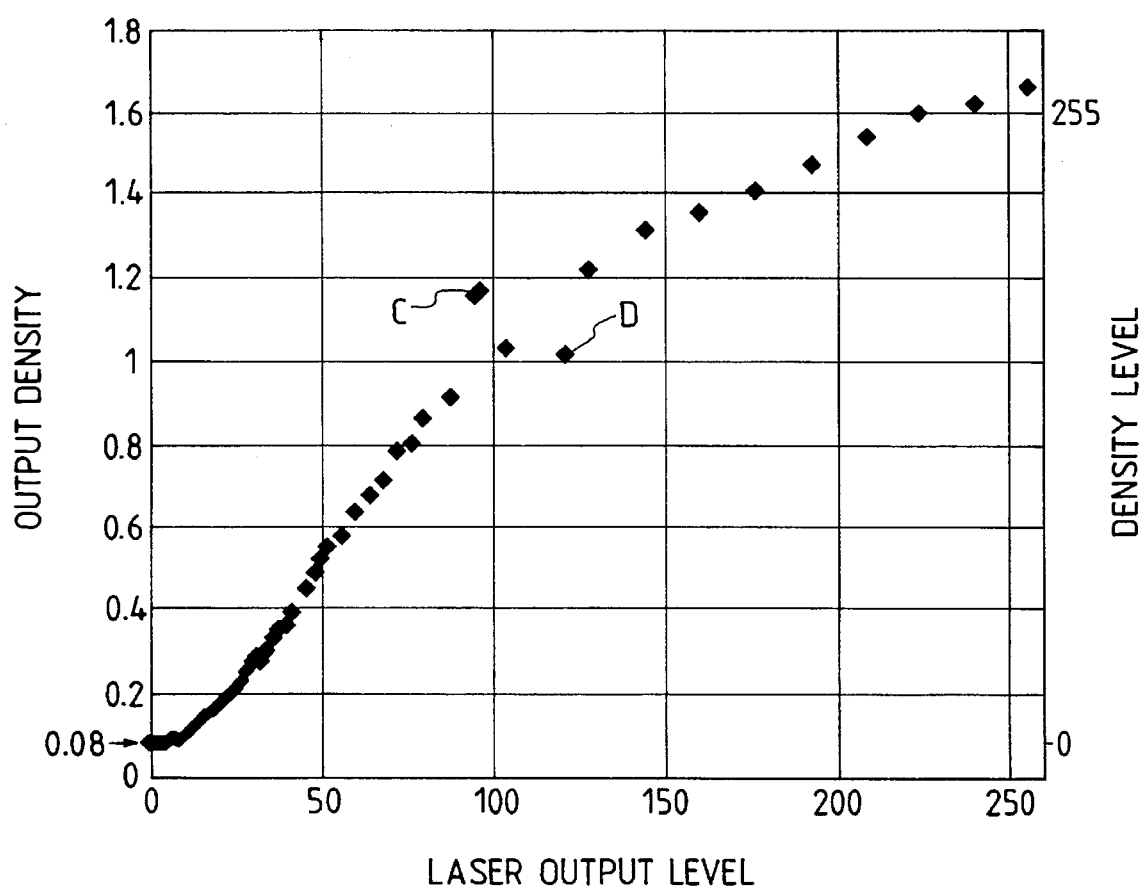
FIG. 38 is a graph representing a reading example for test print 2.

An RGB signal for each patch, which is obtained by averaging the values acquired based on the sixteen read points, is altered to a density value by using the previously described conversion method to produce an optical density. FIG. 38 is a graph on which a laser output level is plotted along the horizontal line and the acquired density value is employed as an output density.

Further, as is shown along the vertical line, 0.08 is employed instead of 0 for the base density of paper in this embodiment, and 1.60, which is set as the maximum density of the image processing apparatus, is employed for level 255.

When the obtained data shows an extraordinary high density, as at point C, or a low density, as at point D, the original support glass 102 may not be clean or a test pattern failure may have occurred. The limiter acts to correct the inclination and to maintain the continuity of a data row. More specifically, when the inclination is 3 or greater, it is fixed at 3, and when the inclination is a negative value, the density level is set to the same level as the previous level.

As previously described, the contents of the LUT 25 can be easily prepared, simply by replacing the coordinates of the density level in FIG. 38 with those of the input level (the density signal line in FIG. 25), and by replacing the coordinates of the laser output level with those of the output level (the laser output signal line in FIG. 25). A density level that does not correspond to a patch is calculated by interpolation.

A limiting requirement states that an output level should be 0 when an input level is 0.

The converted data that are prepared as is described above are employed for the setting of the LUT 25 at S58.

Figure 29D:
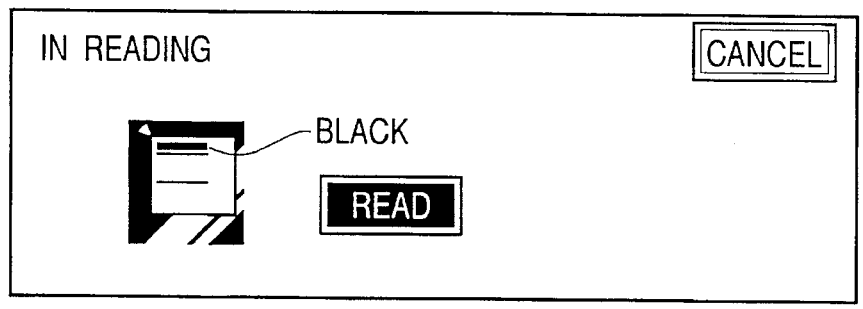
Figure 29E:
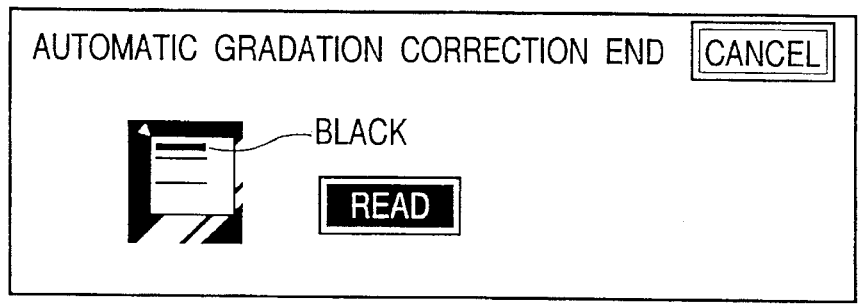

The contrast potential control and the preparation of a γ conversion table, which are performed by the first control system that employs a reading unit, are thereafter terminated. During the processing the message that is shown in FIG. 29D is displayed, and when the processing has been completed, the message that is shown in FIG. 29E is displayed.

Auxiliary gradation control after the performance of the control process by the first control system will now be described.

Even though the environment is changed, the image processing apparatus of the embodiment can correct the maximum density by performing the contrast potential control process, and can also correct gradation.

Figure 39:
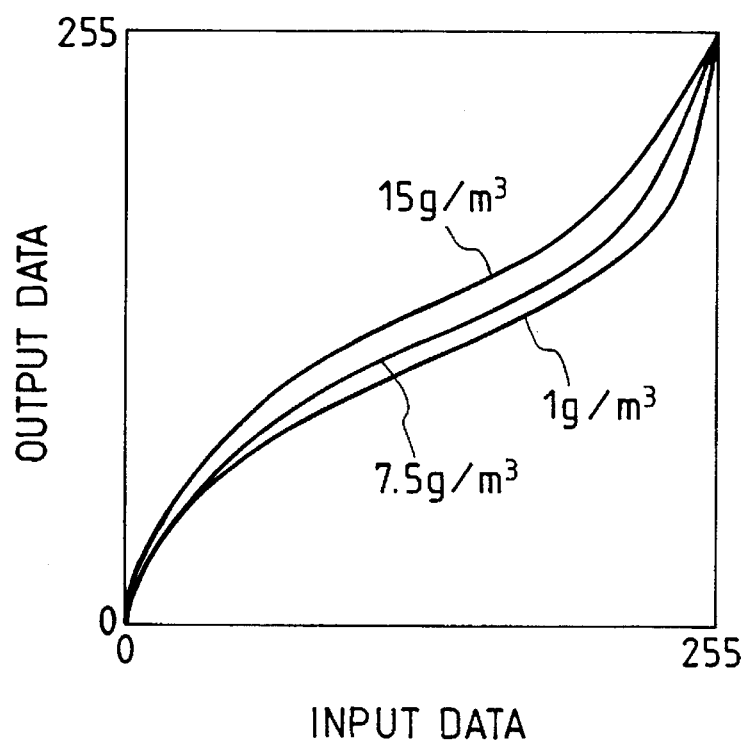
FIG. 39 is a graph showing data for an LUT that correspond to water content readings.

While the first control system is in the inactive state, the data in the LUT 25, as shown in FIG. 39, for the individual environments are stored in the ROM 30 to cope with the change of the environment.

The water content data that are acquired when the first control system has completed the performance of its process is stored, and an LUT. A in the ROM 30 that corresponds to the water content is calculated.

Each time the environment changes, an LUT. B in the ROM 30 that corresponds to the current water content is calculated, and the LUT. 1 that is acquired by the first control system is corrected by the following expression, using (LUT. B–LUT. A).

$$LUT.\ present = LUT.\ 1 + (LUT.\ B - LUT.\ A) \qquad (4)$$

The image processing apparatus is thereafter set so that, relative to a density signal, it has a linear characteristic. As a result, the distributions of the density gradation characteristics for the individual units can be reduced, and the standard state can be set.

If the execution of this control is the prerogative of a general user, the user can perform the control process as necessary when he judges that the gradation characteristic of the image processing apparatus is deteriorating, so that the gradation characteristic for a system that includes both a reader and a printer can be easily corrected.

Further, a correction that is occasioned by an environmental change, as is described above, can also be properly performed.

The active or the inactive setting of the first control system is performed by a maintenance man. During a maintenance check, the first control system is rendered inactive so that a maintenance man can evaluate the state of the image processing apparatus.

When the first control system is rendered inactive, the standard contrast potential and the data for the γ LUT 25 for an image processing apparatus of this model are retrieved from ROM 30 and set.

It is obvious therefore how much the current characteristic has been shifted from the standard state and the optimal maintenance can be efficiently performed.

[Gradation control of a printer]

The second control system that is related to the stabilization of the image reproduction characteristic of the printer unit B will now be explained.

Figure 40:
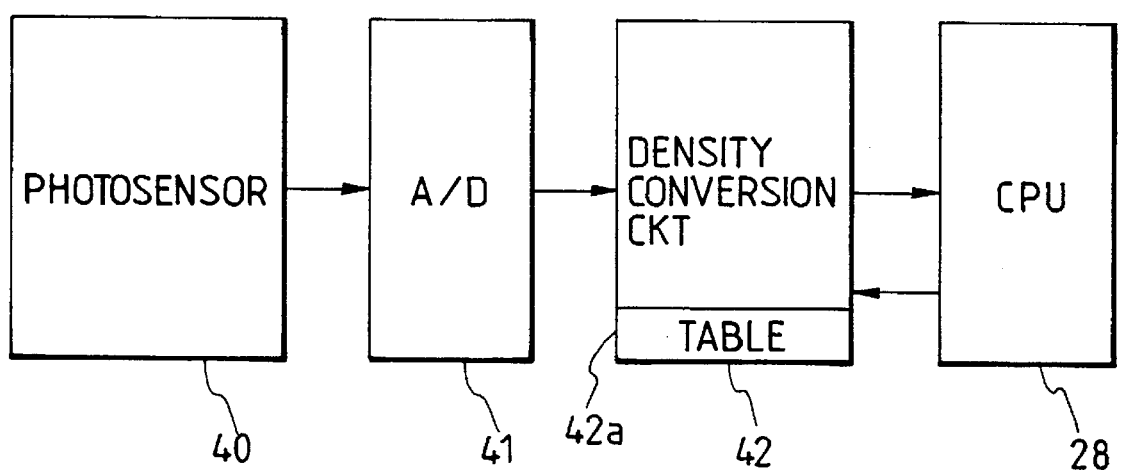
FIG. 40 is a diagram showing the density conversion beginning with a photosensor 40.

FIG. 40 is a diagram showing a processing circuit that processes a signal sent from the photosensor 40 that incorporates the LED 10 and the photodiode 11, which are located opposite the photosensitive drum 4. Near-infrared light that is emitted by the photosensitive drum 4 is converted into an electric signal by the photosensor 40. Then, the electric signal that has a 0 to 5 V output voltage is converted into a digital signal that has a 0 to 255 level by the A/D conversion circuit 41. The digital signal is subsequently converted into density information by the density conversion circuit 42.

The toners used in this embodiment are yellow, magenta, and cyan color toners. Color material is dispersed in styrene copolymerized resin, which is employed as a binder, to obtain these colors.

Figure 41:
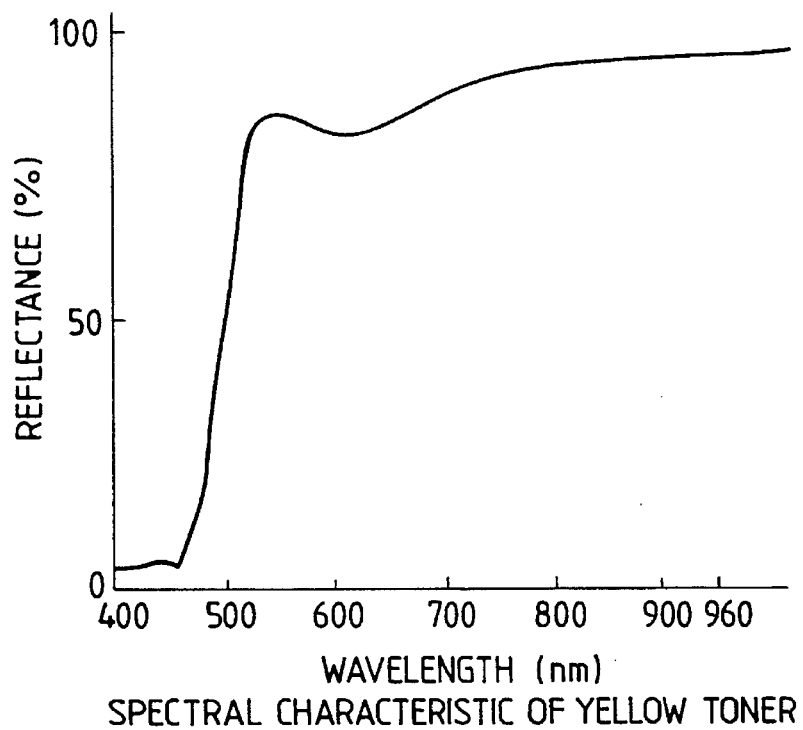
FIG. 41 is a graph of the spectral characteristic of yellow toner.
Figure 42:
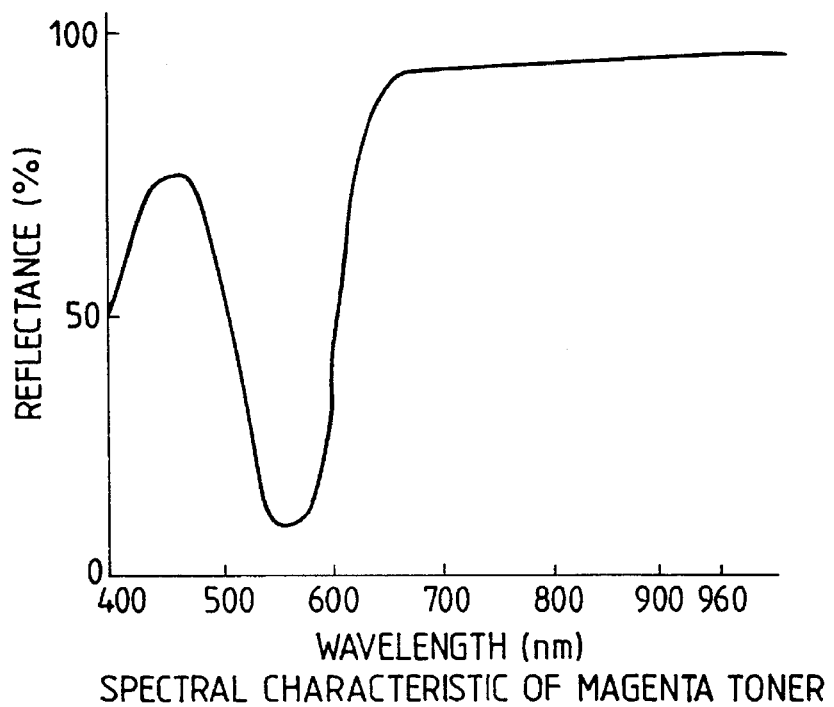
FIG. 42 is a graph of the spectral characteristic of magenta toner.
Figure 43:
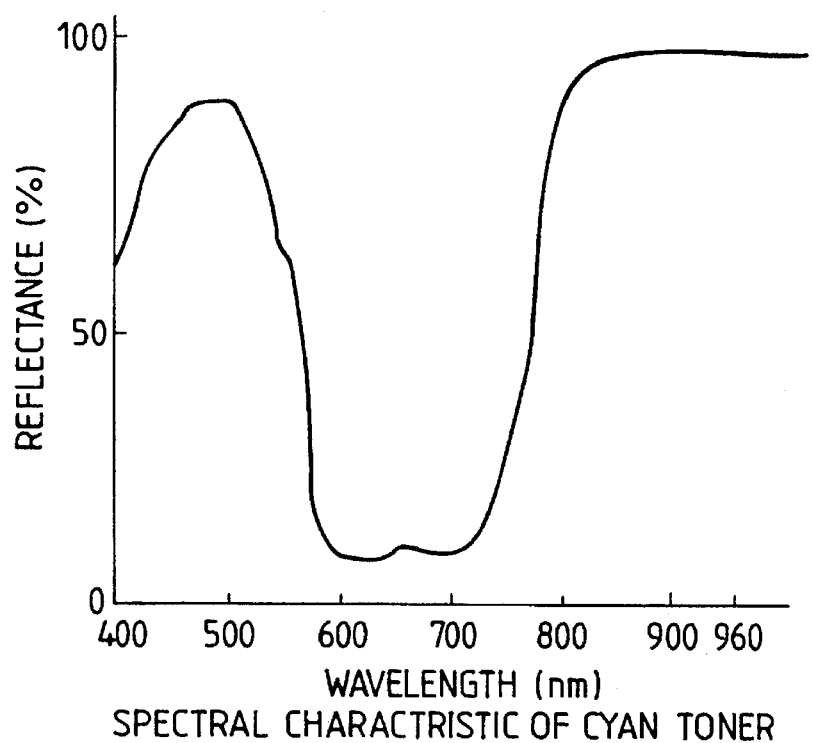
FIG. 43 is a graph of the spectral characteristic of cyan toner.
Figure 44:
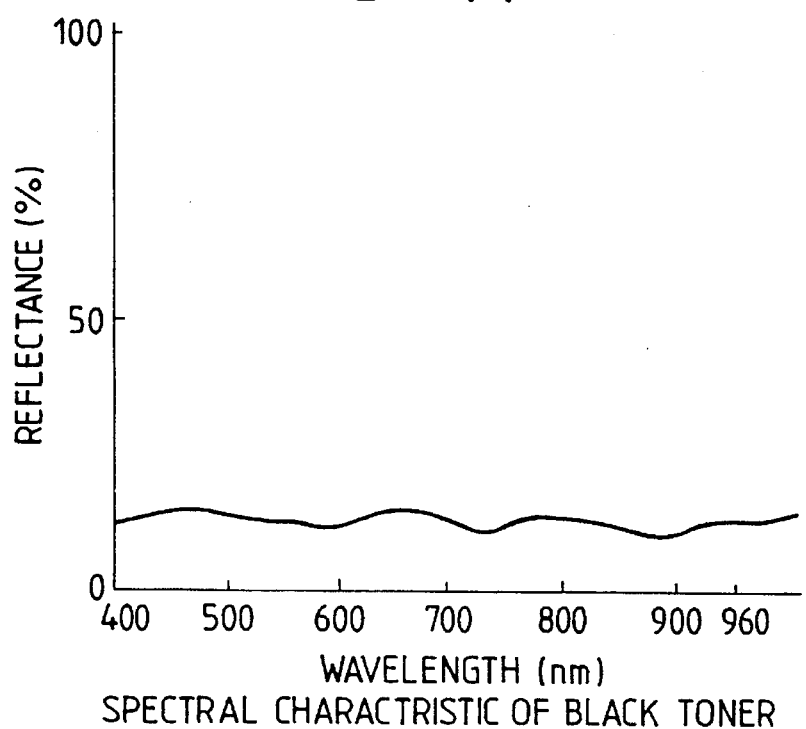
FIG. 44 is a graph of the spectral characteristic of black toner.

The spectral characteristics of the yellow, the magenta, and the cyan toners are represented in FIGS. 41 through 43, respectively. An 80% or greater reflectance of near-infrared light (960 nm) can be obtained for each toner. A two-component development method that effectively controls color purity and transmittance is employed for image forming with color toners.

Since to provide a pure black carbon black is employed as the color material for the black toner in this embodiment, even though the black toner is also a two-component developer, its reflectance of near-infrared light (960 nm) is about 10%.

The photosensitive drum 4 is an OPC drum, and its reflectance (960 nm) for near-infrared light is about 40%. An amorphous silicon drum, etc., may be employed as a photosensitive drum if its reflectance is the same as the OPC drum.

Figure 45:
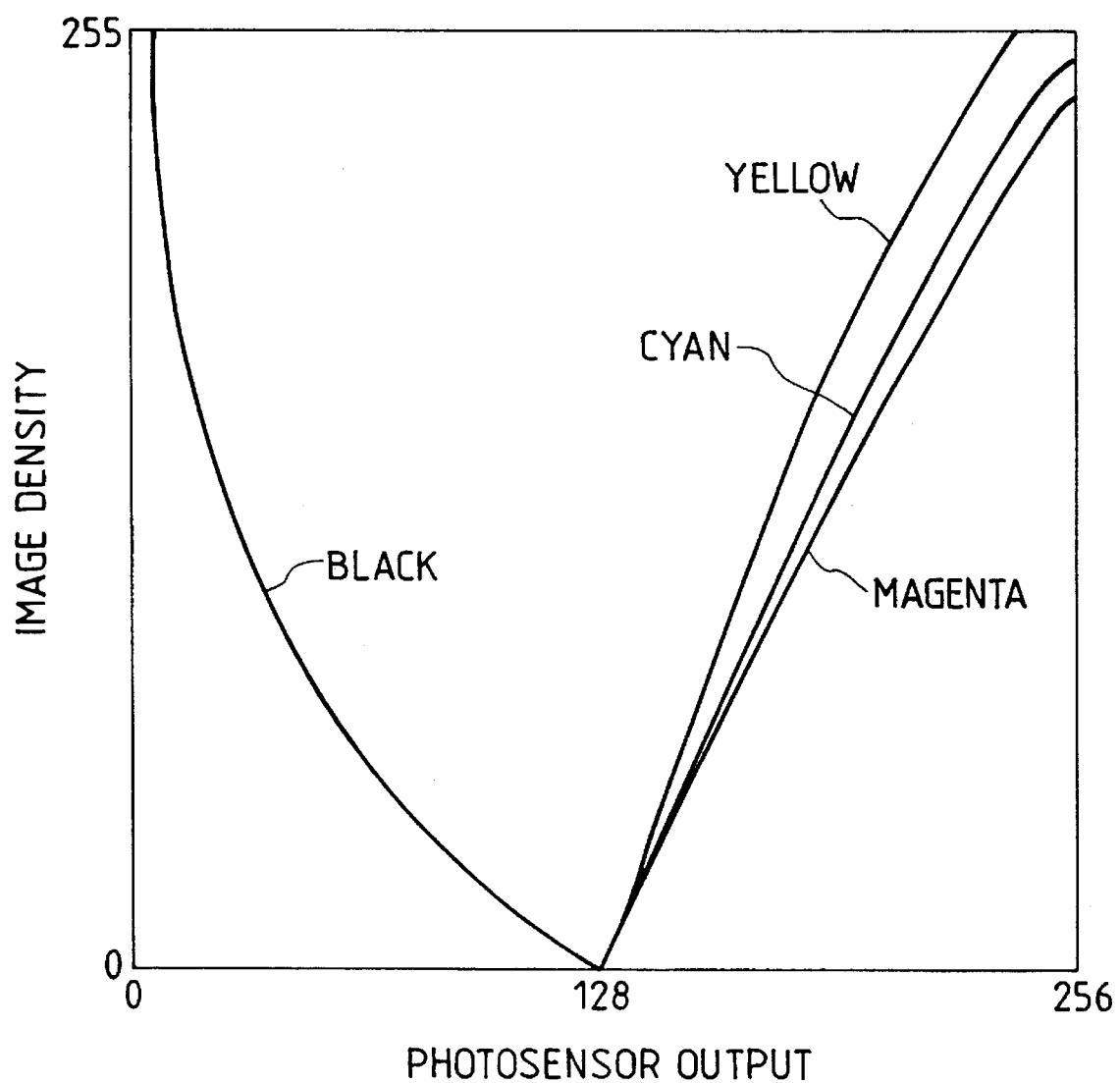
FIG. 45 is a graph showing the relationship between the output of the photosensor 40 and an image density.

A graph in FIG. 45 shows the relationship between the output of the photosensor 40 and the output image density when the density on the photosensitive drum 40 is changed step by step in consonance with the real gradation for each color.

The output of the photosensor 40 when no toner is attached to the photosensitive drum 4 is set to 2.5 V, i.e., to level 128.

As is apparent from FIG. 45, when the area coating ratios for the yellow, magenta, and cyan toners are increased and the image density becomes higher, the output of the photosensor 40 is greater than that of the photosensitive drum 4.

As for the black toner, when its area coating ratio is increased and the image density becomes higher, the output of the photosensor 40 is smaller than that of the photosensitive drum 4. According to these characteristics, by referring to a table 42a for converting a signal from a dedicated sensor for each color into a density signal, a density signal for each color can be read very accurately.

Figure 46:
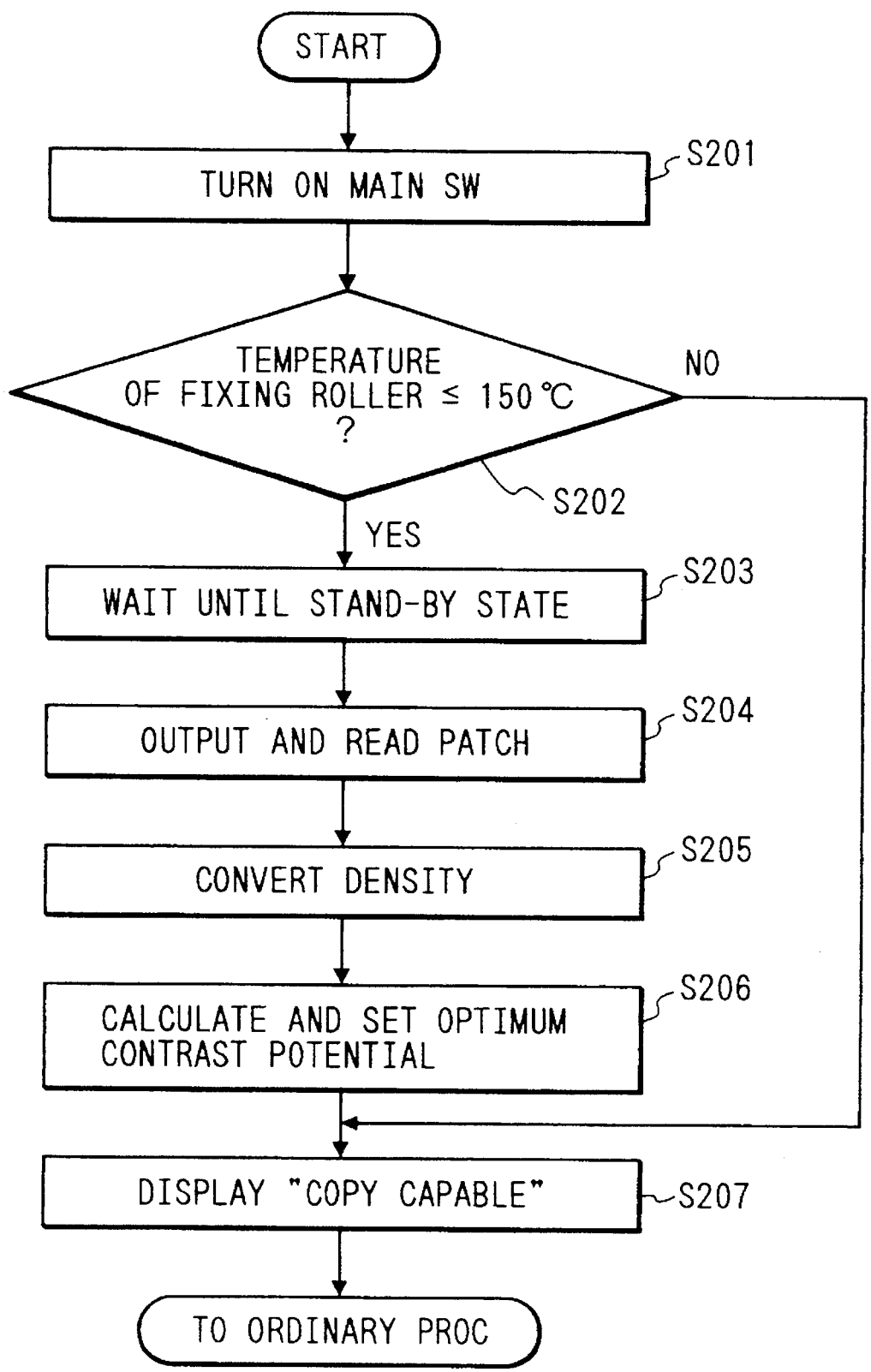
FIG. 46 is a flowchart for a second control system.

The processing of the second control system will now be explained while referring to the flowchart in FIG. 46. The control processing is performed by the CPU 28.

When the main power switch is turned on (S201) and the temperature of the fixing roller is 150° C. or below, the control process of the second control system is begun (S202).

When the fixing roller temperature is equal to or below 150° C., while waiting for the temperature of the fixing roller to reach a predetermined potential and also for a laser temperature to reach a temperature adjustment point, potential measurement is performed and a contrast potential is set. Warm-up agitation is then performed in the developing unit until a toner trigger is stabilized and the image processing apparatus goes into the stand-by state (S203).

When the image processing apparatus is in the stand-by state, patch patterns for the colors Y, M, C, and Bk are formed on the photosensitive drum 4 and are detected by the photosensor 40 (S204).

A density signal level of 128 for each color (the density signal line in FIG. 25) is employed for the laser output for each patch. The data contents of the LUT 25, and the contrast potential that are obtained by the first control system are corrected by using the current water content and are then set.

When the first control system is rendered inactive, the data of the LUT 25 and the contrast potential, which are acquired as the standard state by referring to the water content and are registered in the ROM 30, are employed.

Figure 47:
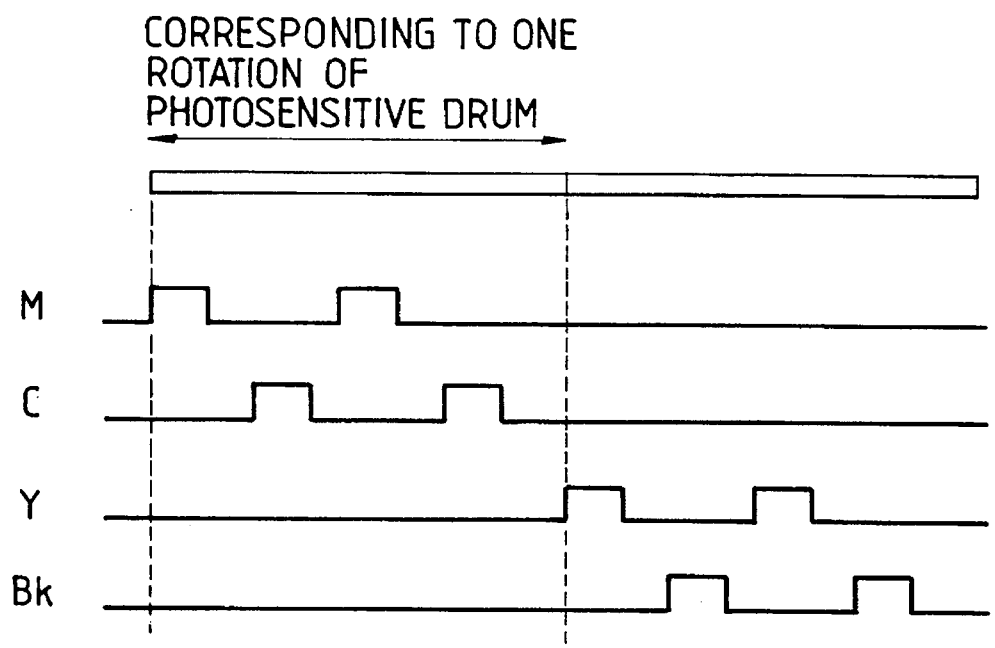
FIG. 47 is a diagram showing a detection example for the second control system.

The processing by which the patches on the photosensitive drum 4 are formed is performed as is shown in FIG. 47.

Since the photosensitive drum 4 that is used for this embodiment has a large diameter, in order to exactly and efficiently obtain density data in a short time, while taking into consideration the decentering of the photosensitive drum 4, patches of an identical color are formed at positions on the photosensitive drum 4 that are 180 degrees opposite to each other. The patches are measured and a plurality of samplings are performed to calculate the average.

Patches of different colors are formed so as to sandwich the patches, so that data for two colors are obtained during one rotation of the photosensitive drum 4.

In this manner, during two rotations the data for four colors are obtained, and their density values are acquired by referring to the density conversion table 42a in FIG. 45.

Figure 48:
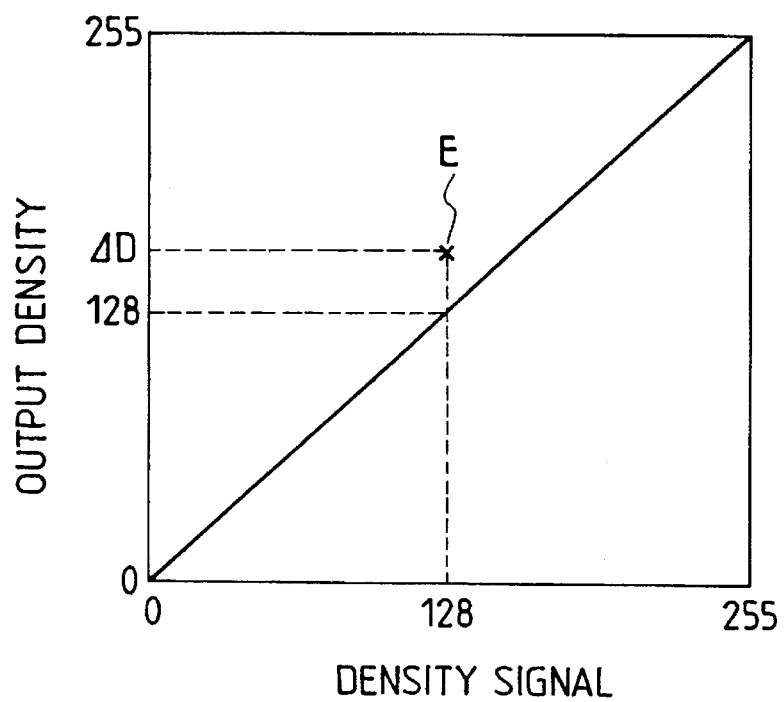
FIG. 48 is a graph showing a patch forming sequence in the second control system.

FIG. 48 is a graph showing the relationship between the density signal and the output density.

Since the output density of a density signal 128 is set by the first control system to 128 on the density scale, where 1.6 is employed for level 255, when the measurement result is shifted by ΔD, as is shown at point E, $$V_{cont}correct = V_{cont}present \times 128/(128+\Delta D) \quad (5)$$

The second control system, as well as the first, also has as a correction count $V_{cont}$ rate $2 = V_{cont}$correct/Vcont. present, so that even if the environment is changed, the correction can be performed in consonance with the contrast potential that is stored in the ROM 30 and that corresponds to each environment (S206).

When the above process is completed, a message, "copy capable" is displayed on the console panel and the copying process is on standby (S207).

The control processing performed by the second control system is thereafter terminated.

Usually, the image processing apparatus is powered off at night and powered on in the morning, and the second control system is therefore activated at least once a day.

On the contrary, it is improper to assume that the first control system is often activated because this must be done by a user.

When a maintenance man activates the first control system for the installation of the image processing apparatus and no image problems are encountered, the first and the second control systems can share roles: the second control system automatically maintains the gradation characteristic during a short time period, and the first control system performs calibration of the characteristic, which changes gradually, during a long time period. As a result, the gradation characteristic can be maintained throughout the service life of the image processing apparatus.

The arrangement of the photosensor 40 that is employed in the second control system will now be explained.

When the image processing apparatus has been used for long time and is worn out, the density of the pattern on the photosensitive drum 4 that is read by the photosensor 40 sometimes does not match the density of an image that is actually printed.

For example, when a cleaning blade for removing transferred residual toner contacts the photosensitive drum 4 and rubs its surface for a long time, the surface of the photosensitive drum 4 is worn out and the scattering of light elements from the photosensitive drum 4 is increased. This changes the initial state of the relationship between the output of the photosensor 40 and the image density.

Figure 49:
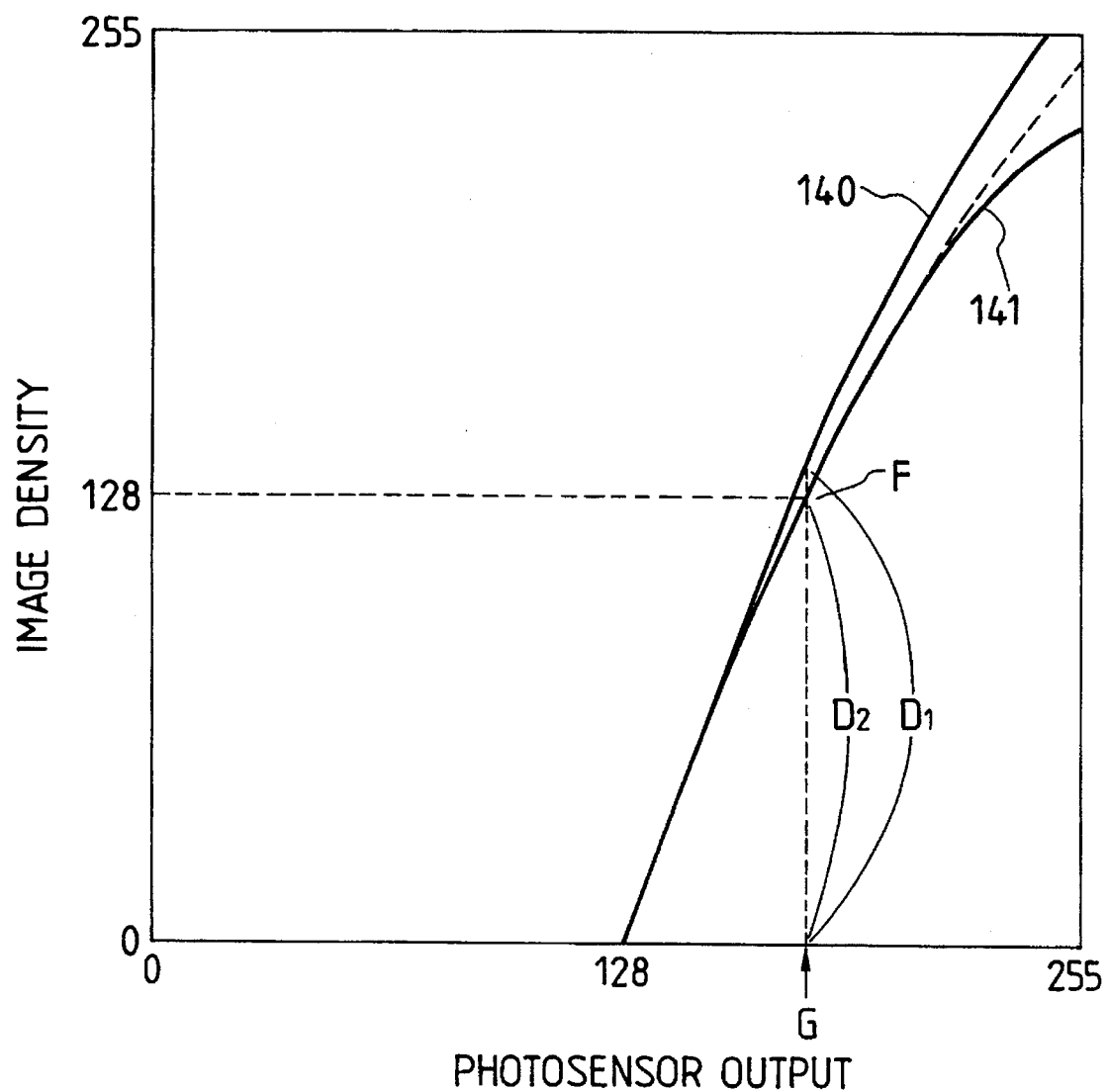
FIG. 49 is a graph representing a change in the durability characteristic of a density conversion table for the photosensor 40.

A graph in FIG. 49 shows an example with the yellow toner.

A curve 140 shows the characteristic when the photosensitive drum 4 is in its initial state, while a curve 141 shows the characteristic after 20000 sheets have been printed.

From the graph, it can be seen that the image density tends to be reduced even when the sensor output is the same.

Even if the previously described control process is performed when the sensor output does not correspond to the image density, a desired gradation characteristic sometimes cannot be acquired.

Thus, after the operation is over, the first control system prepares a patch, which will be used for the second control system, at a gradation patch level (level 96 in this embodiment) that is near the output density level 128, and the first control system detects the density value of the patch during the reading sequence.

Point F is acquired by referring to the relationship between the density value read by the first control system and the output of the photosensor 40.

The curve 140 is registered as a conversion table in the ROM 30, the density that corresponds to the photosensor output at point G is D1, and the density that corresponds to point G after the image processing apparatus is worn out is D2. Thus, to calculate the conversion characteristic when the image processing apparatus is in the worn out state, the curve 140 is multiplied by the ratio D2/D1 and the result can be employed for correction.

As described above, according to these embodiments, an image processing apparatus, which forms a single-tone or a colored image on a recording medium, comprises: image reading means for reading an original document on an original support plate and digitizing the read-out document; control means for controlling reading conditions for the image reading means; means for forming a toner image on an image holder based on image information that is read by the image reading means; means for optically reading a reflective density of the toner image; means for transferring the toner image on the image holder to a recording medium; means for fixing the toner image on the recording medium; a first control system for forming at least one image pattern on the recording medium to determine an image characteristic, and for employing the image pattern data that is read by the image reading means to control image forming conditions; and a second control system for forming at least one toner image pattern on the image holder to determine the image characteristic, and for so employing the reflective density of the toner image that is optically read by the reading means to control image forming conditions that the gradation characteristic can be maintained for a long time.

Further, according to the present invention, an image forming method of an image processing apparatus, which incorporates means for reading an original document on an original support plate and digitizing the read-out document, means for forming an image based on a digitized image signal, and means for forming at least one image pattern to determine an image characteristic, and for employing image information for the output image pattern, which is placed on the original support plate and read out, in order to control image forming conditions, includes a first step of forming an image pattern having the maximum image density available with the image processing apparatus, and of employing image information for the formed image, which is placed on the original support plate of a reading unit and is read out, in order to control image forming conditions by setting the density slightly higher than the target maximum density of the image processing apparatus; and a second step of forming an image pattern that indicates density gradations, and of employing image information for the formed image, which is placed on the original support plate and is read out, in order to so control image forming conditions that the gradation characteristic is constant, the output density range for the image processing apparatus is unchanged, and the gradation characteristic, from highlighting to shadowing, is stable.

When a patch that has the maximum density is to be read, the maximum density may be calculated by averaging the readings for a plurality of points (e.g., three points). When a density variance occurs in the thrust direction and in the circumferential direction for the photosensitive drum 4, the densities among patches differ. When a detected density difference is greater than a set level, it is assumed that there is some error in the positioning of the photosensitive drum 4, the primary charger, or the developing unit. An error message will be displayed on the display 218 to perform the maintenance, and the process will be halted.

Figure 51:
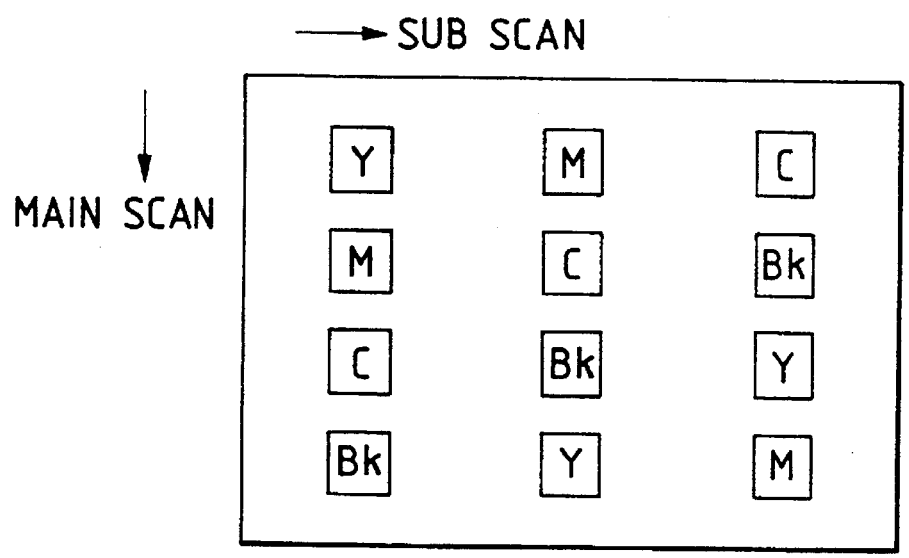
FIG. 51 is a diagram showing a patch example.
Figure 52:
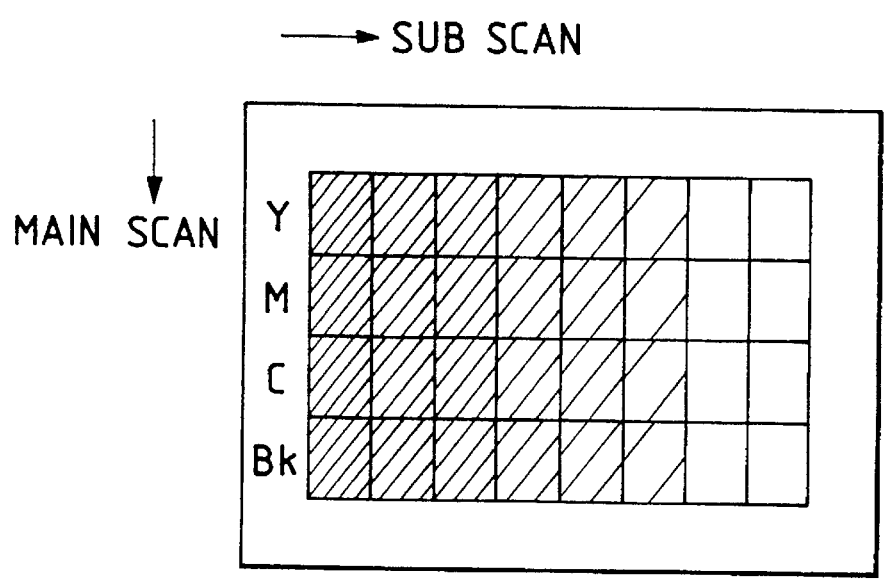
FIG. 52 is a diagram showing a patch example.

Further, as is shown in FIG. 51, for each color a plurality of patches that have the maximum density may be prepared and read, and their readings averaged. Test print 2 may be so designed that each color is arranged in one row in the sub-scanning direction, as is shown in FIG. 52.

Although in the above described embodiment, density information is acquired by expression (2), the output of the LOG conversion circuit 206 may be employed as density information. In this case, the density for yellow is measured by employing a value obtained by LOG conversion of a signal of a complementary color of yellow, i.e., a blue signal.

The density for magenta is measured by employing a LOG converted value of a green signal, and the density for cyan is measured by employing a LOG converted value of a red signal. For the measurement of the density for black, any color signal may be employed in principle, but when a specific luminous characteristic is taken into account, a green signal can be employed.

In addition, although in the above described embodiments $V_{cont}$ is corrected by the second control system, another LUT which is the same as the LUT 25 may be provided and γ correction may therefore be controlled by the second control system.

<Fourth Embodiment>

Figure 53:
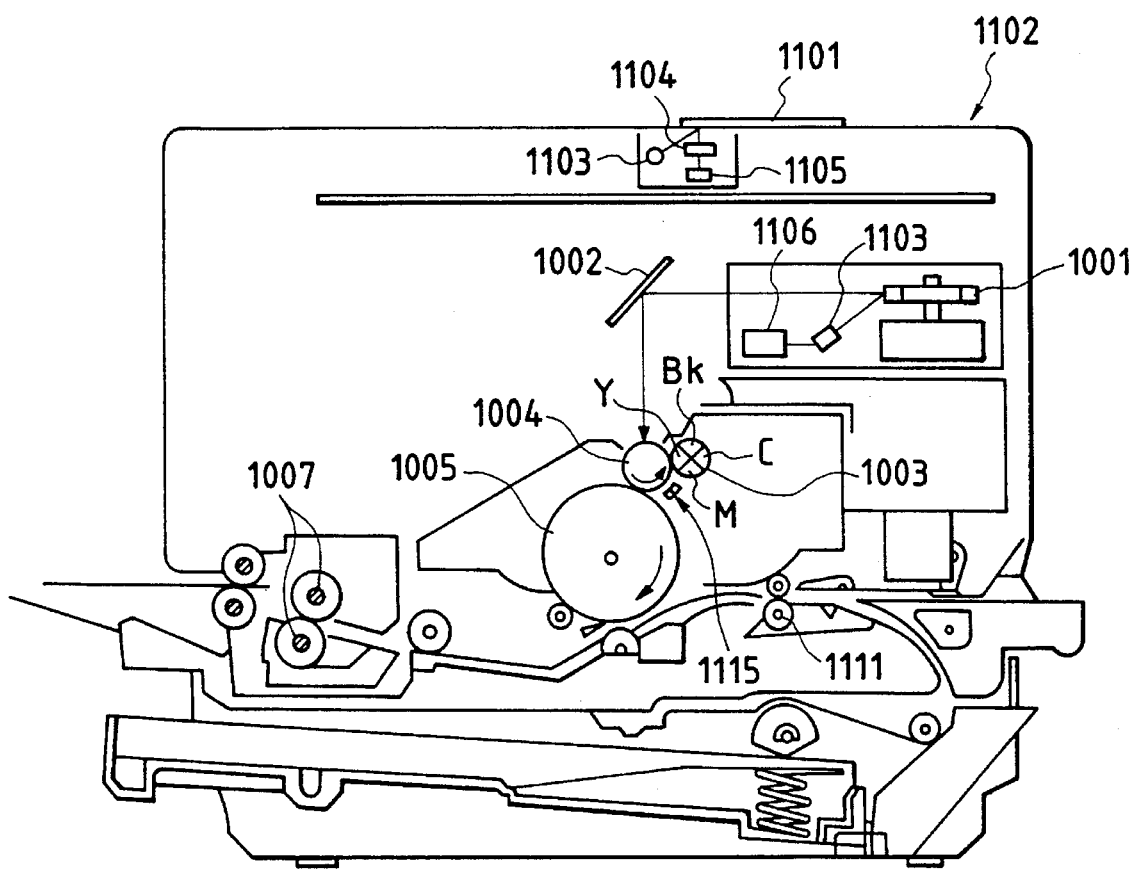
FIG. 53 is a diagram illustrating the arrangement of an image processing apparatus according to a fourth embodiment of the present invention.

FIG. 53 is a diagram showing the arrangement of an image processing apparatus according to this embodiment. In this embodiment, an image signal is converted into a laser beam via a laser driver and a laser light source (neither of them shown). The laser beam is reflected by a polygon mirror 1001 and a mirror 1002, and is irradiated on a photosensitive drum 1004. The photosensitive drum 1004 that bears a latent image tat is produced by the laser beam scanning rotates in the direction indicated by the arrow in FIG. 53. Then, a rotary developing unit 1003 performs development for each color on the latent image (development using yellow toner is shown in FIG. 53).

Each time a recording medium is rotated together with a transfer drum 1005, an M (magenta), C (cyan), Y (yellow), or Bk (black) color image that has been developed by the developing unit 1003 is transferred in the named order from the photosensitive drum 1004. Four rotations are required to complete the image transfers.

When the transferring is terminated, the transfer sheet is separated from the transfer drum 1005 and is fixed by paired fixing rollers 1007 to produce a color image print.

This embodiment differs from the previous embodiments in the employment of a rotary developing unit.

Since the circuit structure for image processing is the same as that for the above described embodiments, no explanation for it will be given here.

Figure 54:
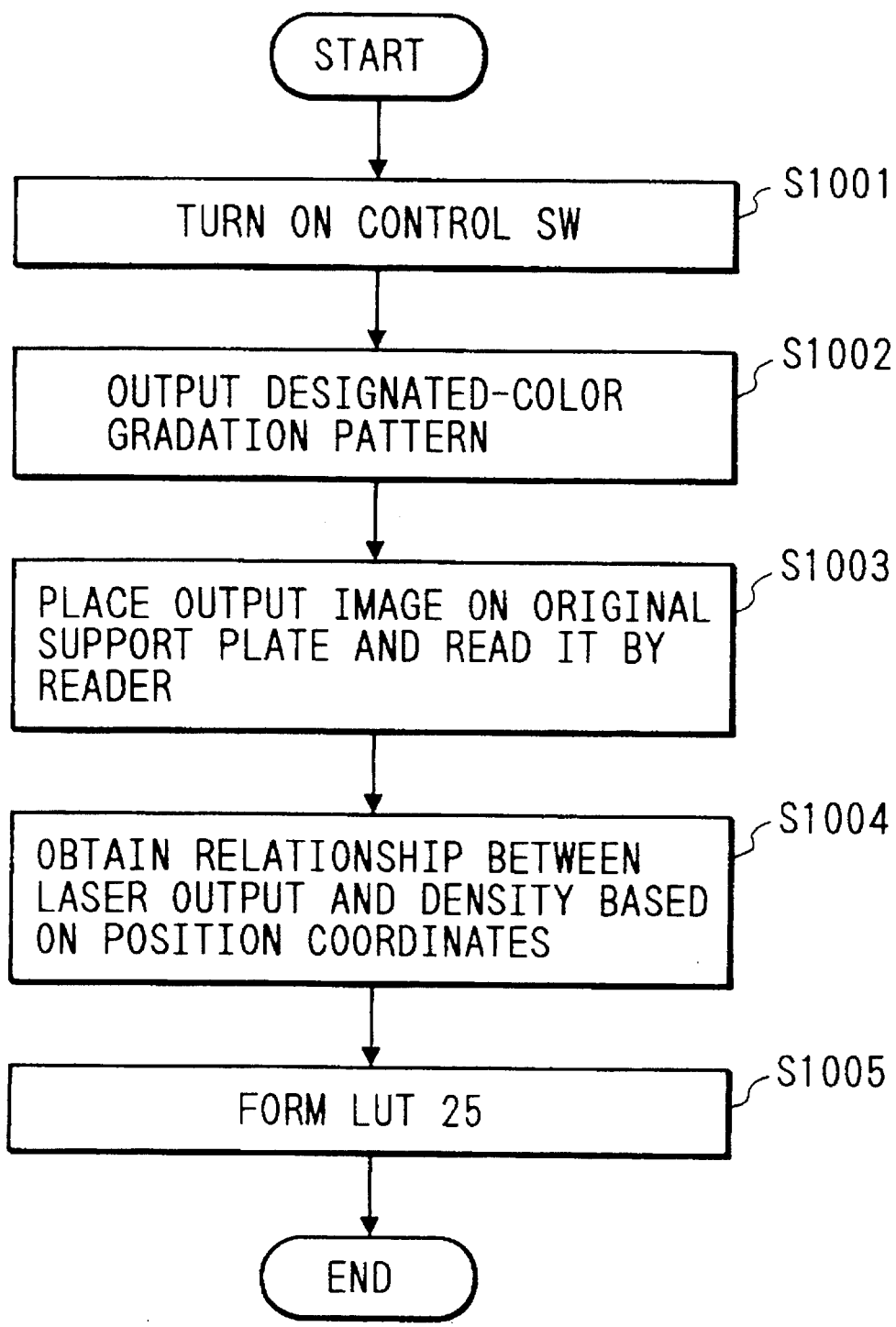
FIG. 54 is a flowchart for the processing of the image processing apparatus of the fourth embodiment.
Figure 55:
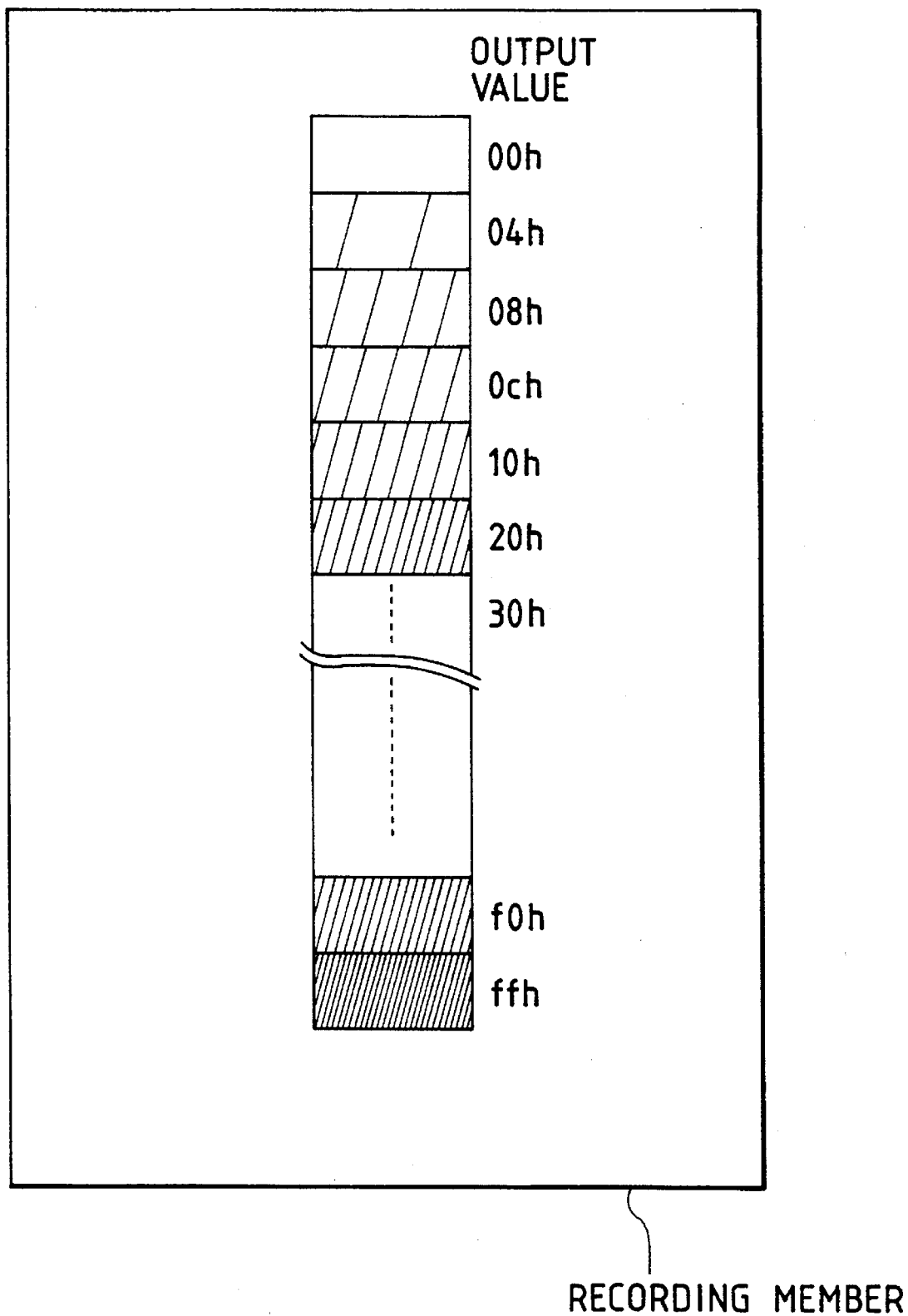
FIG. 55 is a diagram showing a test print that is printed out according to the fourth embodiment.

FIG. 54 is a flowchart showing the processing of this embodiment. A specific color whose gradation characteristic is determined to be abnormal is selected on a console panel 217, and a start switch for this process is turned on (S1001). A pattern generator 29 within the apparatus forms on a recording medium a gradated pattern image, which is obtained by extracting many portions where γ of a selected color is not linear, and prints the gradated pattern image, as is shown in FIG. 55 (S1002). The following process, at S1003 through S1005, is the same as in the above described embodiments.

Figure 56:
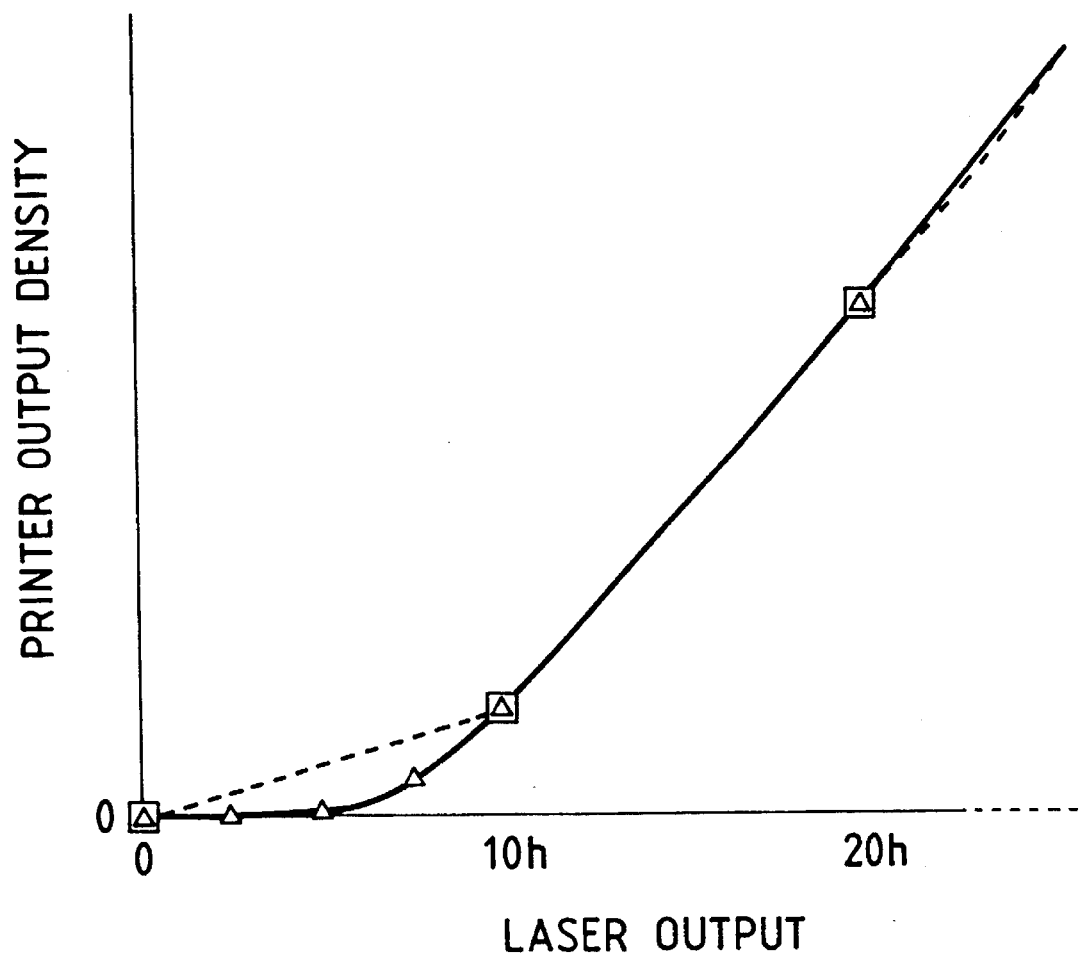
FIG. 56 is a graph for explaining measured points.

As is shown in FIG. 56, when the portions where γ is not linear are interpolated, the obtained density is different from the actual density, as is indicated by the broken line. In this embodiment, therefore, many portions where γ is not linear are extracted to reduce the difference from the actual density (FIGS. 29A through 29E).

FIG. 57 shows a comparison between a conventional art relating to measuring points and the present embodiment.

Although in this embodiment, for preparation of the LUT, the primary interpolation is performed to generate missing data, higher interpolation or higher approximation is desirable. The contents of the LUT 25 are calculated by employing the obtained data, and the resultant data for the LUT 25 are set to improve the gradation.

By performing the above described process, an image with excellent gradation, even for those portions where γ is not linear, can be formed.

Although the control for a selected single color is performed in the above example, since the gradation may deteriorate for all the used color toners during the time an appliance is in use, correction for all the colors, yellow, magenta, cyan, and black, may be performed at one time.

Figure 58:
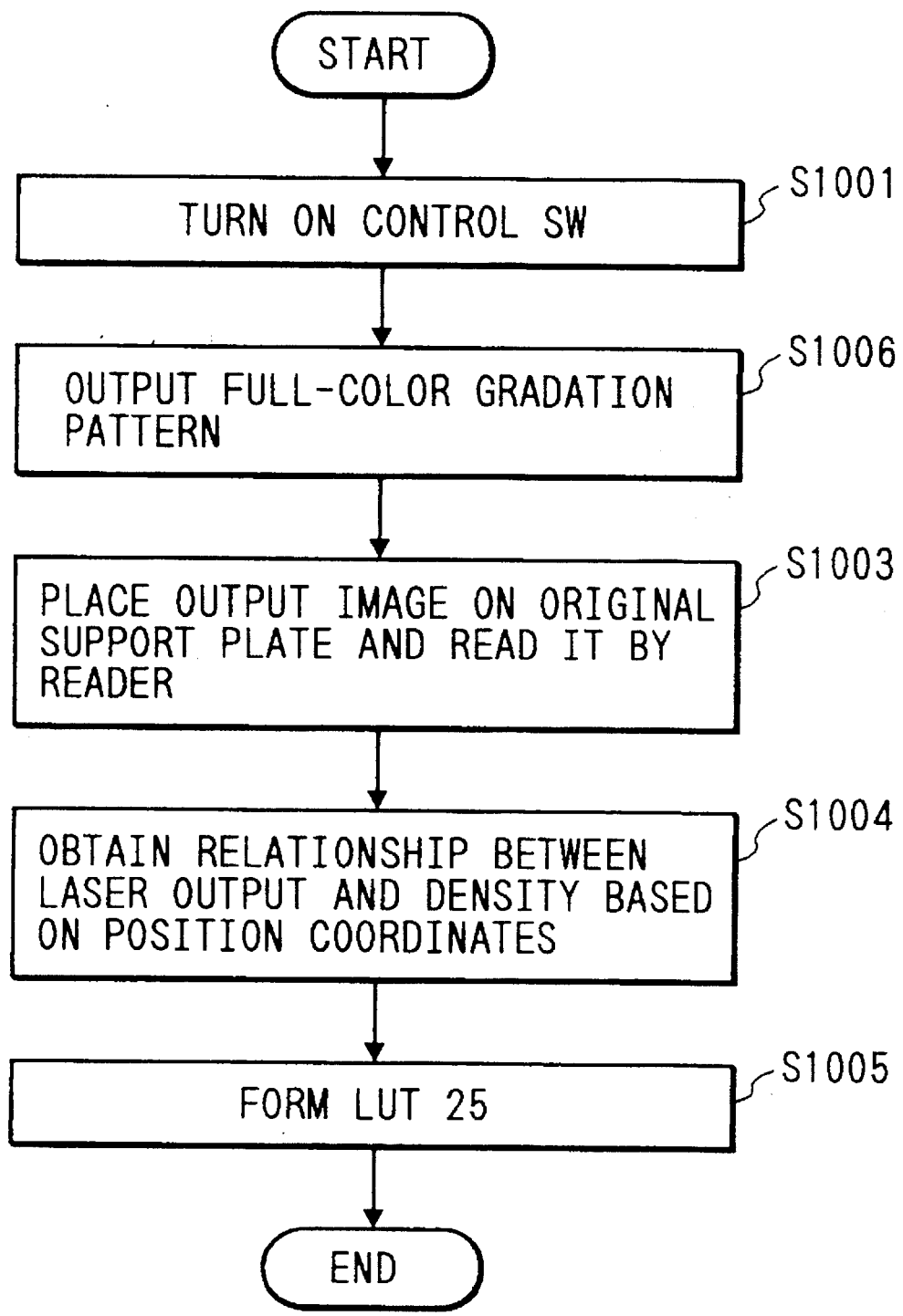
FIG. 58 is a flowchart for a modification of the fourth embodiment.
Figure 59:
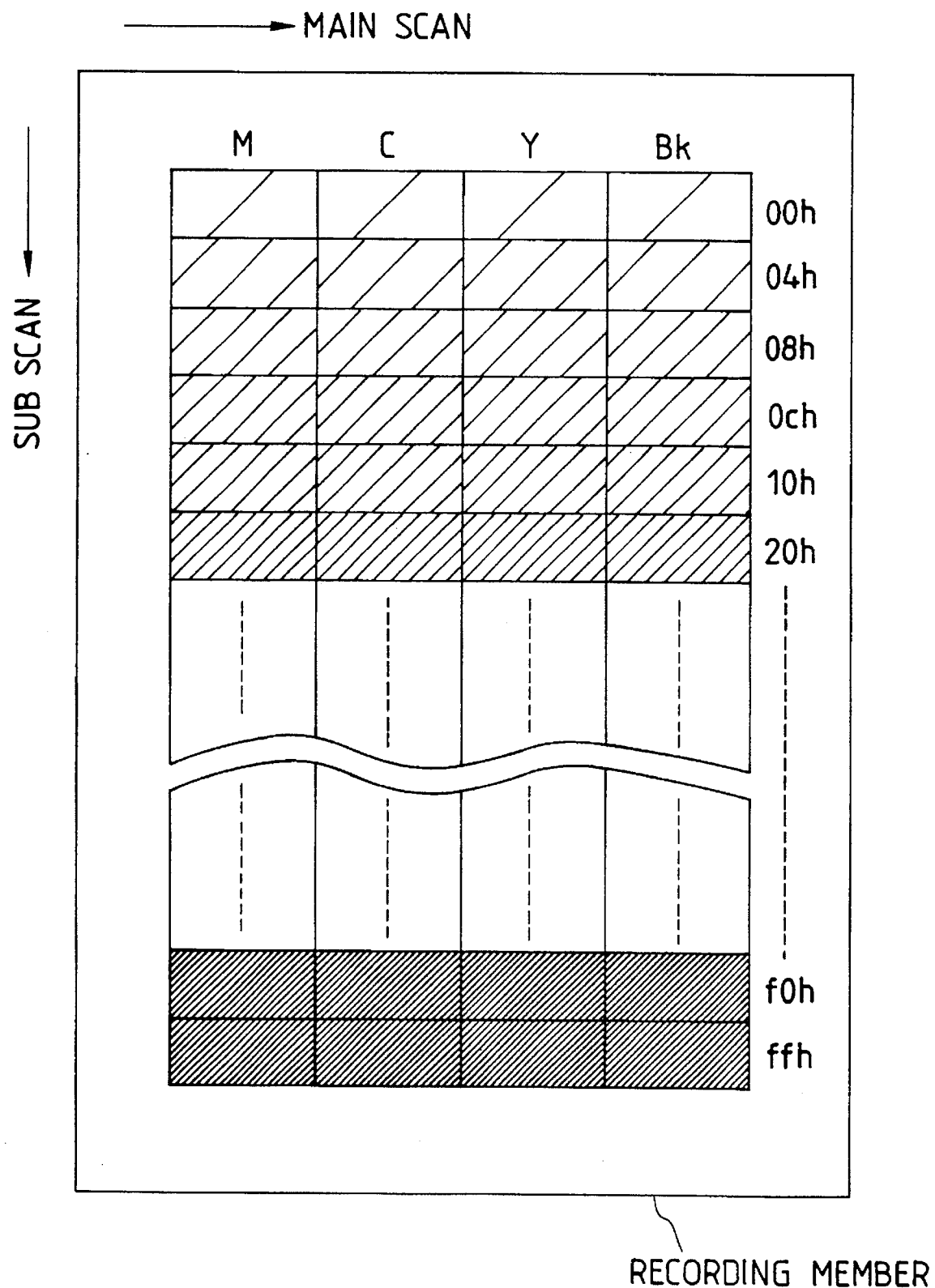
FIG. 59 is a diagram for the modification of the fourth embodiment.

FIG. 58 is a flowchart for that processing. A start switch for this process is turned on at the console panel 218 (S1001). The pattern generator 29 within the apparatus forms on a recording medium a gradated pattern image obtained by extracting many portions where γ for a selected color is not linear, and prints the gradation pattern image, as is shown in FIG. 59, in the same manner as in the previous process.

Since the gradation characteristic is changed by the environment and a print output method, this embodiment is characterized by changing the portions that are closely extracted in consonance with situations. The gradation characteristic differs when a pattern image is output with resolutions of 200 lpi and when it is output with resolutions of 400 lpi.

When the gradation characteristic is changed by the output resolutions, measurement points are changed in consonance with the characteristic, as is shown in FIG. 60. By employing these measurement points, the same control process as in the third embodiment is performed to form an image with an excellent gradation.

As described above, according to the present invention, an image processing apparatus includes means for reading an original document on an original support plate and for digitizing the read-out document; means for forming a toner image on an image holder; means for transferring the toner image from the image holder to a recording medium; and means for fixing the toner image on the recording medium, so that at least one image pattern is formed, for which many gradation patterns for the portions where γ is not linear are extracted to determine the image characteristic of the fixed image, and is placed on the original support plate and read out, and density control is performed by employing the read-out data to provide an image quality with more excellent gradation.

<Fifth Embodiment>

The arrangement of an image processing apparatus according to this embodiment is the same as that for the fourth embodiment.

Figure 61:
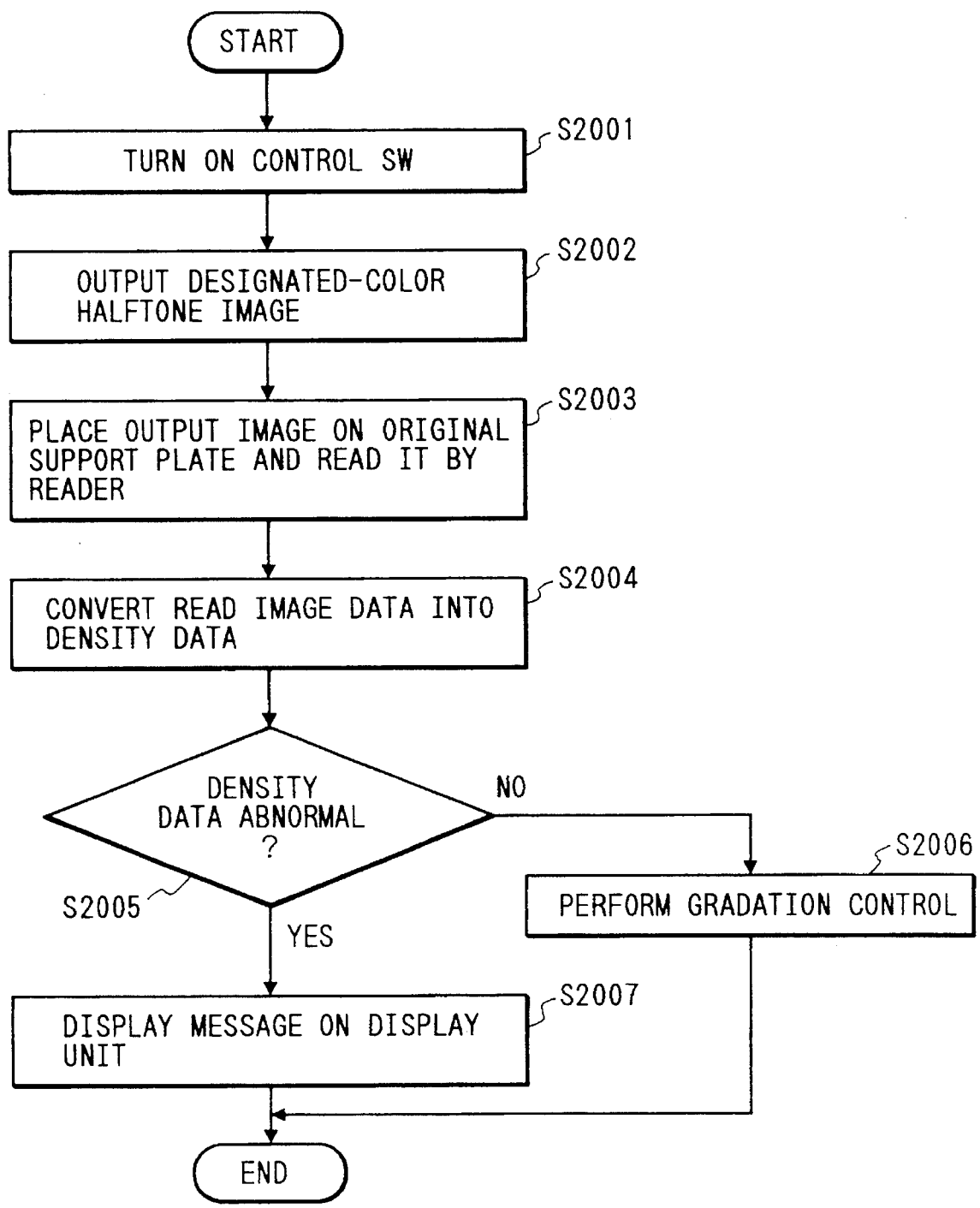
FIG. 61 is a flowchart for an image processing apparatus according to a fifth embodiment of the present invention.

FIG. 61 is a flowchart for the processing of this embodiment. A specific color whose gradation characteristic is determined to be abnormal is selected on a console panel 217, and a start switch for this process is turned on (S2001). A pattern generator 29 of this apparatus outputs a halftone image where the uniform density for the entire face, which is the specific output of the selected color, is in the vicinity of 0.6. A printed sample 101 is again placed on an original support plate 102 of a reader unit, irradiated by a light source 103, and converted into a reflective light quantity signal by a CCD 105 via a color separation optical system 104 (S2003).

The light quantity signal is then converted into density data by log conversion (S2004).

Figure 62:
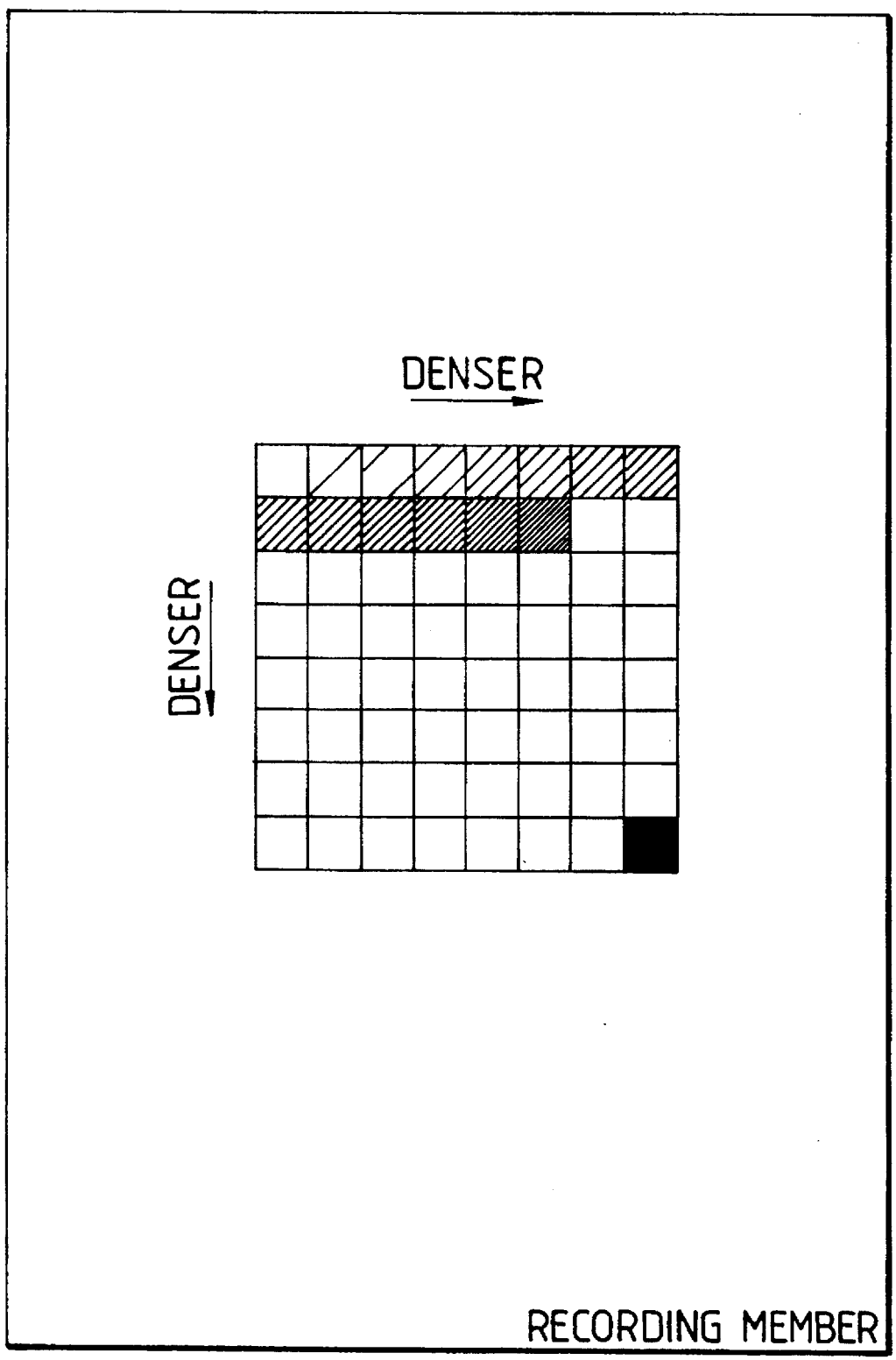
FIG. 62 is a diagram showing a test print according to the fifth embodiment.

Density values across the entire area of the halftone image are measured (1 point per 1 mm$^2$). When the measured density values are not within a predetermined range (0.45 to 0.75), or when a difference between the maximum density value and the minimum is a predetermined value (0.15) or greater, a message, "call maintenance man" is displayed on a display 218 (S2007). After the apparatus failure is eliminated, gradation correction is performed again. When the result corresponds to the setting, a pattern image with 256 gradations of a selected color is formed on a recording medium and printed as shown in FIG. 62. The gradation control based on this pattern (S2006) is the same as for the third embodiment.

In the fifth embodiment, density data acquired at 256 points are employed to calculate and to set the data for the LUT 25 to improve the gradation.

Through the above process, even when the density is partially changed due to some problem, though the density output is identical, mistaken gradation correction can be prevented.

<Sixth Embodiment>

When some abnormal event has occurred in the apparatus, in the fifth embodiment a user is merely informed that a maintenance man should be called, while in this embodiment the location at which the abnormal event has occurred is indicated at the same time.

Since as well as in the fifth embodiment, the setting of an LUT 25 in the sixth embodiment is performed as is shown in FIG. 61, that processing that is identical to that of the fifth embodiment will not be explained.

Figure 63:
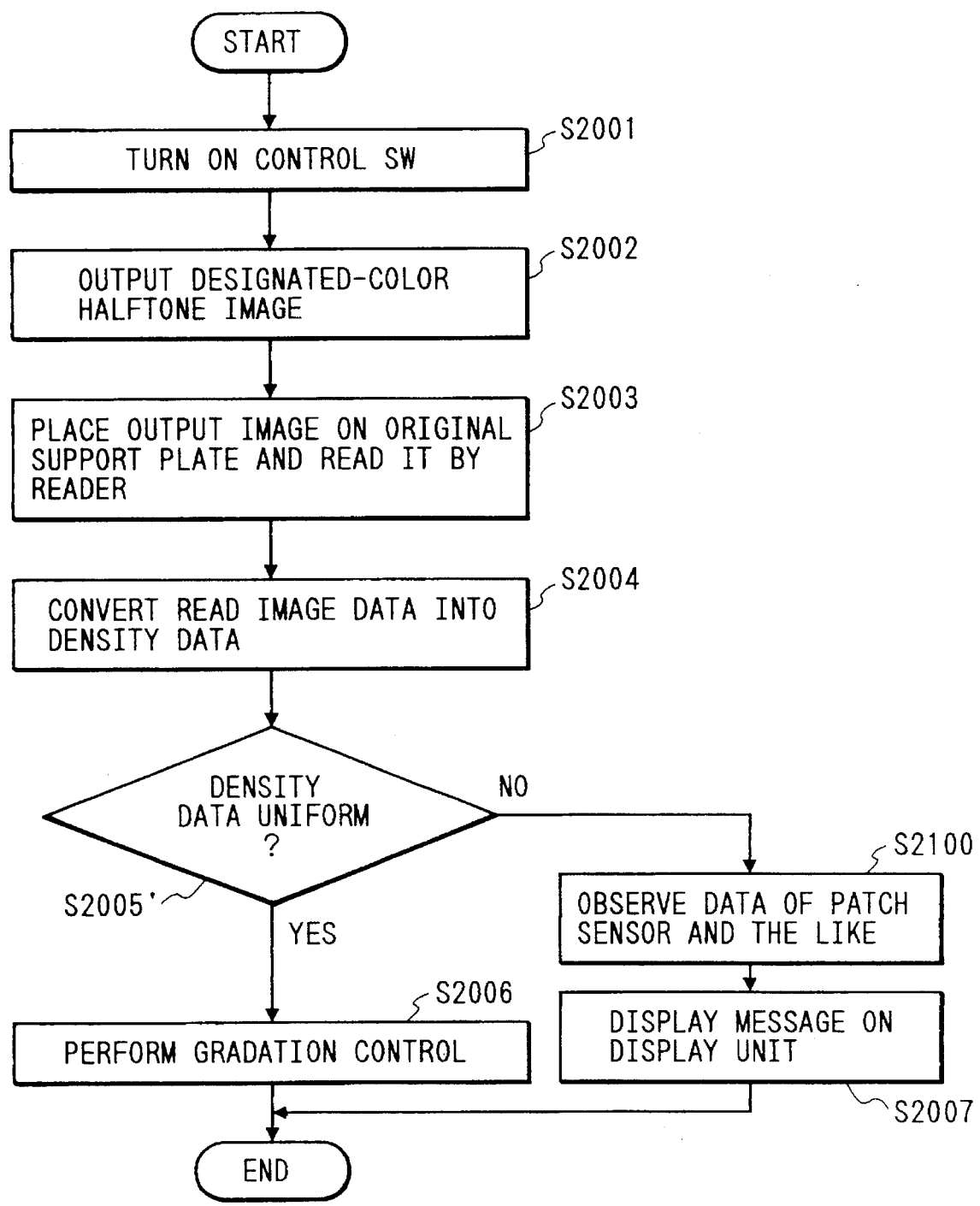
FIG. 63 is a flowchart showing the processing for an image processing apparatus according to a sixth embodiment of the present invention.

In the fourth embodiment, when, at step S2005 in FIG. 63, a check is performed to determine whether or not an abnormal event exists in the relationship between the laser output level and the read-out density, data, such as the T/C ratio (ratio of a toner to a carrier), are also referred to at the same time. The calculation of the T/C ratio will now be explained while referring to FIG. 64.

Figure 64:
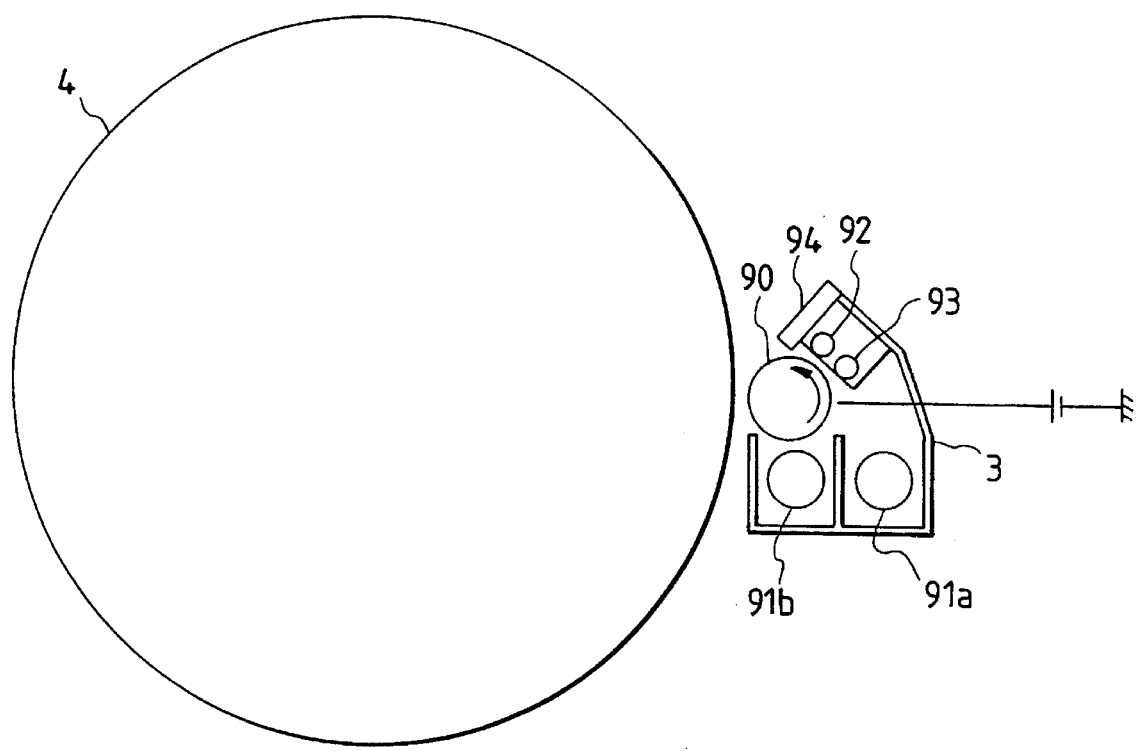
FIG. 64 is a diagram showing the structure of a developing unit.
Figure 65:
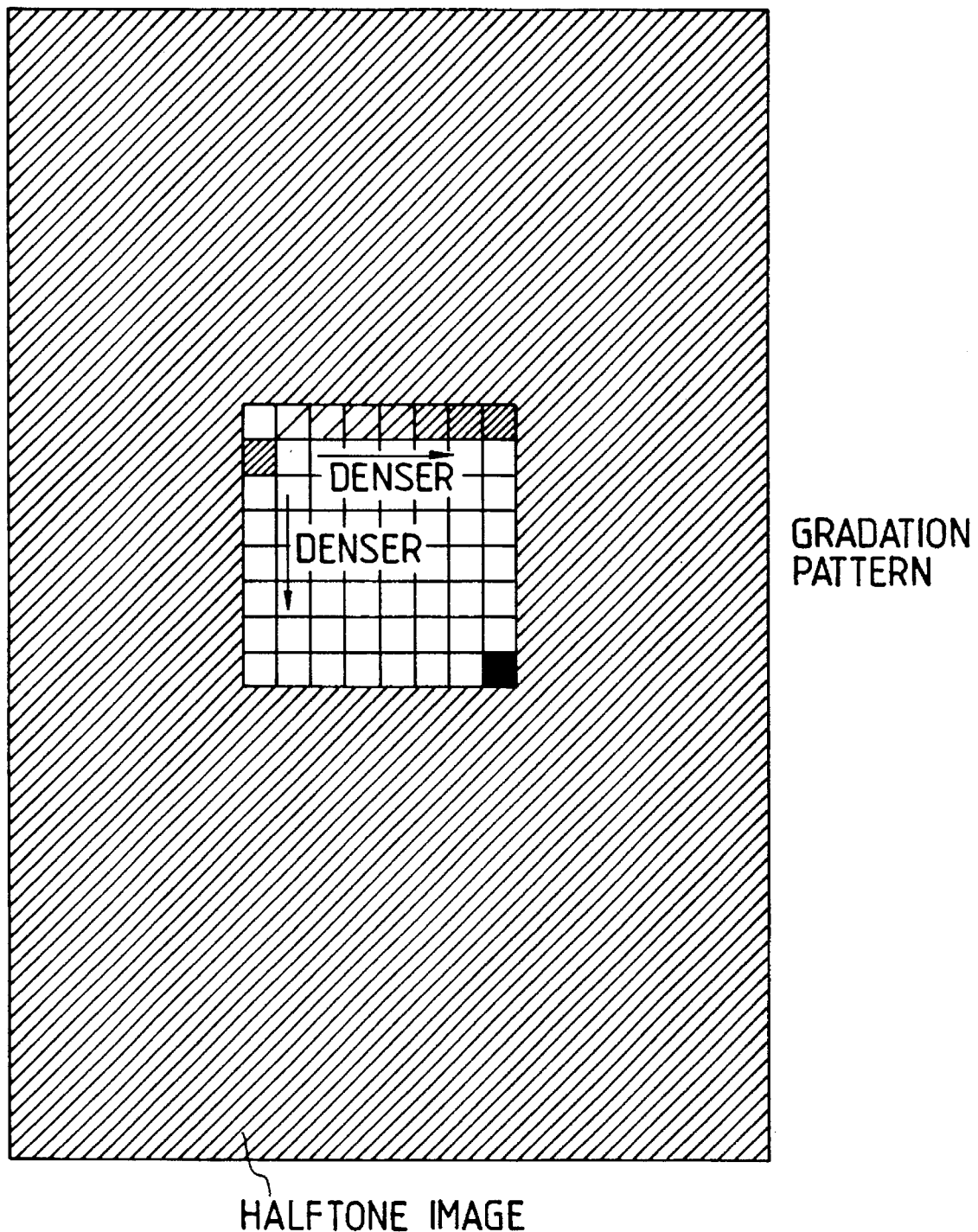
FIG. 65 is a diagram showing a modified test print.

FIG. 64 is a diagram illustrating the detailed structure of a developing unit 1003 in FIG. 53. In FIG. 63, the toner is used by the developing unit 1003 for development so that a latent image that is formed on the photosensitive drum 1004 can be visualized. Two-component developer that consists of a carrier and a toner is employed in this embodiment.

Since the image density depends on the toner density (T/C ratio) in the developer, the T/C ratio must be kept constant.

The developing unit 1003 includes screws 91a and 91b that uniformly agitate the developer. The screw 91a is rotated toward the back in the diagram to feed the developer, while the screw 91b is rotated toward the front in the diagram to feed the developer, so that the developer is equally distributed in the developing unit 1003.

As the carrier in the developer is magnetic, the mixture of the carrier and the toner is attracted by a magnet that is located inside a developing sleeve 90, and is uniformly spread on a photosensitive drum 1004 by a blade 94. Then, the amount of toner that corresponds to the difference between a voltage, which is applied to the developing sleeve 90, and the potential of a latent image, which is formed on the photosensitive drum 1004, adheres to the surface of the photosensitive drum 1004, so that the development is performed.

The developing unit 1003 incorporates an optical sensor that has an LED 92 and a photodiode 93 that are directed towards the developer that is attracted to the developing sleeve 90.

The LED 92 and the photodiode 93 have peak wavelengths of 950 nm, and the employed toner reflects light in this wavelength range, and the employed carrier is attracted in this wavelength range. Therefore, as the output of the photodiode 93 becomes higher, the T/C ratio is increased, while as the output of the photodiode 93 becomes lower, the T/C ratio is decreased.

If the output of the photodiode 93 at the set T/C ratio is stored in advance and is compared with the current output of the photodiode 93, the current T/C ratio can be determined from the difference.

When the detected current T/C ratio is low, to return the T/C ratio to the set value, the toner in the developing unit 1003 is supplemented with toner from a toner supplement unit (not shown).

The T/C ratio thus obtained is referred to at step S2005 in FIG. 63, where a check is performed to determine whether or not an abnormal event exists in the relationship between the laser output level and the read-out density.

When, at step S2005 in FIG. 63, an abnormal event exists in the relationship between the laser output level and the read-out density, program control moves to step S2100, and a message is displayed on the display 218. Based on the T/C ratio that is obtained by the optical sensor in the developing unit 1003, a message indicating a location where an abnormal event may exist is displayed.

A specific message example that indicates a location where an abnormal event may have occurred will now be explained.

Supposing that the read-out density levels are "heavy," "normal," and "light," and the T/C ratios are also "thick," "normal," and "thin," nine states as shown in Table 1 are possible.

TABLE 1

| T/C ratio | Reader density | | |
|---|---|---|---|
| | Heavy | Normal | Light |
| Thick | 1 | 2 | 3 |
| Normal | 4 | 5 | 6 |
| Thin | 7 | 8 | 9 |

Messages that correspond to the individual state shown in Table 1 can be set as is shown in Table 2, for example.

TABLE 2

| State | Message |
|---|---|
| 1 | Repeat the image for a while until the T/C ratio is reduced. |
| 2, 3, 6 | Check developing unit or transfer units. |
| 4, 7, 8 | Check developing unit. |
| 5 | Normal operation. |
| 9 | Check hopper. |

As described above, according to the sixth embodiment, when an abnormal event has occurred in the apparatus during the gradation correction, the abnormal event is detected, and its location is also assumed, so that an incorrect operation can be prevented and maintenance is facilitated.

Although in the sixth embodiment a halftone image is printed on one sheet, for confirmation of a uniform density, and, if it has a pleasant appearance, a pattern with controlled gradation is printed on a second sheet, the halftone image and the gradation controlled pattern may be printed on a single sheet.

In other words, at least one gradated image pattern is formed on a portion of a recording medium to determine the image characteristic, and a halftone image that has a uniform density is output on the remaining portion.

In this manner, test patterns do not have to be formed a plurality of times, and efficient calibration is possible.

As described above, according to this embodiment, an image processing apparatus includes means for reading an original document on an original support plate and for digitizing the read-out document, and means for forming an image based on the digitized signals. Before performing the gradation correction, an output image that has a uniform density is positioned on the original support plate and read out. When an abnormal event exists in the data, a message, "call maintenance man," is displayed and the gradation correction is not performed. Further, data acquired by a patch sensor (FIG. 64) are monitored, and when the density is low though the T/C ratio is high, and it is assumed that an abnormal event has occurred and a message is displayed such as "1. check developing unit; 2. check transfer system; 3. check hopper; or 4. *****." After the abnormality in the apparatus has been corrected, the gradation correction is performed again. Thus, an erroneous gradation correction can be prevented and maintenance can be facilitated.

As described above, according to the present invention, gradation control, which is performed by image forming means, whereby the maximum expressible density is effectively employed is possible.

The present invention is not limited to the above described embodiments and can be variously modified and applied within the scope of the claims.

What is claimed is:

1. An image processing apparatus comprising:

input means for inputting image data;

correcting means for correcting the image data;

image forming means for forming and outputting an image on a medium in accordance with the image data corrected by said correcting means;

pattern generating means for generating pattern data which is used for forming a pattern on the medium;

detecting means for detecting the pattern on the medium and outputting a detection result;

first controlling means for controlling, on the basis of the output detection result, an image forming condition of said image forming means so that a maximum density which is capable of being reproduced by said image forming means is higher than a target maximum density which is capable of being reproduced by the image processing apparatus; and second controlling means for controlling a correcting condition of said correcting means so as to correct the image to be output by the image forming means.

2. An image processing apparatus according to claim 1, wherein said medium is a photosensitive drum that has a photosensitive layer on a surface.

3. An image processing apparatus according to claim 1, wherein said medium is a photosensitive sheet that has a photosensitive layer on a surface.

4. An image processing apparatus according to claim 1, wherein said medium is a sheet of paper.

5. An image processing apparatus according to claim 1, wherein said input means are reading means for scanning an original and generating the image data.

6. An image processing apparatus according to claim 1, wherein said pattern generating means is a ROM.

7. An image processing apparatus according to claim 1, wherein said detecting means is a photosensor.

8. An image processing apparatus according to claim 1, wherein said first controlling means controls the image forming condition based on a contrast potential.

9. An image processing apparatus according to claim 1, wherein said second controlling means controls a γ-characteristic of said correcting means.

10. An image forming method comprising the steps of:

inputting image data;

correcting the image data;

controlling an image forming condition and an image outputting of an image forming means in an image processing apparatus so that a maximum density which is capable of being reproduced by said image forming means is higher than a target maximum density which is capable of being reproduced by said image processing apparatus; and controlling a correcting condition of the correcting step so as to correct the image to be output by the image forming means.

11. A method according to claim 10, wherein said image forming means forms an image on a photosensitive member.

12. A method according to claim 10, wherein said image forming means forms an image on a sheet of paper.

13. A method according to claim 10, wherein said correcting means corrects a halftone characteristic of input image data.

* * * * *

UNITED STATES PATENT AND TRADEMARK OFFICE
CERTIFICATE OF CORRECTION

PATENT NO. : 5,579,090

DATED : November 26, 1996

INVENTORS : Nobuatsu Sasanuma, et al.

It is certified that error appears in the above-identified patent and that said Letters Patent is hereby corrected as shown below:

COLUMN 12

Line 40, "AVE" should read --A VE--.

COLUMN 16

Line 15, "rate1," should read --rate 1,--; and
Line 18, "$V_{cont}$rate1 = B/A" should read --$V_{cont}$rate 1 = B/A--.

COLUMN 17

Line 17, "However" should read --However,--.

COLUMN 19

Line 50, "Since to provide a" should read --A--; and
Line 53, "its" should read --because its--.

UNITED STATES PATENT AND TRADEMARK OFFICE
CERTIFICATE OF CORRECTION

PATENT NO. : 5,579,090

DATED : November 26, 1996

INVENTORS : Nobuatsu Sasanuma, et al.

It is certified that error appears in the above-identified patent and that said Letters Patent is hereby corrected as shown below:

COLUMN 23

Line 21, "tat" should read --that--.

COLUMN 27

Line 7, "occurred and" should read --occurred,--.

Signed and Sealed this

Seventeenth Day of June, 1997

Attest:

BRUCE LEHMAN

Attesting Officer

Commissioner of Patents and Trademarks